(12) United States Patent
Wu

(10) Patent No.: US 12,424,746 B2
(45) Date of Patent: Sep. 23, 2025

(54) ELECTRONIC DEVICE

(71) Applicant: GUANGDONG OPPO MOBILE TELECOMMUNICATIONS CORP., LTD., Guangdong (CN)

(72) Inventor: Xiaopu Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 253 days.

(21) Appl. No.: 18/343,667

(22) Filed: Jun. 28, 2023

(65) Prior Publication Data

US 2023/0361467 A1 Nov. 9, 2023

Related U.S. Application Data

(63) Continuation of application No. PCT/CN2021/131261, filed on Nov. 17, 2021.

(30) Foreign Application Priority Data

Dec. 29, 2020 (CN) .......................... 202011603135.9

(51) Int. Cl.
*H01Q 1/24* (2006.01)
*H01Q 1/52* (2006.01)
(Continued)

(52) U.S. Cl.
CPC .............. *H01Q 5/20* (2015.01); *H01Q 1/243* (2013.01); *H01Q 1/52* (2013.01); *H01Q 5/314* (2015.01)

(58) Field of Classification Search
CPC ............ H01Q 1/24; H01Q 1/243; H01Q 1/52; H01Q 21/28; H01Q 5/20; H01Q 5/30;
(Continued)

(56) References Cited

U.S. PATENT DOCUMENTS 10,361,490 B1 7/2019 Lee et al.
12,027,768 B2 * 7/2024 Park ..................... H04M 1/02
(Continued)

FOREIGN PATENT DOCUMENTS

CN 101436710 5/2009
CN 103716468 4/2014
(Continued)

OTHER PUBLICATIONS

Ming et al., "Novel and Miniaturized Hendeca-Band Antenna for Mobile Phones," Journal of Xidian University, Sep. 28, 2017, pp. 116-121, vol. 45, No. 2.
(Continued)

*Primary Examiner* — Tho G Phan
(74) *Attorney, Agent, or Firm* — Hodgson Russ LLP

(57) ABSTRACT

An electronic device is provided in the present disclosure. The electronic device includes a housing, a first antenna module, and a second antenna module. The housing includes a first corner portion and a second corner portion that are disposed diagonally. At least part of the first antenna module is disposed at or close to the first corner portion. The first antenna module includes a first radiating element. The first radiating element is configured to transmit and receive a first electromagnetic wave signal, and generate a first induction signal when a subject to-be-detected is approaching. At least part of the second antenna module is disposed at or close to the second corner portion. The second antenna module includes a second radiating element, and the second radiating element is configured to transmit and receive a second electromagnetic wave signal, and generate a second induction signal when the subject to-be-detected is approaching.

19 Claims, 22 Drawing Sheets

(51) Int. Cl.
  *H01Q 5/20* (2015.01)
  *H01Q 5/314* (2015.01)
(58) Field of Classification Search
  CPC .......... H01Q 5/307; H01Q 5/31; H01Q 5/314; H01Q 5/40; H01Q 9/42
  See application file for complete search history.

(56) References Cited

U.S. PATENT DOCUMENTS

| | | | |
|---|---|---|---|
| 12,034,224 B2 * | 7/2024 | Shin | H01Q 5/364 |
| 12,199,335 B2 * | 1/2025 | Lim | H01Q 1/422 |
| 12,218,409 B2 * | 2/2025 | Kim | H01Q 1/48 |
| 2015/0380812 A1 | 12/2015 | Black et al. | |
| 2018/0212313 A1 | 7/2018 | Harper | |
| 2019/0036231 A1 | 1/2019 | Ryu et al. | |
| 2019/0103659 A1 | 4/2019 | Heo | |
| 2020/0365969 A1 | 11/2020 | Lee et al. | |

FOREIGN PATENT DOCUMENTS

| | | |
|---|---|---|
| CN | 104426590 | 3/2015 |
| CN | 104979635 | 10/2015 |
| CN | 106229614 | 12/2016 |
| CN | 106450662 | 2/2017 |
| CN | 106850881 | 6/2017 |
| CN | 108206331 | 6/2018 |
| CN | 208738425 U | 4/2019 |
| CN | 110994156 A | 4/2020 |
| CN | 210805993 U | 6/2020 |
| CN | 111628298 A | 9/2020 |
| CN | 211404735 | 9/2020 |
| CN | 112086753 | 12/2020 |
| CN | 112114202 | 12/2020 |
| WO | 2019071848 A1 | 4/2019 |
| WO | 2019218168 A1 | 11/2019 |
| WO | 2020011219 A1 | 1/2020 |

OTHER PUBLICATIONS

Li et al., "Harm of Electromagnetic Radiation to Human Health," Safety and Health, Dec. 25, 2005, pp. 43-44.
Li et al., "Novel Internal High Gain Loop Handset Phone Antenna Design for Satellite and Terrestrial Integrated Mobile Communications System Ppplications," International Symposium on Antennas and Propagation, S1.1.2, Nov. 9, 2015, pp. 4-7.
CNIPA, Notification to Grant Patent Right for Invention issued for CN Application No. 202011603135.9, Nov. 15, 2023.
WIPO, International Search Report and Written Opinion for International Application No. PCT/CN2021/131261, Jan. 28, 2022.
CNIPA, First Office Action for CN Application No. 202011603135.9, Dec. 19, 2022.
EPO, Extended European Search Report for EP Application No. 21913571.2, Apr. 25, 2024.

* cited by examiner

ELECTRONIC DEVICE

CROSS-REFERENCE TO RELATED APPLICATION(S)

This application is a continuation of International Application No. PCT/CN2021/131261, filed Nov. 17, 2021, which claims priority to Chinese Patent Application No. 202011603135.9, filed Dec. 29, 2020, the entire disclosures of which are incorporated herein by reference.

TECHNICAL FIELD

This disclosure relates to the field of communication technology, and in particular to an electronic device.

BACKGROUND

With development of technology, electronic devices with communication functions, such as mobile phones, are becoming increasingly popular and increasingly powerful. The electronic device usually includes an antenna module for realizing the communication function of the electronic device. How to improve a communication quality of the electronic device and promote miniaturization of the electronic device has become a technical problem to be solved.

SUMMARY

An electronic device is provided in implementations of the present disclosure. The electronic device includes a housing, a first antenna module, and a second antenna module. The housing includes a first corner portion and a second corner portion that are disposed diagonally. At least part of the first antenna module is disposed at or close to the first corner portion. The first antenna module includes a first radiating element. The first radiating element is configured to transmit and receive a first electromagnetic wave signal, and generate a first induction signal when a subject to-be-detected is approaching. At least part of the second antenna module is disposed at or close to the second corner portion. The second antenna module includes a second radiating element, and the second radiating element is configured to transmit and receive a second electromagnetic wave signal, and generate a second induction signal when the subject to-be-detected is approaching.

BRIEF DESCRIPTION OF THE DRAWINGS

To describe technical solutions of implementations of the present disclosure more clearly, the following will give a brief introduction to the accompanying drawings used for describing implementations. Apparently, the accompanying drawings described below are merely some implementations of the present disclosure. Based on these accompanying drawings, those of ordinary skill in the art can also obtain other accompanying drawings without creative effort.

DETAILED DESCRIPTION

Technical solutions in implementations of the present disclosure will be described clearly and completely hereinafter with reference to the accompanying drawings in implementations of the present disclosure. Apparently, the described implementations are merely some rather than all implementations of the present disclosure. Implementations listed in the present disclosure may be appropriately combined with each other.

Figure 1:
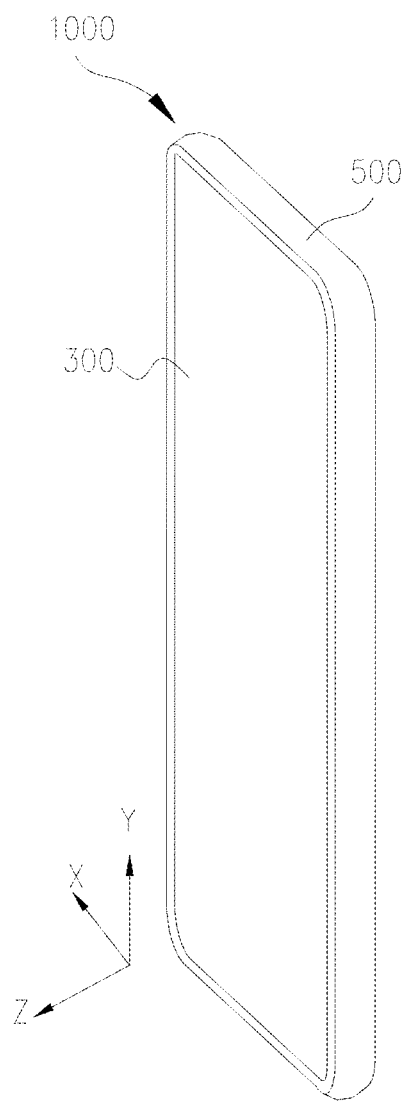
FIG. 1 is a schematic structural diagram of an electronic device provided in implementations of the present disclosure.

Referring to FIG. 1, FIG. 1 is a schematic structural diagram of an electronic device 1000 provided in implementations of the present disclosure. The electronic device 1000 may be a telephone, a television, a tablet computer, a mobile phone, a camera, a personal computer, a notebook computer, a on-board device, an earphone, a watch, a wearable device, a base station, an on-board radar, a customer premise equipment (CPE), and other devices capable of transmitting and receiving electromagnetic wave signals. The mobile phone is taken as an example of the electronic device 100. For ease of description, the electronic device 1000 is defined with reference to a first viewing angle. A width direction of the electronic device 1000 is defined as direction X, a length direction of the electronic device 1000 is defined as direction Y, and a thickness direction of the electronic device 1000 is defined as direction Z. A direction indicated by an arrow is forward.

Figure 2:
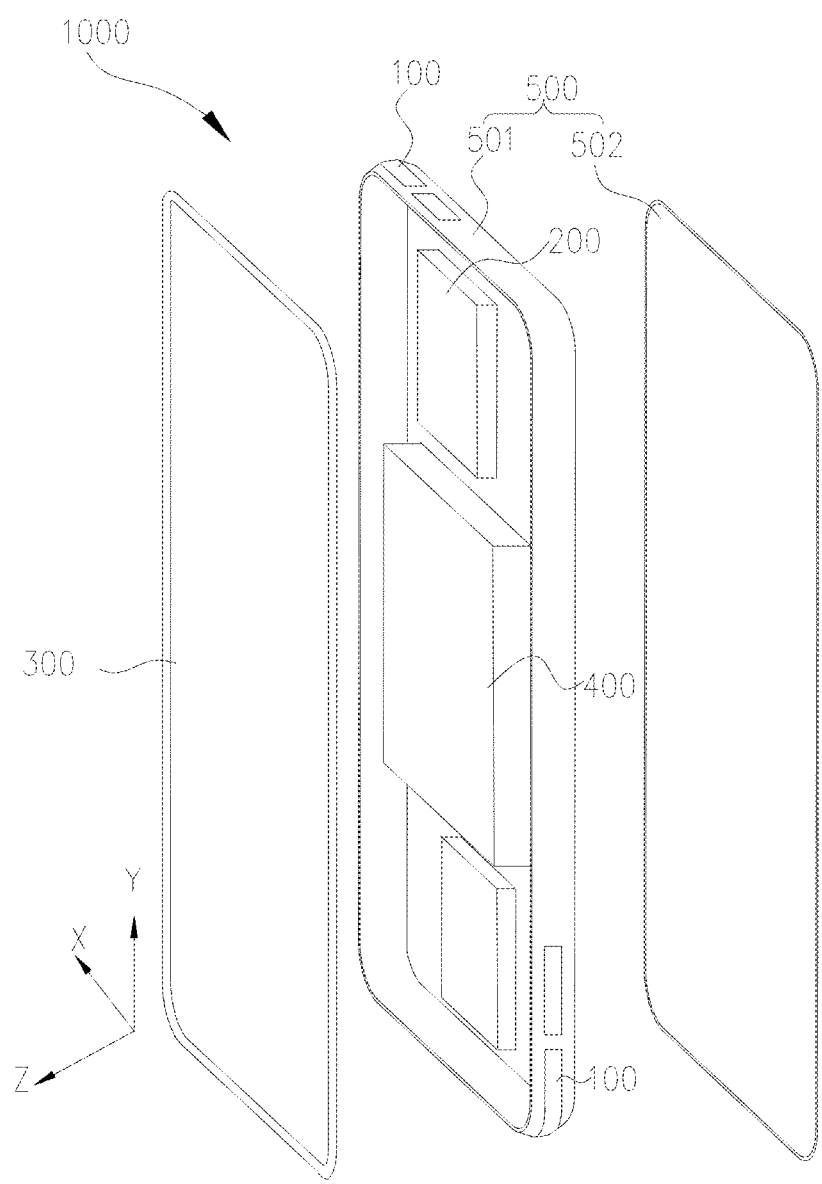
FIG. 2 is an exploded schematic diagram of the electronic device provided in FIG. 1.

Referring to FIG. 2, the electronic device 1000 provided in implementations of the present disclosure includes a display screen 300 and a housing 500 covering the display screen 300. The housing 500 includes a middle frame 501 and a rear cover 502 covering the middle frame 501. The rear cover 502 is disposed at a side of the middle frame 501 away from the display screen 300. The middle frame 501 includes a middle plate and an edge frame that surrounds and is connected with a periphery of the middle plate. Electronic components such as a main printed circuit board 200, a battery 400, etc., are disposed on the middle plate. An edge of the display screen 300, the edge frame, and the rear cover 502 are connected in sequence. The edge frame and the rear cover 502 may be integrally formed.

The electronic device 1000 further includes an antenna assembly 100. At least part of the antenna assembly 100 is disposed on or electrically connected with the main printed circuit board 200 of the electronic device 1000. The antenna assembly 100 is configured to transmit and receive a radio frequency (RF) signal to realize a communication function of the electronic device 1000.

Figure 3:
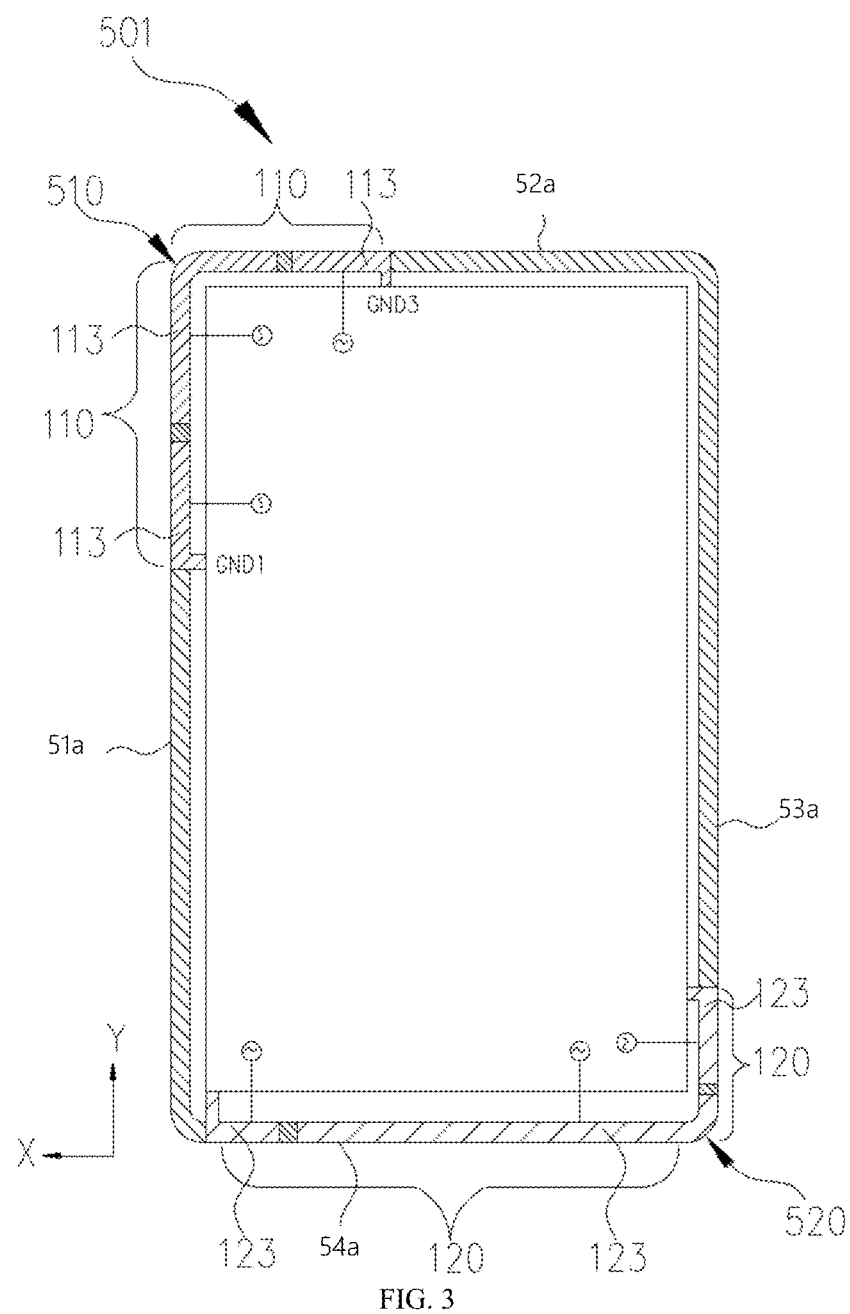
FIG. 3 is a schematic structural diagram of an antenna assembly disposed on a housing provided in implementations of the present disclosure.

Referring to FIG. 3, the antenna assembly 100 at least includes a first antenna module 110 and a second antenna module 120.

Referring to FIG. 3, the housing 500 includes a first corner portion 510 and a second corner portion 520 that are disposed diagonally. In one implementation, the housing 500 includes a first edge 51a, a second edge 52a, a third edge 53a, and a fourth edge 54a that are connected in sequence. The first edge 51a is disposed opposite to the third edge 53a. The second edge 52a is disposed opposite to the fourth edge 54a. A joint between the first edge 51a and the second edge 52a is the first corner portion 510. A joint between the third edge 53a and the fourth edge 54a is the second corner portion 520. In other words, the joint between the first edge 51a and the second edge 52a may include a connection point between the first edge 51a and the second edge 52a, part of the first edge 51a adjacent to the connection point, and part of the second edge 52a adjacent to the connection point. The joint between the third edge 53a and the fourth edge 54a may include a connection point between the third edge 53a and the fourth edge 54a, part of the third edge 53a adjacent to the connection point, and part of the fourth edge 54a adjacent to the connection point.

In one implementation, the first corner portion 510 and the second corner portion 520 each are disposed on an outer surface of the edge frame. Referring to FIG. 3, the first corner portion 510 may be an upper left corner of the housing 500, and the second corner portion 520 may be a lower right corner of the housing 500. In other implementations, the first corner portion 510 may be an upper right corner of the housing 500, and the second corner portion 520 may be a lower left corner of the housing 500; or the first corner portion 510 may be the lower left corner of the housing 500, and the second corner portion 520 may be the upper right corner of the housing 500; or the first corner portion 510 may be the lower right corner of the housing 500 and the second corner portion 520 may be the upper left corner of the housing 500.

Referring to FIG. 3, at least part of the first antenna module 110 is disposed at or close to the first corner portion 510. The first antenna module 110 includes a first radiating element 113. The first radiating element 113 is configured to transmit and receive a first electromagnetic wave signal, and generate a first induction signal when a subject to-be-detected is approaching. The first induction signal is used to feedback that the subject to-be-detected is approaching the first radiating element 113. The subject to-be-detected includes but is not limited to a human body. In implementations, the subject to-be-detected is the human body.

Figure 4:
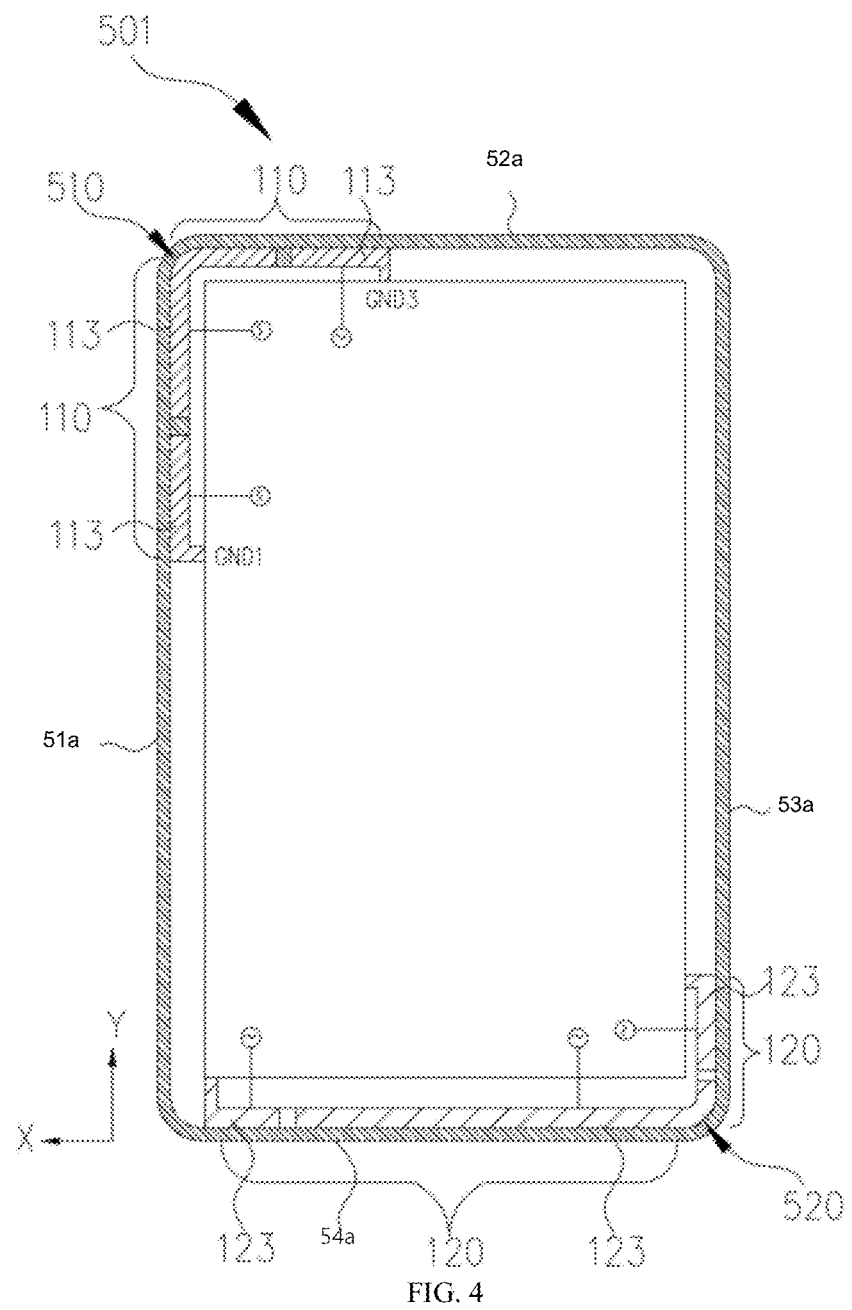
FIG. 4 is a schematic structural diagram of an antenna assembly disposed on a housing provided in other implementations of the present disclosure.

In one implementation, referring to FIG. 3 and FIG. 4, the first radiating element 113 may be disposed at the first corner portion 510. In this implementation, the first radiating element 113 may be integrated on the edge frame and/or a battery cover, and disposed at or close to the first corner portion 510; or the first radiating element 113 is disposed in a space defined by the housing 500 and is disposed at or close to the first corner portion 510, for example, the first radiating element 113 is molded on a flexible circuit board and attached to the first corner portion 510 at an inner side of the first corner portion 510. In implementations, part of the first radiating element 113 is disposed at the first edge 51a and the other part of the first radiating element 113 is disposed at the second edge 52a.

Referring to FIG. 3 and FIG. 4, at least part of the second antenna module 120 is disposed at or close to the second corner portion 520. The second antenna module 120 includes a second radiating element 123. The second radiating element 123 is configured to transmit and receive a second electromagnetic wave signal, and generate a second induction signal when the subject to-be-detected is approaching.

In one implementation, referring to FIG. 3 and FIG. 4, the second radiating element 123 may be disposed at the second corner portion 520. In this implementation, the second radiating element 123 may be integrated on the edge frame and/or the battery cover, and disposed at or close to the second corner portion 520; or the second radiating element 123 is disposed in the space defined by the housing 500 and is disposed at or close to the second corner portion 520, for example, the second radiating element 123 is molded on the flexible circuit board and attached to the second corner portion 520 at an inner side of the second corner portion 520. In implementations, part of the second radiating element 123 is disposed on the third edge 53a and the other part of the second radiating element 123 is disposed on the fourth edge 54a.

Referring to FIG. 1 and FIG. 2, the electronic device 1000 includes a front surface, a rear surface, a left side-surface, a right side-surface, an upper side-surface, and a lower side-surface. The front surface is disposed opposite to the rear surface. The front surface is a surface on which the display screen 300 is disposed and is also a surface facing a forward direction of axis Z. The rear surface is a surface on which the rear cover 502 is disposed and is also a surface facing a reverse direction of axis Z. The left side-surface is a surface facing a forward direction of axis X, and the right side-surface is a surface facing a reverse direction of axis X. The upper side-surface is a surface facing a forward direction of axis Y, and the lower side-surface is a surface facing a reverse direction of axis Y.

When the first radiating element 113 is disposed at the first corner portion 510, the first radiating element 113 is able to sense that the subject to-be-detected is approaching from the front surface, the rear surface, the left-side surface, and the upper side-surface. When the second radiating element 123 is disposed at the second corner portion 520, the second radiating element 123 is able to sense that the subject to-be-detected is approaching from the front surface, the rear surface, the right-side surface, and the lower side-surface. Therefore, by disposing the first radiating element 113 at the first corner portion 510 and disposing the second radiating element 123 at the second corner portion 520, the subject to-be-detected that is approaching from the front surface, the rear surface, the left side-surface, the right side-surface, the upper side-surface, and the lower side-surface can be sensed. In this way, by arranging a relatively small number of antenna assemblies 100, the subject to-be-detected that is approaching the electronic device 1000 can be omni-directionally sensed in a spherical range, and a sensing accuracy of the electronic device 1000 for the subject to-be-detected can be improved.

In the electronic device 1000 provided in implementations of the present disclosure, the first antenna module 110 and the second antenna module 120 are arranged at two corner portions of the electronic device 1000 respectively, the first antenna module 110 and the second antenna module 120 can not only transmit and receive electromagnetic wave signals, but also detect approach of the subject to-be-detected in a relatively large range by using the relatively small number of antenna modules 100 at two diagonally arranged corner portions, such that a functional integration of the antenna module 100 is improved, and promoting the miniaturization of the electronic device 1000 while improving a communication quality of the electronic device 1000 is improved, and miniaturization of the whole device of electronic device 1000 is promoted. The first antenna module 110 disposed at the first corner portion 510 and the second antenna module 120 disposed at the second corner portion 520 are combined to at least detect the approach of the subject to-be-detected form six surfaces of the electronic device 1000 (e.g., the six surfaces include the upper side-surface, the lower side-surface, the left side-surface, the right side-surface, the front surface, and the rear side-surface), such that the approach of the subject to-be-detected is detected omni-directionally, an intelligent detection efficiency of the electronic device 1000 for the approach of the subject to-be-detected is improved, an operating state of the electronic device 1000 is further determined effectively, which facilitates favorable response to the operating state of the electronic device 1000, and improves an intelligent characteristic of the electronic device 1000.

In one implementation, the first antenna module 110 and the second antenna module 120 may have the same radiation band or different radiation bands. In implementations, the first antenna module 110 and the second antenna module 120 have different radiation bands. The first antenna module 110 and the second antenna module 120 may have the same radiation structure or different radiation structures.

In one implementation, the first electromagnetic wave signal has a band at least covering a global positioning system L1 (GPS-L1) band, a wireless fidelity (Wi-Fi) 2.4 GHz (2.4G) band, a long term evolution middle high band (LTE-MHB), a new radio middle high band (NR-MHB), a new radio ultra-high band (NR-UHB), and a Wi-Fi 5 GHz (5G) band; and/or the second electromagnetic wave signal has a band at least covering a long term evolution lower band (LTE-LB), the LTE-MHB, a new radio lower band (NR-LB), the NR-MHB, and the NR-UHB. In other words, bands of electromagnetic wave signals transmitted and received by the first antenna module 110 cover application bands of GPS, Wi-Fi, the 4th generation mobile communication technology (4G), and the 5th generation mobile communication technology (5G). Bands of electromagnetic wave signals transmitted and received by the second antenna module 120 cover application bands such as lower band (LB), middle high band (MHB), ultra-high band (UHB), etc., of 4G and 5G. The first antenna module 110 and the second antenna module 120 are jointly disposed on the electronic device 1000, such that the electronic device 1000 can cover communication bands such as LB, MHB, and UHB of common GPS, Wi-Fi, and 4G/5G. In this way, in the electronic device 1000 provided in implementations of the present disclosure, the first antenna module 110 is disposed at the first corner portion 510 and the second antenna module 120 is disposed at the second corner portion 520, and a structure of the first antenna module 110 and a structure of the second antenna module 120 are designed, such that the first antenna module 110 and the second antenna module 120 can cover the communication bands such as LB, MHB, and UHB of the common GPS, Wi-Fi, and 4G/5G, and the electronic device 1000 has a high functional integration, a large detection range of the subject to-be-detected, a high detection accuracy, and a large coverage of an antenna signal.

The electronic device 1000 further includes a controller (not illustrated in the accompanying drawings) electrically connected with the first radiating element 113 and the second radiating element 123. The controller is configured to determine whether the subject to-be-detected is approaching the electronic device 1000 according to a magnitude of the first induction signal and a magnitude of the second induction signal. The first induction signal is not limited in the present disclosure, and the first induction signal may be a current signal, a voltage signal, etc.

In one implementation, when the controller detects that the first induction signal and the second induction signal each are less than a preset threshold, the controller determines that the subject to-be-detected is not approaching a periphery of the electronic device 1000. The preset threshold is not limited in the present disclosure, and the preset threshold may be an induction signal generated by a radiating element when a distance between the subject to-be-detected and the radiating element is 5 cm.

When the controller detects that the first induction signal is greater than the preset threshold and the second induction signal is less than the preset threshold, the controller determines that the subject to-be-detected is approaching the first edge 51a and the second edge 52a at which the first antenna module 110 of the electronic device 1000 is disposed, and no subject to-be-detected is approaching the third edge 53a and the fourth edge 54a at which the second antenna module 120 is disposed, which indicates that the electronic device 1000 is currently in an one-handed holding state at a side at which the first antenna module 110 is disposed. When the controller detects that the first induction signal is less than the preset threshold and the second induction signal is greater than the preset threshold, the controller is configured to determine that the subject to-be-detected is approaching the third edge 53a and the fourth edge 54a at which the second antenna module 120 of the electronic device 1000 is disposed, and no subject to-be-detected is approaching the first edge 51a and the second edge 52a at which the first antenna module 110 is disposed, which indicates that the electronic device 1000 is currently in the one-handed holding state at a side of at which the second antenna module 120 is disposed. When the controller detects that each of the first induction signal and the second induction signal is greater than the preset threshold, the controller determines that the electronic device 1000 is in a two-handed holding state at this time.

After the controller determines that the electronic device 1000 is in the one-handed holding state or the two-handed holding state, the antenna module disposed at an unblock position can be switched to operate, such that an influence on the communication quality is reduced when the antenna assembly 100 is in the one-handed holding state or the two-handed holding state, the antenna assembly 100 can be switched intelligently, and an intelligence of the electronic device 1000 is improved.

In implementations, the electronic device 1000 further includes a functional device (not illustrated in the accompanying drawings). The controller is electrically connected with functional device. The controller is configured to determine an operating state of the electronic device 1000 according to a magnitude of the first induction signal, a magnitude of the second induction signal, and an operating state of the functional device, and adjust power of the first antenna module 110 and power of the second antenna module 120 or control enabling and disabling of the first antenna module 110 and enabling and disabling of the second antenna module 120, according to the operating state of the electronic device 1000. The functional device includes a display screen 300 and a receiver (not illustrated in the accompanying drawings).

In one implementation, when the controller detects that each of the first induction signal and the second induction signal is greater than the preset threshold and the receiver is in an operating state, the controller determines that the subject to-be-detected is approaching each of a position at which the first antenna module 110 is disposed and a position at which the second antenna module 120 is disposed, and the receiver is in the operating state, which indicates that the electronic device 1000 is in a state of approaching a head of the subject to-be-detected, that is, a head of a human body is close to the electronic device 1000 while making a phone call. Here, the controller can control the power of the first antenna module 110 and the power of the second antenna module 120 to be reduced, to reduce a specific absorption rate of the human head for electromagnetic wave signals, thereby improving a safety of the electronic device 1000.

In one implementation, when the controller detects that each of the first induction signal and the second induction signal is greater than the preset threshold and the display screen 300 is in a non-display state, the controller determines that the subject to-be-detected is approaching each of the position at which the first antenna module 110 is disposed and the position at which the second antenna module 120 is disposed, and the display screen 300 is in the non-display state, which indicates that the electronic device 1000 may be in a carry state. The carry state may be a state where the electronic device 1000 is accommodated in a clothing pocket of the subject to-be-detected, the electronic device 1000 is accommodated in a carry-on bag such as a schoolbag, a purse, and a mobile-phone bag close to the subject to-be-detected, or the electronic device 1000 is worn on a body of the subject to-be-detected through a rope, a wristband, etc., which is not limited herein. Here, the controller is configured to control each of the power of the first antenna module 110 and the power of the second antenna module 120 to be reduced, such that electromagnetic radiation of the electronic device 1000 for the human body is reduced, and the specific absorption rate of the human head for the electromagnetic wave signals is reduced, thereby improving the safety of the electronic device 1000. In implementations, whether the receiver is in the operating state can be further detected. If the receiver is in a non-operating state, the electronic device 1000 can be directly determined to be in a state of being accommodated in the clothing pocket of the subject to-be-detected. If the receiver is in the operating state, the electronic device 1000 can be determined to be in the state of being accommodated in the clothing pocket of the subject to-be-detected or a state of making a phone call, and the controller can control each of the power of the first antenna module 110 and the power of the second antenna module 120 to be reduced.

Figure 5:
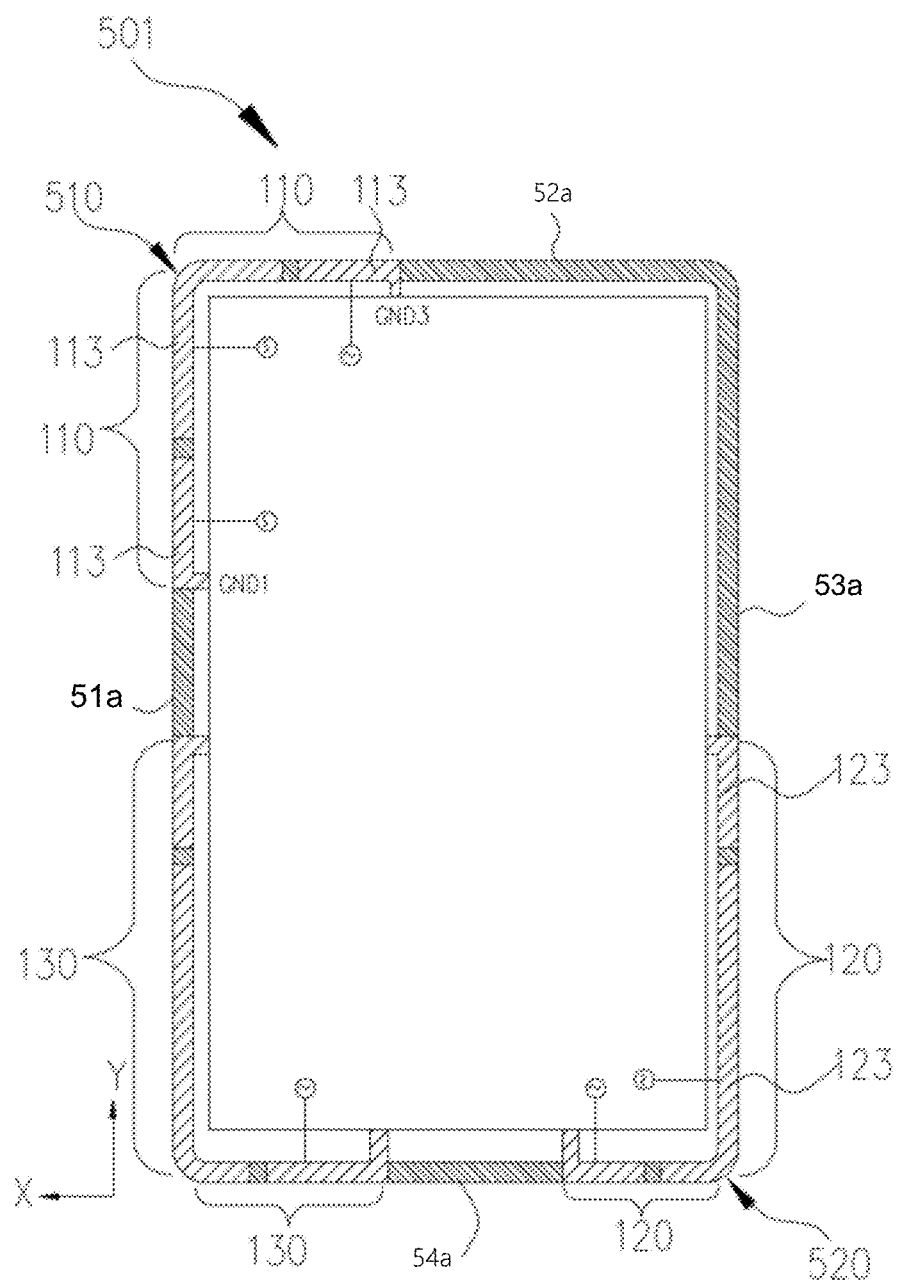
FIG. 5 is a schematic structural diagram of an antenna assembly disposed on a housing provided in other implementations of the present disclosure.

In one implementation, referring to FIG. 5, the electronic device 1000 further at least includes one third antenna module 130. A radiation band of the at least one third antenna module 130 and a radiation band of the second antenna module 120 may be completely the same, partially overlapped, or completely non-overlapped. In one implementation, the at least one third antenna module 130 may have a structure the same as the second antenna module 120. In implementations, the radiation band of the at least one third antenna module 130 is at least partially overlapped with the radiation band of the second antenna module 120.

Referring to FIG. 5, the third antenna module 130 is spaced apart from the second antenna module 120. For example, the third antenna module 130 is disposed at or close to a joint between the fourth edge 54*a* and the first edge 51*a*. In other implementations, the third antenna module 130 is disposed at or close to a joint between the second edge 52*a* and the third edge 53*a*, or the third module 130 is disposed at at least one of the first edge 51*a*, the second edge 52*a*, the third edge 53*a*, or the fourth edge 54*a*.

Figure 6:
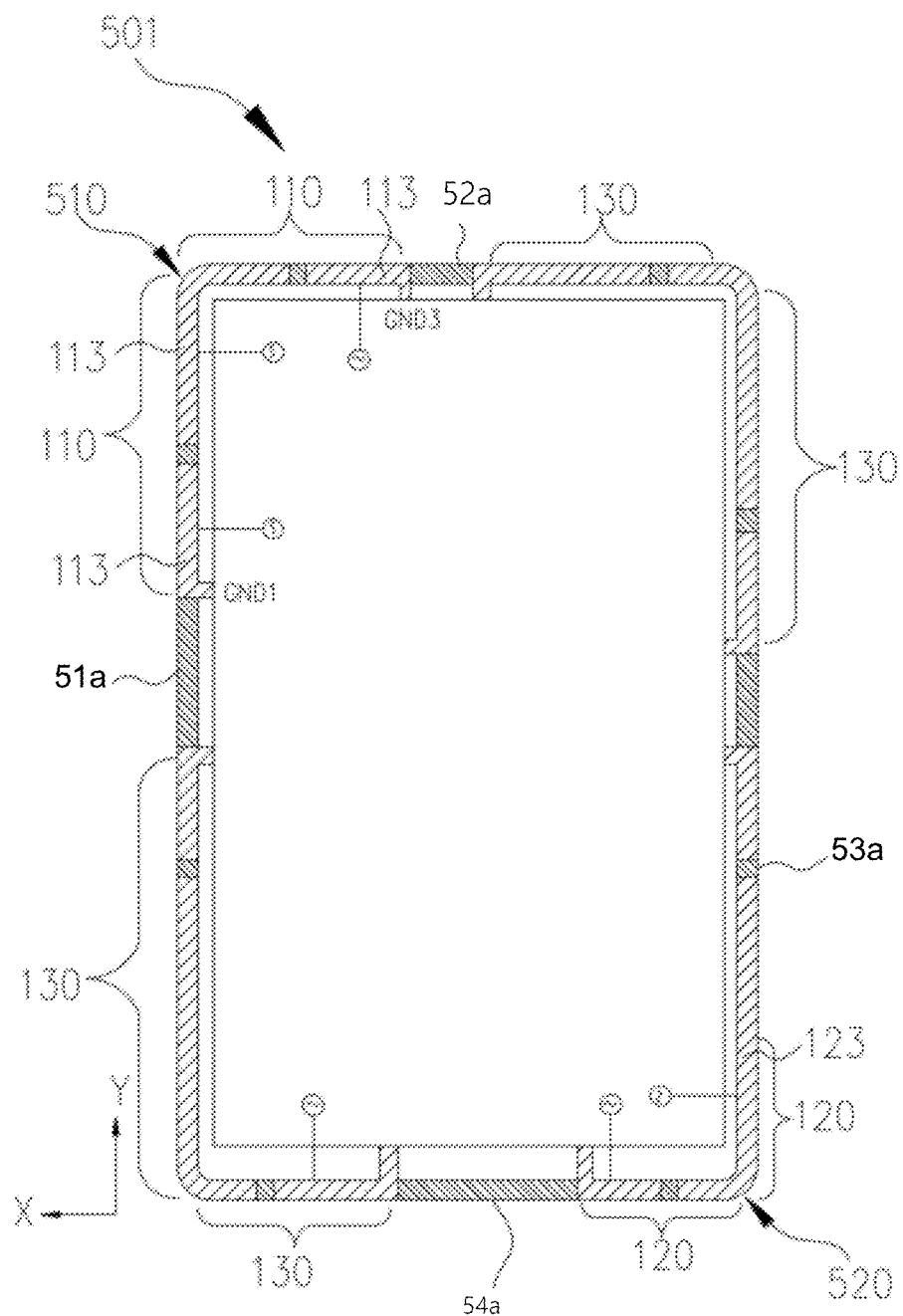
FIG. 6 is a schematic structural diagram of an antenna assembly disposed on a housing provided in other implementations of the present disclosure.

In another implementation, referring to FIG. 6, there may be multiple third antenna modules 130. One third antenna module 130 is disposed at the joint between the fourth edge 54*a* and the first edge 51*a*, and the other third antenna module 130 is disposed at the joint between the second edge 52*a* and the third edge 53*a*.

The controller is further configured to determine that the electronic device 1000 is in the holding state at an edge or a corner at which the second antenna module 120 is disposed when the second induction signal is detected to be greater than the preset threshold and the first induction signal is detected to be less than the preset threshold. Here, the controller may control the power of the second antenna module 120 to increase by adjusting a frequency-tuning (FT) circuit of the second antenna module 120, such that the communication quality of the second antenna module 120 is prevented from being deteriorated due to being held, the communication quality is still good even if the second antenna module 120 is blocked, and a performance of intelligent adjustment communication of the electronic device 1000 is improved; and/or the controller may also control an unblocked third antenna module 130 to start operating, and when the third antenna module 130 starts operating, the second antenna module 120 may be turned off or continue to operate; or the controller may control the power of the third antenna module 130 that has been in the operating state to increase to ensure the communication quality of the electronic device 1000.

In one implementation, the electronic device 1000 further at least includes one fourth antenna module 140. The at least one fourth antenna module 140 has a radiation band the same as the first antenna module 110, such that when the first antenna module 110 is blocked, the at least one fourth antenna module 140 is turned on or operating power of the at least one fourth antenna module 140 is increased.

Figure 7:
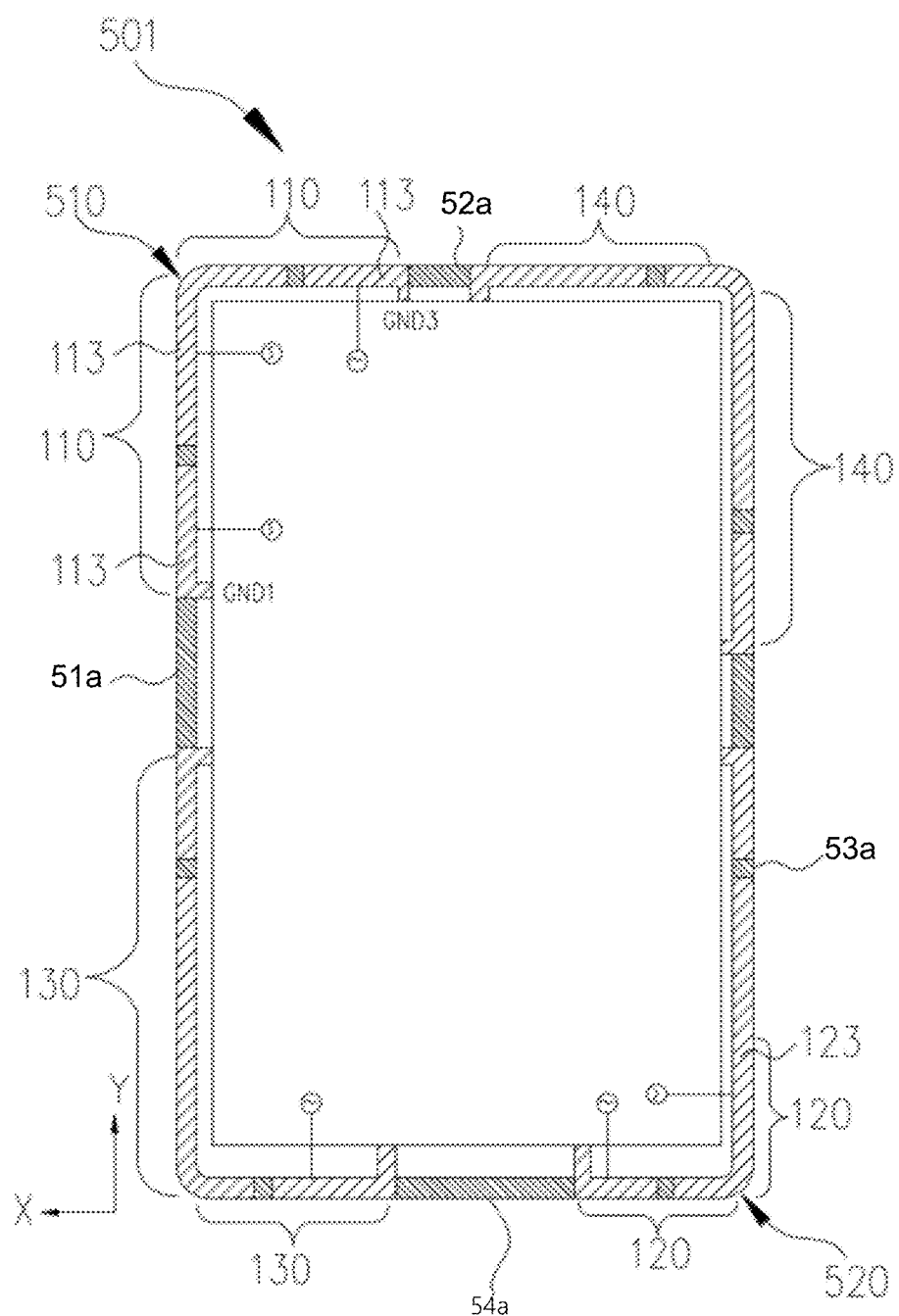
FIG. 7 is a schematic structural diagram of an antenna assembly disposed on a housing provided in other implementations of the present disclosure.

Referring to FIG. 7, the electronic device 1000 at least includes one third antenna module 130 and at least one fourth antenna module 140. The at least one third antenna module 130 has a radiation band the same as the second antenna module 120. The at least one fourth antenna module 140 has a radiation band the same as the first antenna module 110. The third antenna module 130 and the fourth antenna module 140 each are disposed at or close to the joint between the second edge 52*a* and the third edge 53*a* or the joint between the fourth edge 54*a* and the first edge 51*a*, or the third antenna module 130 and the fourth antenna module 140 each are disposed at at least one of the first edge 51*a*, the second edge 52*a*, the third edge 53*a*, or the fourth edge 54*a*.

The controller is further configured to determine that the electronic device 1000 is in the holding state at both an edge or a corner at which the first antenna module 110 is disposed and an edge or a corner at which the second antenna module 120, when the first induction signal and the second induction signal each are detected to be greater than the preset threshold. The controller may control power of the first antenna module 110 to increase by adjusting a FT circuit of the first antenna module 110 and control the power of the second antenna module 120 to increase by adjusting the FT circuit of the second antenna module 120; and/or the controller may also control the at least one third antenna module 130 to start operating or increase power, and control the at least one fourth antenna module 140 to start operating or increase power, such that the communication quality of the first antenna module 110 and the communication quality of the second antenna module 120 are prevented from being deteriorated due to being held, the communication quality is still good even if the first antenna module 110 and the second antenna module 120 are blocked, and the performance of intelligent adjustment communication of the electronic device 1000 is improved.

In other implementations, the controller can also determine a state of the electronic device 1000 through sensors such as a gyroscope sensor in the electronic device 1000, and then adjust power of each antenna module according to the state of the electronic device 1000, so as to intelligently adjust the specific absorption rate of the human body for the electromagnetic wave signals and improve the safety of the electronic device 1000.

The structure of the first antenna module 110 in implementations of the present disclosure will be described in detail below with reference to the accompanying drawings.

Figure 8:
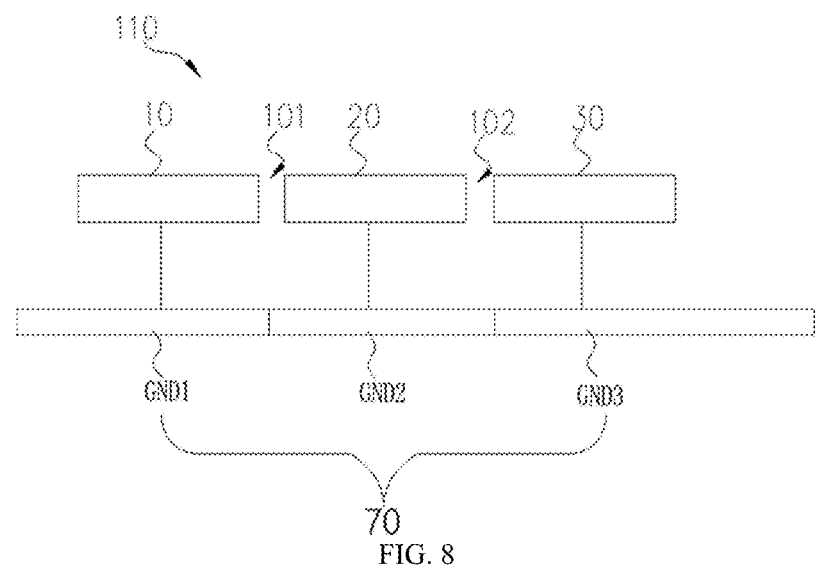
FIG. 8 is a schematic structural diagram of an antenna module provided in implementations of the present disclosure.
Figure 9:
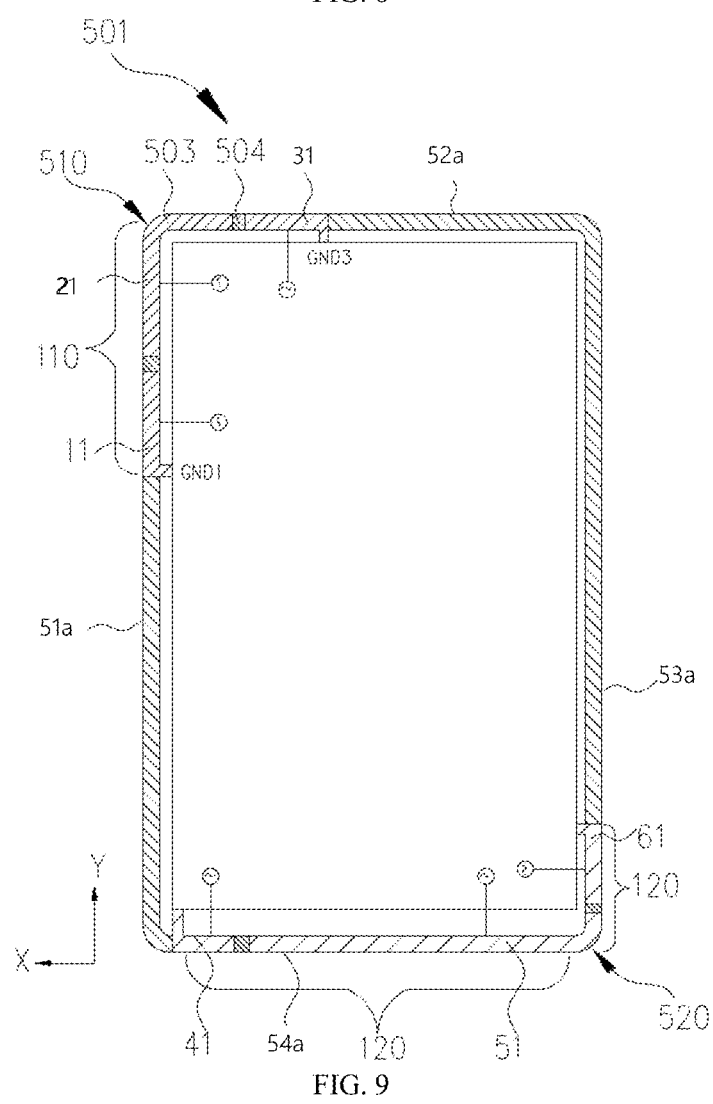
FIG. 9 is a schematic structural diagram of an antenna assembly disposed on a housing provided in other implementations of the present disclosure.

Referring to FIG. 8 and FIG. 9, the first antenna module 110 includes a first antenna element 10, a second antenna element 20, and a third antenna element 30 that are disposed in sequence. The first antenna element 10 includes a first radiator 11. The second antenna element 20 includes a second radiator 21. The third antenna element 30 includes a third radiator 31. The first radiating element 113 is formed by at least one of the first radiator 11, the second radiator 21, or the third radiator 31. In implementations, for example, the first radiating element 113 includes the first radiator 11, the second radiator 21, and the third radiator 31. A first gap 101 is defined between the first radiator 11 and the second radiator 21, and the first radiator 11 is capacitively coupled with the second radiator 21 through the first gap 101. A second gap 102 is defined between the second radiator 21 and the third radiator 31, and the second radiator 21 is capacitively coupled with the third radiator 31 through the second gap 102.

In an implementation, referring to FIG. 8 and FIG. 9, the first antenna element 10 and part of the second antenna element 20 are disposed at the first edge 51a, and the third antenna element 30 and the other part of the second antenna element 20 are disposed at the second edge 52a.

Part of the second radiator 21 is disposed at or close to the first edge 51a of the housing 500. The other part of the second radiator 21 is disposed at or close to the second edge 52a of the housing 500. The first radiator 11 and the third radiator 31 are disposed at different edges. For example, the first radiator 11 is disposed at the first edge 51a, and the third radiator 31 is disposed at the second edge 52a; or the first radiator 11 is disposed at the second edge 52a, and the third radiator 31 is disposed at the first edge 51a.

Part of the first radiating element 113 is disposed at or close to the first edge 51a of the housing 500, and implementations include but are not limited to the following.

In an implementation, referring to FIG. 9, the first radiator 11, the second radiator 21, and the third radiator 31 are integrated as part of the housing 500. Further, the first radiator 11, the second radiator 21, and the third radiator 31 are embedded in the middle frame 501 to form part of the middle frame 501.

In one implementation, referring to FIG. 9, the middle frame 501 includes multiple metal sections 503 and insulating sections 504, and an insulating section 504 is disposed between two adjacent metal sections 503. The multiple metal sections 503 form the first radiator 11, the second radiator 21, and the third radiator 31 respectively. An insulating section 504 between the first radiator 11 and the second radiator 21 is filled in the first gap 101, and an insulating section 504 between the second radiator 21 and the third radiator 31 is filled in the second gap 102. Alternatively, the first radiator 11, the second radiator 21, and the third radiator 31 are embedded in the battery cover 502 to form part of the battery cover 502.

In another implementation, the first antenna module 110 is disposed in the housing 500. The first radiator 11, the second radiator 21, and the third radiator 31 may be molded on the flexible circuit board and attached to an inner surface of the housing 500 or the like.

At least one of the first radiator 11, the second radiator 21, or the third radiator 31 is configured to generate the first induction signal when the subject to-be-detected is approaching. In implementations, the second radiator 21 may serve as a detection electrode for detecting approach of the subject to-be-detected. In other implementations, the first radiator 11 and the third radiator 31 may serve as detection electrodes for detecting the approach of the subject to-be-detected. In other implementations, the first radiator 11, the second radiator 21, and the third radiator 31 may all serve as detection electrodes for detecting the approach of the subject to-be-detected.

It can be understood that the first radiator 11, the second radiator 21, and the third radiator 31 are all made of conductive materials to serve as inductive electrodes. When the human body is approaching, charges carried by the human body change charges of the inductive electrodes, thereby generating the first induction signal.

In this implementation, the first electromagnetic wave signal has a band at least covering the GPS-L1 band, the Wi-Fi 2.4G band, the LTE-MHB, the NR-MHB, the NR-UHB, and the Wi-Fi 5G band.

In one implementation, the first antenna element 10 is configured to transmit and receive an electromagnetic wave signal at least covering the LTE-MHB, the NR-MHB, and the NR-UHB; and/or the second antenna element 20 is configured to transmit and receive an electromagnetic wave signal at least covering the GPS-L1 band, the Wi-Fi 2.4G band, the LTE-MHB, and the NR-MHB; and/or, the third antenna element 30 is configured to transmit and receive an electromagnetic wave signal at least covering the NR-UHB and the Wi-Fi 5G band.

The structure of the second antenna module 120 in implementations of the present disclosure will be described in detail below with reference to the accompanying drawings.

Figure 10:
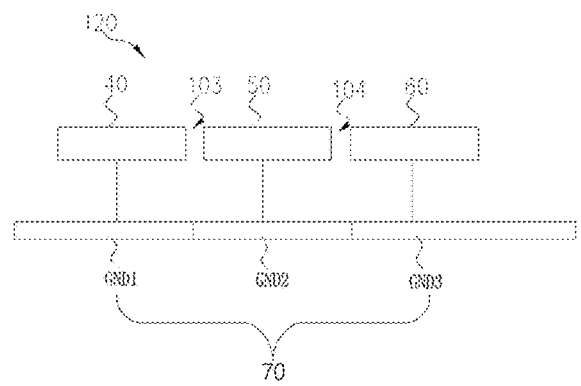
FIG. 10 is a schematic structural diagram of an antenna module provided in other implementations of the present disclosure.

Referring to FIG. 10, the second antenna module 120 includes a fourth antenna element 40, a fifth antenna element 50, and a sixth antenna element 60 that are disposed in sequence. The fourth antenna element 40 includes a fourth radiator 41. The fifth antenna element 50 includes a fifth radiator 51. The sixth antenna element 60 includes a sixth radiator 61. The second radiating element 123 is formed by at least one of the fourth radiator 41, the fifth radiator 51, or the sixth radiator 61. In implementations, for example, the second radiating element 123 includes the fourth radiator 41, the fifth radiator 51, and the sixth radiator 61.

A third gap 103 is defined between the fourth radiator 41 and the fifth radiator 51, and the fourth radiator 41 is capacitively coupled with the fifth radiator 51 through the third gap 103. A fourth gap 104 is defined between the fifth radiator 51 and the sixth radiator 61, and the fifth radiator 51 is capacitively coupled with the sixth radiator 61 through the fourth gap 104.

Referring to FIG. 9, part of the fifth radiator 51 is disposed at or close to the third edge 53a of the housing 500. The other part of the fifth radiator 51 is disposed at or close to the fourth edge 54a of the housing 500. The fourth radiator 41 and the sixth radiator 61 are disposed at different edges. For example, the fourth radiator 41 is disposed at the third edge 53a, and the sixth radiator 61 is disposed at the fourth edge 54a; or the fourth radiator 41 is disposed at the fourth edge 54a and the sixth radiator 61 is disposed at the third edge 53a.

At least one of the fourth radiator 41, the fifth radiator 51, or the sixth radiator 61 is configured to generate the second induction signal when the subject to-be-detected is approaching. In implementations, the fifth radiator 51 may serve as a detection electrode for detecting approach of the subject to-be-detected. In other implementations, the fourth radiator 41 and the sixth radiator 61 may serve as detection electrodes for detecting the approach of the subject to-be-detected. In other implementations, the fourth radiator 41, the fifth radiator 51, and the sixth radiator 61 may all serve as detection electrodes for detecting the approach of the subject to-be-detected.

It can be understood that the fourth radiator 41, the fifth radiator 51, and the sixth radiator 61 are all made of conductive materials to serve as inductive electrodes. When the human body is approaching, charges carried by the human body change charges of the inductive electrodes, thereby generating the second induction signal.

The second electromagnetic wave signal has a band at least covering the LTE-LB, the LTE-MHB, the NR-LB, the NR-MHB, and the NR-UHB. In one implementation, the fourth antenna element 40 is configured to transmit and receive an electromagnetic wave signal at least covering the LTE-MHB, the LTE-UHB, the NR-MHB, and the NR-UHB. The fifth antenna element 50 is configured to transmit and receive an electromagnetic wave signal at least covering the LTE-LB. The sixth antenna element 60 is configured to transmit and receive an electromagnetic wave signal at least covering the LTE-MHB, the LTE-UHB, the NR-MHB, and the NR-UHB.

A specific structure of the first antenna element 10, a specific structure of the second antenna element 20, and a specific structure of the third antenna element 30 of the first antenna module 110 will be described below with reference to the accompanying drawings.

In implementations, the first radiator 11 has a strip shape. The first radiator 11 may be molded on the housing 500 or a carrier in the housing 500 by coating, printing, or the like. An extension trajectory of the first radiator 11 includes, but is not limited to, a straight line, a broken line, a curve, etc. In implementations, the extension trajectory of the first radiator 11 is the straight line. The shape of the first radiator 11 on the extension trajectory may be a line with a uniform width, or a line with different widths such as a line with a gradually changing width, a line with a widening region, etc.

Figure 11:
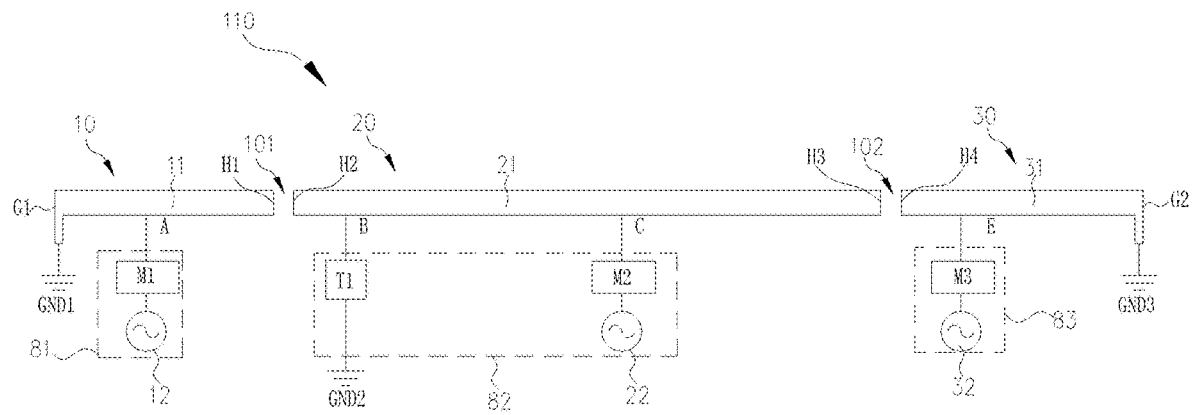
FIG. 11 is a schematic structural diagram of the first antenna module in FIG. 9 provided in implementations of the present disclosure.

Referring to FIG. 11, the first radiator 11 includes a first ground end G1, a first coupling end H1, and a first feed point A disposed between the first ground end G1 and the first coupling end H1. The first ground end G1 and the first coupling end H1 are two ends of the first radiator 11 respectively.

The first ground end G1 is electrically connected with reference ground 70. The reference ground 70 includes a first reference ground GND1. The first ground end G1 is electrically connected with the first reference ground GND1.

Referring to FIG. 11, a first RF front-end unit 81 at least includes a first signal source 12 and a first frequency-selective filter circuit M1.

Referring to FIG. 11, the first frequency-selective filter circuit M1 is disposed between the first feed point A and the first signal source 12. In one implementation, the first frequency-selective filter circuit M1 has an input end electrically connected with an output end of the first signal source 12, and the first frequency-selective filter circuit M1 has an output end electrically connected with the first feed point A of the first radiator 11. The first signal source 12 is configured to generate an excitation signal (which is also called a RF signal). The first frequency-selective filter circuit M1 is configured to filter out a clutter in the excitation signal transmitted by the first signal source 12, so as to form a first RF signal and transmit the first RF signal to the first radiator 11, such that the first radiator 11 transmits and receives a first electromagnetic wave sub-signal.

Referring to FIG. 11, in implementations, the second radiator 21 has a strip shape. The second radiator 21 may be molded on the housing 500 or on a carrier in the housing 500 by coating, printing, or the like. An extension trajectory of the second radiator 21 includes, but is not limited to, a straight line, a broken line, a curve, etc. In implementations, the extension trajectory of the second radiator 21 is the straight line. The shape of the second radiator 21 on the extension trajectory may be a line with a uniform width, or a line with different widths such as a line with a gradually changing width, a line with a widening region, etc.

Referring to FIG. 11, the second radiator 21 includes a second coupling end H2, a third coupling end H3 disposed opposite to the second coupling end H2, and a second feed point C disposed between the second coupling end H2 and the third coupling end H3.

The second coupling end H2 is spaced apart from the first coupling end H1 to define the first gap 101. In other words, the first gap 101 is defined between the second radiator 21 and the first radiator 11. The first radiator 11 is capacitively coupled with the second radiator 21 through the first gap 101. "Capacitive coupling" means that an electric field is generated between the first radiator 11 and the second radiator 21, a signal of the first radiator 11 can be transmitted to the second radiator 21 through the electric field, and a signal of the second radiator 21 can be transmitted to the first radiator 11 through the electric field, such that electrical signal conduction between the first radiator 11 and the second radiator 21 can still be realized even if the first radiator 11 is disconnected from the second radiator 21.

Referring to FIG. 11, a second RF front-end unit 82 includes a second signal source 22 and a second frequency-selective filter circuit M2. The reference ground 70 further includes a second reference ground GND2. The second reference ground GND2 and the first reference ground GND1 may be the same reference ground or different reference grounds.

Referring to FIG. 11, the second frequency-selective filter circuit M2 is disposed between the second feed point C and the second signal source 22. In one implementation, the second frequency-selective filter circuit M2 has an input end electrically connected with the second signal source 22, and the output end electrically connected with the second radiator 21. The second signal source 22 is configured to generate an excitation signal. The second frequency-selective filter circuit M2 is configured to filter out a clutter in the excitation signal transmitted by the second signal source 22, so as to form a second RF signal and transmit the second RF signal to the second radiator 21, such that the second radiator 21 transmits and receives a second electromagnetic wave sub-signal.

In implementations, the third radiator 31 has a strip shape. The third radiator 31 may be molded on the housing 500 or on a carrier in the housing 500 by coating, printing, or the like. An extension trajectory of the third radiator 31 includes, but is not limited to, a straight line, a broken line, a curve, etc. In implementations, the extension trajectory of the third radiator 31 is the straight line. The shape of the third radiator 31 on the extension trajectory may be a line with a uniform width, or a line with different widths such as a line with a gradually changing width, a line with widening region, etc.

Referring to FIG. 11, the third radiator 31 includes a fourth coupling end H4, a second ground end G2, and a third feed point E disposed between the fourth coupling end H4 and the second ground end G2. The fourth coupling end H4 and the second ground end G2 are two ends of the third radiator 31. The second gap 102 is defined between the fourth coupling end H4 and the third coupling end H3.

Referring to FIG. 11, a third RF front-end unit 83 includes a third signal source 32 and a third frequency-selective filter circuit M3.

The third frequency-selective filter circuit M3 has one end electrically connected with the third feed point E, and the other end electrically connected with the third signal source 32. The third frequency-selective filter circuit M3 is configured to filter out a clutter in a RF signal transmitted by the third signal source 32 to form a third RF signal, and transmit the third RF signal to the third radiator 31 to excite the third radiator 31 to transmit and receive a third electromagnetic wave signal.

Referring to FIG. 8 and FIG. 11, the reference ground 70 further includes a third reference ground GND3. The third frequency-selective filter circuit M3 and the second ground end G2 each are electrically connected with the third reference ground GND3. In one implementation, the third reference ground GND3, the second reference ground GND2, and the first reference ground GND1 may have an integral structure or separate structures.

A specific forming manner of each of the first radiator 11, the second radiator 21, and the third radiator 31 is not limited in the present disclosure. Each of the first radiator 11, the second radiator 21, and the third radiator 31 includes, but is not limited to, at least one of a flexible printed circuit (FPC) antenna radiator, a laser direct structuring (LDS) antenna radiator, a print direct structuring (PDS) antenna radiator, or a metal branch.

In one implementation, a material of each of the first radiator 11, the second radiator 21, and the third radiator 31 is a conductive material, and the specific material includes, but is not limited to, a metal, a transparent conductive oxide (e.g., indium tin oxide (ITO)), a carbon nanotube, graphene, etc. In implementations, the material of each of the first radiator 11, the second radiator 21, and the third radiator 31 is a metal material, such as silver, copper, etc.

In one implementation, when the first antenna module 110 is applied to the electronic device 1000, the first signal source 12, the second signal source 22, the third signal source 32, the first frequency-selective filter circuit M1, the second frequency-selective filter circuit M2, and the third frequency-selective filter circuit M3 are all disposed on the main printed circuit board 200 of the electronic device 1000.

In one implementation, the first signal source 12, the second signal source 22, and the third signal source 32 are the same signal source, or the first signal source 12, the second signal source 22, and the third signal source 32 are different sources.

In one implementation, the first signal source 12, the second signal source 22, and the third signal source 32 are the same signal source. The same signal source is configured to transmit excitation signals towards the first frequency-selective filter circuit M1, the second frequency-selective filter circuit M2, and the third frequency-selective filter circuit M3 respectively. Since the first frequency-selective filter circuit M1, the second frequency-selective filter circuit M2, and the third frequency-selective filter circuit M3 have different circuit structures, the first frequency-selective filter circuit M1, the second frequency-selective filter circuit M2, and the third frequency-selective filter circuit M3 have different gated bands, such that the first radiator 11, the second radiator 21, and the third radiator 31 respectively transmit and receive a first electromagnetic wave, a second electromagnetic wave, and a third electromagnetic wave under different excitation signals. In addition, a band of the first electromagnetic wave sub-signal, a band of the second electromagnetic wave sub-signal, and a band of the third electromagnetic wave signal are different from one another, such that the first antenna module 110 covers a relatively wide band, a signal transceiving isolation between various antenna elements is relatively high, and interference is little.

In another possible implementation, the first signal source 12, the second signal source 22, and the third signal source 32 are different from one another. The first signal source 12, the second signal source 22, and the third signal source 32 may be integrated on the same chip or separately packaged on different chips. The first signal source 12 is configured to generate a first excitation signal. The first excitation signal is filtered by the first frequency-selective filter circuit M1 to form the first RF signal. The first RF signal is loaded on the first radiator 11, such that the first radiator 11 transmits and receives the first electromagnetic wave sub-signal. The second signal source 22 is configured to generate a second excitation signal. The second excitation signal is filtered by the second frequency-selective filter circuit M2 to form the second RF signal. The second RF signal is loaded on the second radiator 21, such that the second radiator 21 transmits and receives the second electromagnetic wave sub-signal. The third signal source 32 is configured to generate the third excitation signal. The third excitation signal is filtered by the third frequency-selective filter circuit M3 to form the third RF signal. The third RF signal is loaded on the third radiator 31, such that the third radiator 31 transmits and receives the third electromagnetic wave signal.

In this implementation, by disposing the first frequency-selective filter circuit M1, the second frequency-selective filter circuit M2, and the third frequency-selective filter circuit M3, the first antenna element 10, the second antenna element 20, and the third antenna element 30 can transmit and receive electromagnetic wave signals of different bands, thereby improving isolation between the first antenna element 10, the second antenna element 20, and the third antenna element 30. In other words, the first frequency-selective filter circuit M1, the second frequency-selective filter circuit M2, and the third frequency-selective filter circuit M3 can also make the electromagnetic wave signals transmitted and received by the first antenna element 10, the second antenna element 20, and the third antenna element 30 have little or no interference with one another.

It can be understood that the first frequency-selective filter circuit M1 includes, but is not limited to, capacitors, inductors, resistors, etc. connected in series and/or in parallel. The first frequency-selective filter circuit M1 may include multiple branches formed by the capacitors, the inductors, and the resistors connected in series and/or in parallel, and switches for controlling on/off of the multiple branches. By controlling on/off of different switches, frequency-selective parameters (including a resistance value, an inductance value, and a capacitance value) of the first frequency-selective filter circuit M1 can be adjusted, and then a filtering range of the first frequency-selective filter circuit M1 can be adjusted, such that the first frequency-selective filter circuit M1 can obtain the first RF signal from the excitation signal transmitted by the first signal source 12, and then the first antenna element 10 can transmit and receive the first electromagnetic wave sub-signal. Similarly, the second frequency-selective filter circuit M2 and the third frequency-selective filter circuit M3 each include multiple branches formed by capacitors, inductors, and resistors connected in series and/or in parallel, and switches for controlling the on/off of the multiple branches. In one implementation, the first frequency-selective filter circuit M1, the second frequency-selective filter circuit M2, and the third frequency-selective filter circuit M3 have different structures. The first frequency-selective filter circuit M1 is configured to adjust an impedance of a radiator electrically connected with the first frequency-selective filter circuit M1, such that the impedance of the radiator electrically connected with the first frequency-selective filter circuit M1 matches a frequency at which the radiator generates resonance, thereby realizing relatively large transceiving power of the radiator. The second frequency-selective filter circuit M2 is configured to adjust an impedance of a radiator electrically connected with the second frequency-selective filter circuit M2, such that the impedance of the radiator electrically connected with the second frequency-selective filter circuit M2 matches a frequency at which the radiator generates resonance, thereby realizing relatively large transceiving power of the radiator. The third frequency-selective filter circuit M3 is configured to adjust an impedance of a radiator electrically connected with the third frequency-selective filter circuit M3, such that the impedance of the radiator electrically connected with the third frequency-selective filter circuit M3 matches a frequency at which the radiator generates resonance, thereby realizing relatively large transceiving power of the radiator. Therefore, the first frequency-selective filter circuit M1, the second frequency-selective filter circuit M2, the third frequency-selective filter circuit M3 each can also be called a matching circuit.

Referring to FIG. 12 to FIG. 19, FIG. 12 to FIG. 19 are schematic diagrams of first frequency-selective filter circuits M1 provided by various implementations. The first frequency-selective filter circuit M1 includes one or more of following circuits.

Figures 12, 13:
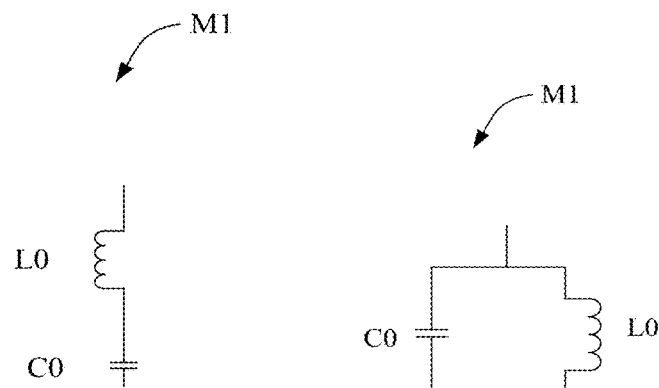
FIG. 12 is a schematic structural diagram of a first frequency-selective filter circuit provided in implementations of the present disclosure.
FIG. 13 is a schematic structural diagram of a first frequency-selective filter circuit provided in other implementations of the present disclosure.

Referring to FIG. 12, the first frequency-selective filter circuit M1 includes a band-pass circuit formed by an inductor L0 and a capacitor C0 connected in series.

Referring to FIG. 13, the first frequency-selective filter circuit M1 includes a band-stop circuit formed by an inductor L0 and a capacitor C0 connected in parallel.

Figure 14:
FIG. 14 is a schematic structural diagram of a first frequency-selective filter circuit provided in other implementations of the present disclosure.

Referring to FIG. 14, the first frequency-selective filter circuit M1 includes an inductor L0, a first capacitor C1, and a second capacitor C2. The inductor L0 is connected with the first capacitor C1 in parallel, and the second capacitor C2 is electrically connected with a node where the inductor L0 is electrically connected with the first capacitor C1.

Figure 15:
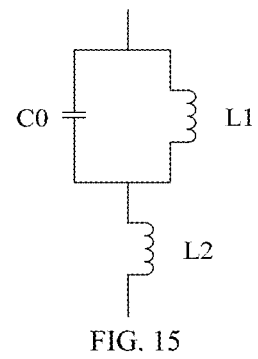
FIG. 15 is a schematic structural diagram of a first frequency-selective filter circuit provided in other implementations of the present disclosure.

Referring to FIG. 15, the first frequency-selective filter circuit M1 includes a capacitor C0, a first inductor L1, and a second inductor L2. The capacitor C0 is connected with the first inductor L1 in parallel, and the second inductor L2 is electrically connected with a node where the capacitor C0 is electrically connected with the first inductor L1.

Figure 16:
FIG. 16 is a schematic structural diagram of a first frequency-selective filter circuit provided in other implementations of the present disclosure.

Referring to FIG. 16, the first frequency-selective filter circuit M1 includes an inductor L0, a first capacitor C1, and a second capacitor C2. The inductor L0 is connected with the first capacitor C1 in series. One end of the second capacitor C2 is electrically connected with a first end of the inductor L0 that is not connected with the first capacitor C1, and another end of the second capacitor C2 is electrically connected with one end of the first capacitor C1 which is not connected with the inductor L0.

Figure 17:
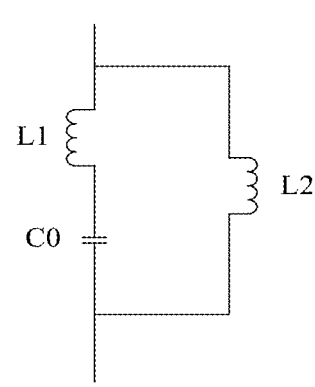
FIG. 17 is a schematic structural diagram of a first frequency-selective filter circuit provided in other implementations of the present disclosure.

Referring to FIG. 17, the first frequency-selective filter circuit M1 includes a capacitor C0, a first inductor L1, and a second inductor L2. The capacitor C0 is connected with the first inductor L1 in series. One end of the second inductor L2 is electrically connected with one end of the capacitor C0 which is not connected with the first inductor L1, and another end of the second inductor L2 is electrically connected with one end of the first inductor L1 which is not connected with the capacitor C0.

Figure 18:
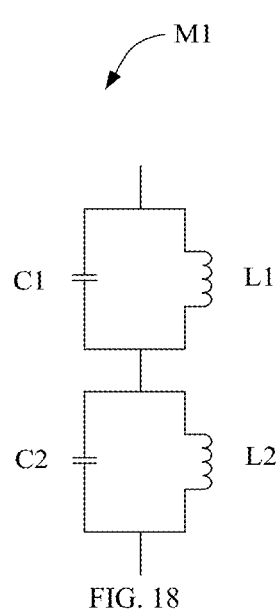
FIG. 18 is a schematic structural diagram of a first frequency-selective filter circuit provided in other implementations of the present disclosure.

Referring to FIG. 18. The first frequency-selective filter circuit M1 includes a first capacitor C1, a second capacitor C2, a first inductor L1, and a second inductor L2. The first capacitor C1 is connected with the first inductor L1 in parallel, and the second capacitor C2 is connected with the second inductor L2 in parallel. One end of the circuit formed by the second capacitor C2 and the second inductor L2 connected in parallel is electrically connected with one end of the circuit formed by the first capacitor C1 and the first inductor L1 connected in parallel.

Figure 19:
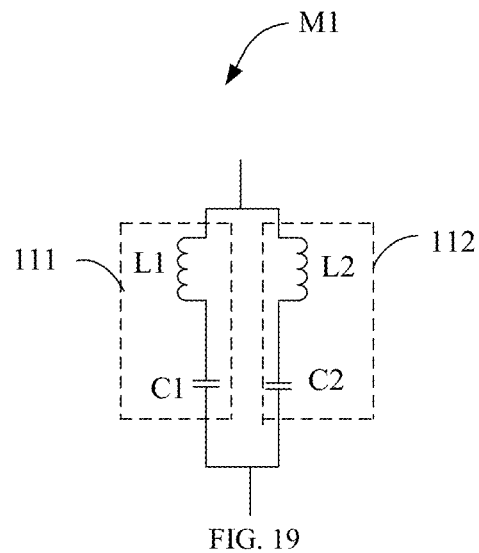
FIG. 19 is a schematic structural diagram of a first frequency-selective filter circuit provided in other implementations of the present disclosure.

Referring to FIG. 19. The first frequency-selective filter circuit M1 includes a first capacitor C1, a second capacitor C2, a first inductor L1, and a second inductor L2. The first capacitor C1 is connected with the first inductor L1 in series to define a first unit 111, the second capacitor C2 is connected with the second inductor L2 in series to define a second unit 112, and the first unit 111 is connected with the second unit 112 in parallel.

It can be understood that in the present disclosure, the second frequency-selective filter circuit M2 may include one or more of circuits of FIG. 12 to FIG. 19. The third frequency-selective filter circuit M3 may include one or more of circuits in FIG. 12 to FIG. 19.

The first frequency-selective filter circuit M1 presents different band-pass and band-stop characteristics in different bands.

It can be seen from the above that by disposing FT circuits and adjusting parameters of the FT circuits, a resonant frequency of the first antenna element 10, a resonant frequency of the second antenna element 20, and a resonant frequency of the third antenna element 30 can be shifted towards a low frequency or a high frequency, such that a relatively wide bandwidth of the first antenna module 110 is realized to cover the GPS band, the Wi-Fi band, the 4G band, the 5G band, and even more bands at the same time, and coverage and communication quality of an antenna signal of the first antenna module 100 are improved.

For example, a manner of FT provided in the present disclosure will be described below with reference to the accompanying drawings to obtain suitable impedance matching and increase the power of the first antenna module 110. In one implementation, a manner of FT of an antenna element provided in the present disclosure includes, but is not limited to, aperture FT and matching FT. In the present disclosure, by disposing a FT circuit, a resonant frequency of an antenna element is shifted towards the low frequency or the high frequency, such that the antenna element can transmit and receive an electromagnetic wave of a required band.

Referring to FIG. 11, the second radiator 21 further includes a first coupling point B disposed at a side of the second coupling end H2 away from the first coupling end H1. The second antenna element 20 further includes a first FT circuit T1. The first FT circuit T1 has one end electrically connected with the first coupling point B and the other end grounded. In implementations, the first FT circuit T1 is directly electrically connected with the second radiator 21 to adjust an impedance matching characteristic of the second radiator 21, thereby realizing the aperture FT. In other implementations, the first FT circuit T1 may also be electrically connected with the second frequency-selective filter circuit M2, and the first FT circuit T1 and the second frequency-selective filter circuit M2 form a new matching circuit to adjust the impedance matching characteristic of the second radiator 21, thereby realizing matching FT.

In one implementation, the first FT circuit T1 includes a combination of a switch and at least one of a capacitor or an inductor; and/or the first FT circuit T1 includes a variable capacitor.

In an implementation, the first FT circuit T1 includes, but is not limited to, capacitors, inductors, resistors, etc., connected in series and/or in parallel. The first FT circuit T1 may include multiple branches formed by the capacitors, the inductors, and the resistors connected in series and/or in parallel, and switches for controlling on/off of the multiple branches. By controlling on/off of different switches, frequency-selective parameters (including a resistance value, an inductance value, and a capacitance value) of the first FT circuit T1 can be adjusted, such that an impedance of the second radiator 21 can be adjusted, and then a resonant frequency-point of the second radiator 21 can be adjusted. A specific structure of the first FT circuit T1 is not limited in the present disclosure. For example, the first FT circuit T1 may include one or more of circuits in FIG. 12 to FIG. 19.

In another implementation, the first FT circuit T1 includes, but is not limited to, a variable capacitor. By adjusting a capacitance value of the variable capacitor, the FT parameters of the first FT circuit T1 are adjusted, such that the impedance of the second radiator 21 is adjusted, and then the resonant frequency-point of the second radiator 21 is adjusted.

By disposing the first FT circuit T1, the FT parameters (e.g., a resistance value, a capacitance value, and an inductance value) of the first FT circuit T1 are adjusted to adjust the impedance of the second radiator 21, such that the resonant frequency-point of the second radiator 21 is shifted towards a high band (HB) or a LB in a small range. In this way, a frequency coverage range of the second antenna element 20 in a relatively wide band can be improved.

Figure 20:
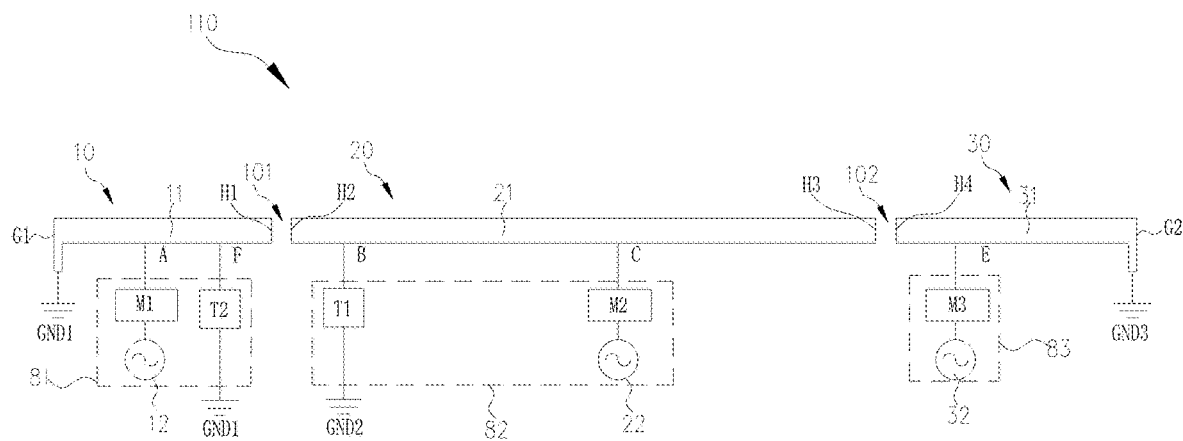
FIG. 20 is a schematic structural diagram of the first antenna module in FIG. 9 provided in other implementations of the present disclosure.
Figure 21:
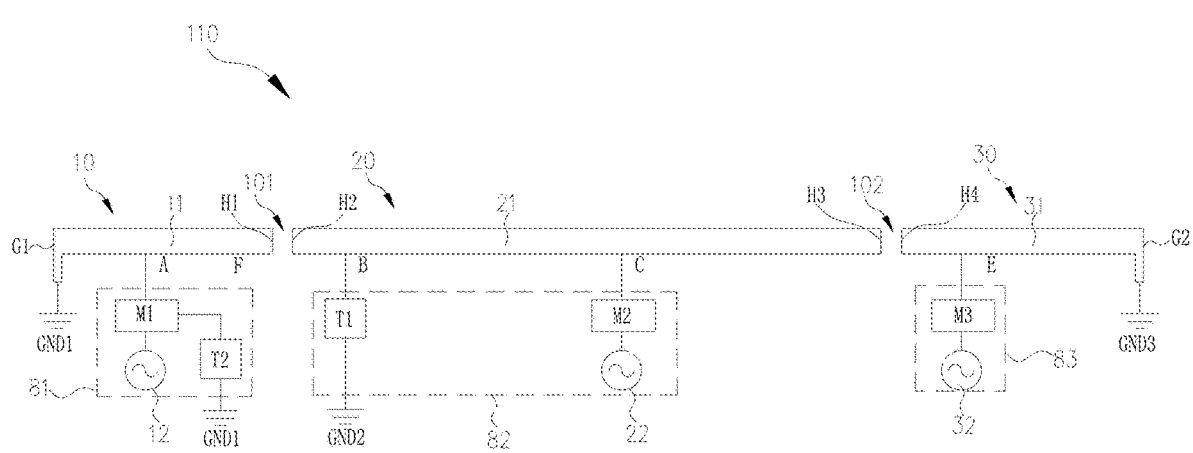
FIG. 21 is a schematic structural diagram of the first antenna module in FIG. 9 provided in other implementations of the present disclosure.

Further, referring to FIG. 20 and FIG. 21, the first antenna element 10 further includes a second FT circuit T2. The first radiator 11 further includes a first FT point F. The first FT point F is disposed between the first feed point A and the first coupling end H1. The second FT circuit T2 has one end electrically connected with the first FT point F or the first frequency-selective filter circuit M1, and the other end grounded.

In implementations, referring to FIG. 20, the second FT circuit T2 is directly electrically connected with the first radiator 11 to adjust an impedance matching characteristic of the first radiator 11, thereby realizing the aperture FT. In other implementations, referring to FIG. 14, the second FT circuit T2 may also be electrically connected with the first frequency-selective filter circuit M1, and the second FT circuit T2 and the first frequency-selective filter circuit M1 form a new matching circuit to adjust the impedance matching characteristic of the first radiator 11, thereby realizing the matching FT.

In one implementation, the second FT circuit T2 includes a combination of a switch and at least one of a capacitor and an inductor; and/or the second FT circuit T2 includes a variable capacitor.

In an implementation, the second FT circuit T2 includes, but is not limited to, capacitors, inductors, resistors, etc., disposed in series and/or in parallel. The second FT circuit T2 may include multiple branches formed by the capacitors, the inductors, and the resistors connected in series and/or in parallel, and switches for controlling on/off of the multiple branches. By controlling the on/off of different switches, frequency-selective parameters (including a resistance value, an inductance value, and a capacitance value) of the second FT circuit T2 can be adjusted, such that an impedance of the first radiator 11 can be adjusted, and then a resonant frequency-point of the first radiator 11 can be adjusted. A specific structure of the second FT circuit T2 is not limited in the present disclosure. For example, the second FT circuit T2 may include one or more of the circuits in FIG. 12 to FIG. 19.

In another implementation, the second FT circuit T2 includes, but is not limited to, a variable capacitor. By adjusting a capacitance value of the variable capacitor, FT parameters of the second FT circuit T2 are adjusted, such that the impedance of the first radiator 11 is adjusted, and then the resonant frequency of the first radiator 11 is adjusted.

By disposing the second FT circuit T2, the FT parameters (e.g., a resistance value, a capacitance value, and an inductance value) of the second FT circuit T2 are adjusted to adjust the impedance of the first radiator 11, such that the resonant frequency-point of the first radiator 11 is shifted towards a HB or a LB in a small range. In this way, a frequency coverage range of the first antenna element 10 in a relatively wide band can be improved.

For example, an equivalent circuit diagram and a resonant mode of the first antenna element 10 in the present disclosure will be described below with reference to the accompanying drawings.

Figure 22:
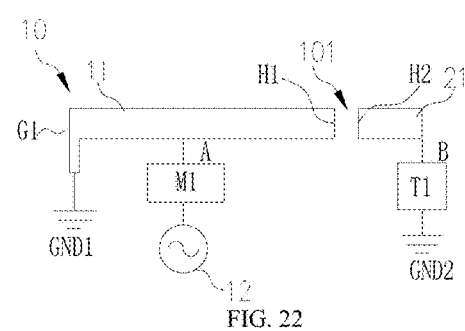
FIG. 22 is an equivalent circuit diagram of a first antenna element provided in FIG. 11.
Figure 23:
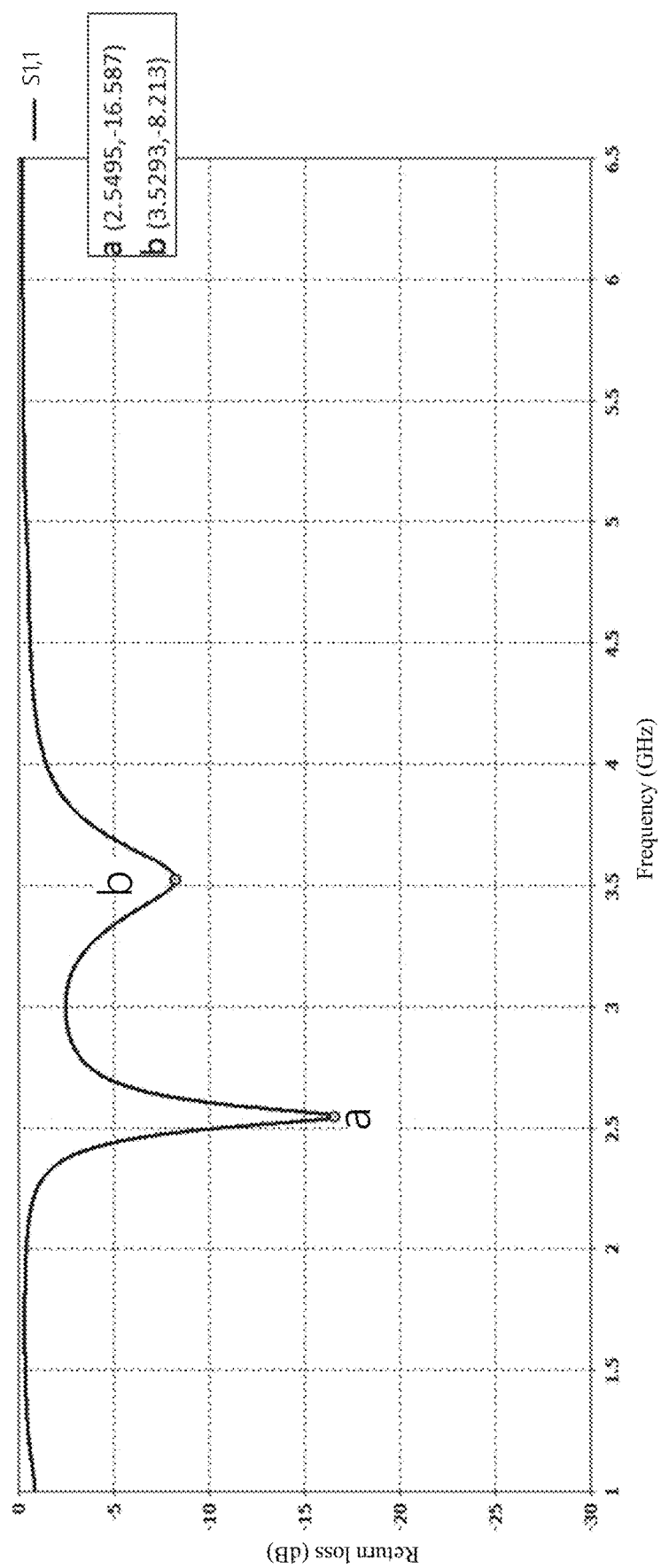
FIG. 23 is a return loss graph illustrating a resonant mode in which the first antenna element provided in FIG. 11 is operable.

Referring to FIG. 22, FIG. 22 is an equivalent circuit diagram of the first antenna element 10. Part of the second antenna element 20 is capacitively coupled with the first antenna element 10. Referring to FIG. 23, FIG. 23 is a return loss graph of the first antenna element 10.

In the present disclosure, the number and structure of antenna elements of the first antenna module 110 are designed, and an effective electrical length and a structure of the first radiator 11 of the first antenna element 10, a position of the first feed point A, an effective electrical length of the second radiator 21 coupled with the first radiator 11, etc., are also designed, such that a resonant mode is formed in a band with relatively high practicability to transmit and receive an electromagnetic wave in the band with the relatively high practicability. Further, the impedance matching of the first radiator 11 is adjusted by FT circuits (including the first FT circuit T1 and the second FT circuit T2), such that the resonant mode of the first antenna element 10 is shifted towards a HB and a LB. In this way, the first antenna element 10 has a relatively wide bandwidth in the band with the relatively high practicability. The effective electrical length refers to a length at which the first RF signal acts on the first radiator 11. The effective electrical length may be an actual length of the first radiator 11, or may be slightly shorter or longer than the actual length of the first radiator 11.

Referring to FIG. 23, for the first radiator 11 of the first antenna element 10, by designing the effective electrical length of the first radiator 11, the first radiator 11 from the first ground end G1 to the first coupling end H1 is configured to generate an electromagnetic wave signal in a first resonant mode a under excitation of a RF signal transmitted by the first signal source 12. By designing the position of the first feed point A, the first radiator 11 from the first feed point A to the second coupling end H2 is operable in a second resonant mode b under excitation of a RF signal transmitted by the first signal source 12. A band of the first resonant mode a and a band of the second resonant mode b jointly cover 2 GHz~4 GHz.

Further, the first resonant mode a is a ¼-wavelength fundamental mode in which the first antenna element 10 from the first ground end G1 to the first coupling end H1 is operable. It can be understood that the ¼-wavelength fundamental mode is a relatively efficient resonant mode of the first RF signal from the first ground end G1 to the first coupling end H1. When the first antenna element 10 is operable in the fundamental mode, the first antenna element 10 has relatively high transceiving power. In other words, a band covered by the first resonant mode a has relatively high transceiving power. The band covered by the first resonant mode a includes, but is not limited to, B40\41 and N41. It can be understood that when the first resonant mode a is the ¼-wavelength fundamental mode in which the first antenna element 10 from the first ground end G1 to the first coupling end H1 is operable, ¼ of a wavelength corresponding to an operating frequency of the first antenna element 10 in the first resonant mode a may be substantially equal to a length between the first ground end G1 and the first coupling end H1.

In an implementation, an effective electrical length of the first radiator 11 from the first ground end G1 to the first coupling end H1 is designed, for example, the length from the first ground end G1 to the first coupling end H1 is about 2.9 cm, and a parameter of the first FT circuit T1 and a parameter of the first frequency-selective filter circuit M1 are adjusted, such that the first radiator 11 from the first ground end G1 to the first coupling end H1 radiates in the first resonant mode a of the ¼-wavelength fundamental mode. For example, referring to FIG. 23, the first resonant mode a has a resonant frequency of about 2.5495 gigahertz (GHz).

Optional, referring to FIG. 23, the second resonant mode b is a ¼-wavelength fundamental mode in which the first antenna element 10 from the first feed point A to the first coupling end H1 is operable. When operating in the second resonant mode b, the first antenna element 10 has relatively high transceiving power. In other words, a band covered by the second resonant mode b has higher transceiving power. The band covered by the second resonant mode b includes, but is not limited to, N77 and N78. It can be understood that when the second resonant mode b is the ¼-wavelength fundamental mode in which the first antenna element 10 from the first feed point A to the first coupling end H1 is operable, ¼ of a wavelength corresponding to an operating frequency of the first antenna element 10 in the second resonant mode b is equal to a length between the first feed point A and the first coupling end H1.

In an implementation, an effective electrical length of the first radiator 11 from the first feed point A to the first coupling end H1 is designed, for example, the length from the first feed point A to the first coupling end H1 is about 2.1 cm, and the parameter of the first FT circuit T1 and the parameter of the first frequency-selective filter circuit M1 are adjusted, such that the first radiator 11 from the first feed point A to the first coupling end H1 radiates in the second resonant mode b of the ¼-wavelength fundamental mode. For example, referring to FIG. 23, the second resonant mode b has a resonant frequency of about 3.5293 GHz.

In implementations of the present disclosure, the size and structure of the first radiator 11 and the position of the first feed point A are designed, and the parameter of the first FT circuit T1 is adjusted, such that the first radiator 11 can cover a certain band in a band of 2 GHz~4 GHz, thereby covering B40\41, N41, N77, and N78 and having relatively high transceiving power in B40\41, N41, N77, and N78.

It can be understood that the second radiator 21 from the first coupling point B to the second coupling end H2 is configured to be capacitively coupled with the first radiator 11. In one implementation, a length of the second radiator 21 from the first coupling point B to the second coupling end H2 is less than ¼ of a wavelength of an electromagnetic wave at a resonant frequency-point of the second resonant mode b. The length of the second radiator 21 from the first coupling point B to the second coupling end H2 is less than 2.1 cm. The second antenna element 20 plays a role of capacitive loading for the first antenna element 10, such that the electromagnetic wave signal radiated by the first antenna element 10 is shifted to the LB, and a radiation efficiency of the first antenna element 10 can be improved.

For example, an equivalent circuit diagram and a resonant mode of the second antenna element 20 in the present disclosure will be described below with reference to the accompanying drawings.

Figure 24:
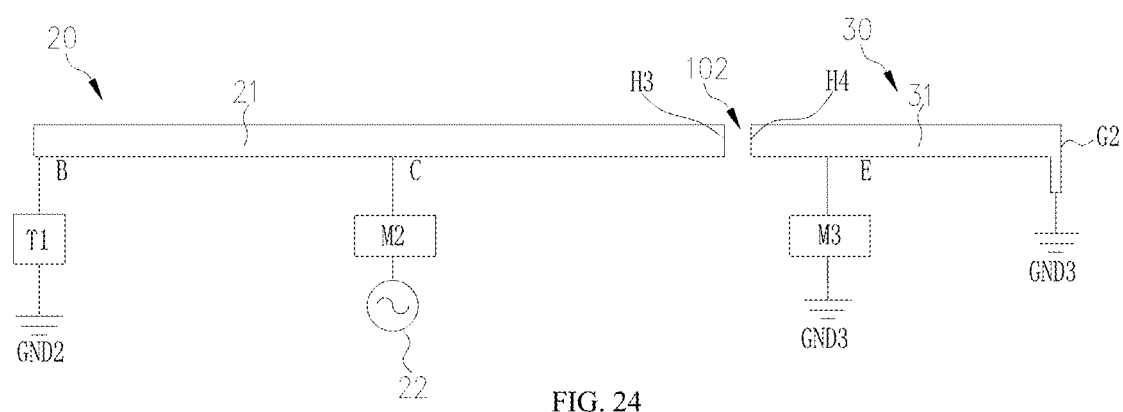
FIG. 24 is an equivalent circuit diagram of a second antenna element provided in FIG. 11.
Figure 25:
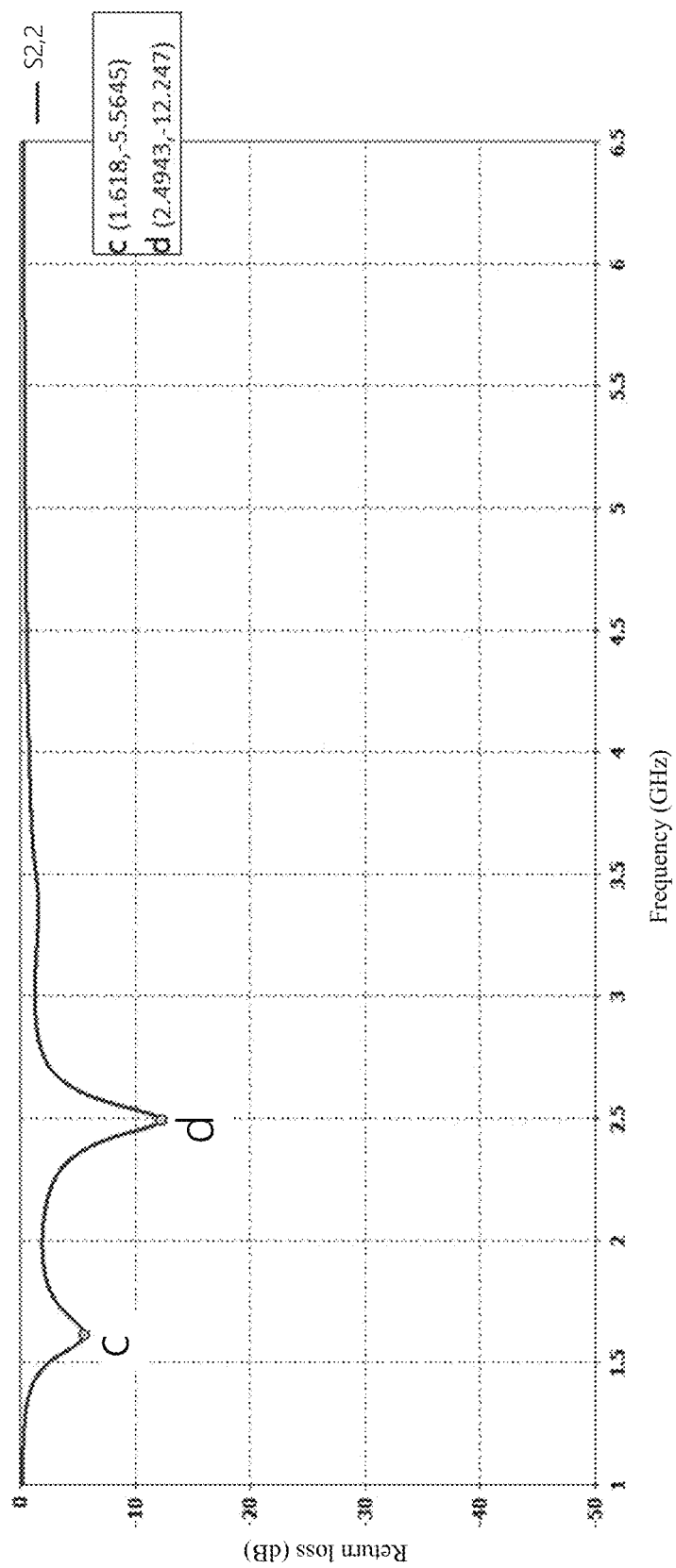
FIG. 25 is a return loss graph illustrating a resonant mode in which the second antenna element provided in FIG. 11 is operable.

Referring to FIG. 24, FIG. 24 is an equivalent circuit diagram of the second antenna element 20. The third antenna element 30 is capacitively coupled with the second antenna element 20. Referring to FIG. 25, FIG. 25 is a return loss graph of the second antenna element 20.

It can be understood that in the present disclosure, the number and structure of antenna elements of the first antenna module 110 are designed, and an effective electrical length and a structure of the second radiator 21 of the second antenna element 20, a position of the second feed point C, an effective electrical length of the third radiator 31 coupled with the second radiator 21, etc., are also designed, such that a resonant mode is formed in a band with a relatively high practicability to transmit and receive an electromagnetic wave in the band with the relatively high practicability. Further, the impedance matching of the second radiator 21 is adjusted by FT circuits (including the second FT circuit T2, the second frequency-selective filter circuit M2, the third frequency-selective filter circuit M3), such that the resonant mode of the second antenna element 20 is shifted towards a HB and a LB. In this way, the second antenna element 20 has a relatively wide bandwidth in the band with the relatively high practicability. The effective electrical length refers to a length at which the second RF signal acts on the second radiator 21. The effective electrical length may be an actual length of the second radiator 21, or may be slightly shorter or longer than the actual length of the second radiator 21.

Referring to FIG. 25, for the second radiator 21 of the second antenna element 20, by designing the effective electrical length of the second radiator 21, the second radiator 21 from the first coupling point B to the third coupling end H3 is operable in a third resonant mode c under excitation of a RF signal transmitted by the second signal source. By designing the position of the second feed point C, the second radiator 21 from the second feed point C to the third coupling end H3 is operable in a fourth resonant mode d under excitation of a RF signal transmitted by the second signal source 22. A band of the third resonant mode c and a band of the fourth resonant mode d jointly cover 1.5 GHz-3 GHz.

In one implementation, the third resonant mode c is a ¼-wavelength fundamental mode in which the second antenna element 20 from the first coupling point B to the third coupling end H3 is operable. When operating in the fundamental mode, the second antenna element 20 has relatively high transceiving power. In other words, a band covered by the third resonant mode c has relatively high transceiving power. The band covered by the third resonant mode c includes, but is not limited to, GPS-L1, B3, and N3. It can be understood that when the third resonant mode c is the ¼-wavelength fundamental mode in which the second antenna element 20 from the first coupling point B to the third coupling end H3 is operable, ¼ of a wavelength corresponding to an operating frequency of the second antenna element 20 in the third resonant mode c may be substantially equal to a length between the first coupling point B and the third coupling end H3.

In an implementation, an effective electrical length of the second radiator 21 from the first coupling point B to the third coupling end H3 is designed, for example, the length between the first coupling point B and the third coupling end H3 is about 4.6 cm, and a parameter of the second FT circuit T2, a parameter of the second frequency-selective filter circuit M2, and a parameter of the third frequency-selective filter circuit M3 are adjusted, such that the second radiator 21 from the first coupling point B to the third coupling end H3 radiates in the third resonant mode c of the ¼-wavelength fundamental mode. For example, referring to FIG. 25, the third resonant mode c has a resonant frequency of about 1.618 GHz.

In one implementation, the fourth resonant mode d is a ¼-wavelength fundamental mode in which the second antenna element 20 from the second feed point C to the third coupling end H3 is operable. When operating in the fourth resonant mode d, the second antenna element 20 has relatively high transceiving power. In other words, the band covered by the fourth resonant mode d has the relatively high transceiving power. The band covered by the fourth resonant mode d includes, but is not limited to, Wi-Fi 2.4G band, B7\40\41, N7, and N41. It can be understood that when the fourth resonant mode dis the ¼-wavelength fundamental mode in which the second antenna element 20 from the second feed point C to the third coupling end H3 is operable, ¼ of a wavelength corresponding to an operating frequency of the second antenna element 20 in the fourth resonant mode d may be substantially equal to a length between the second feed point C and the third coupling end H3.

In an implementation, an effective electrical length of the second radiator 21 from the second feed point C to the third coupling end H3 is designed, for example, the length from the second feed point C to the third coupling end H3 is about 2.1 cm, and the parameter of the first FT circuit T1, the parameter of the second frequency-selective filter circuit M2, and the parameter of the third frequency-selective filter circuit M3 are adjusted, such that the second radiator 21 from the second feed point C to the third coupling end H3 radiates in the fourth resonant mode d of the ¼-wavelength fundamental mode. For example, referring to FIG. 25, the fourth resonant mode d has a resonant frequency of about 2.4943 GHz.

In implementations, the size and structure of the second radiator 21 and the position of the second feed point C are designed, and the parameter of the first FT circuit T1, the parameter of the second frequency-selective filter circuit M2, and the parameter of the third frequency-selective filter circuit M3 are adjusted, such that the second radiator 21 can cover a certain band in a range of 1.5 GHz-3 GHz, thereby covering GPS-L1 band, Wi-Fi 2.4G band, B3\7\40\41, and N3\7\41 and having relatively high transceiving power in Wi-Fi 2.4G band, B3\7\40\41, and N3\7\41.

It should be noted that the first resonant mode a, the second resonant mode b, the third resonant mode c, and the fourth resonant mode d may be generated simultaneously, or one or more of the first resonant mode a, the second resonant mode b, the third resonant mode c, and the fourth resonant mode d may be generated.

For example, an equivalent circuit diagram and a resonant mode of the third antenna element 30 in the present disclosure will be described below with reference to the accompanying drawings.

Figure 26:
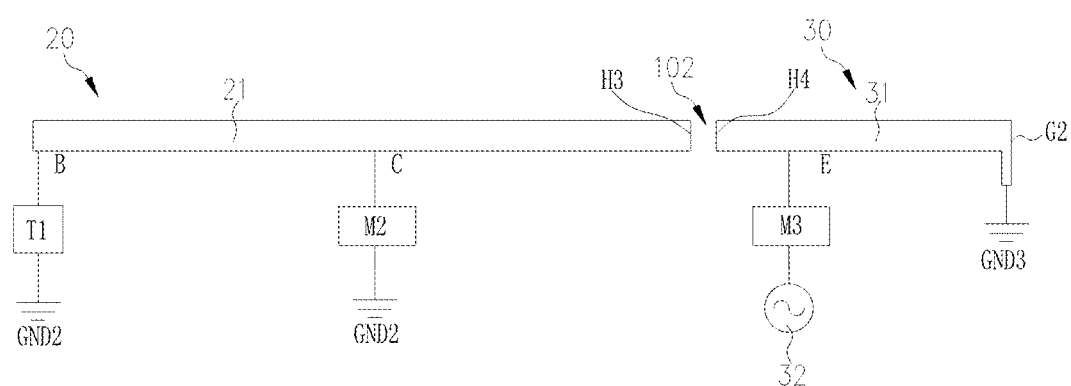
FIG. 26 is an equivalent circuit diagram of a third antenna element provided in FIG. 11.
Figure 27:
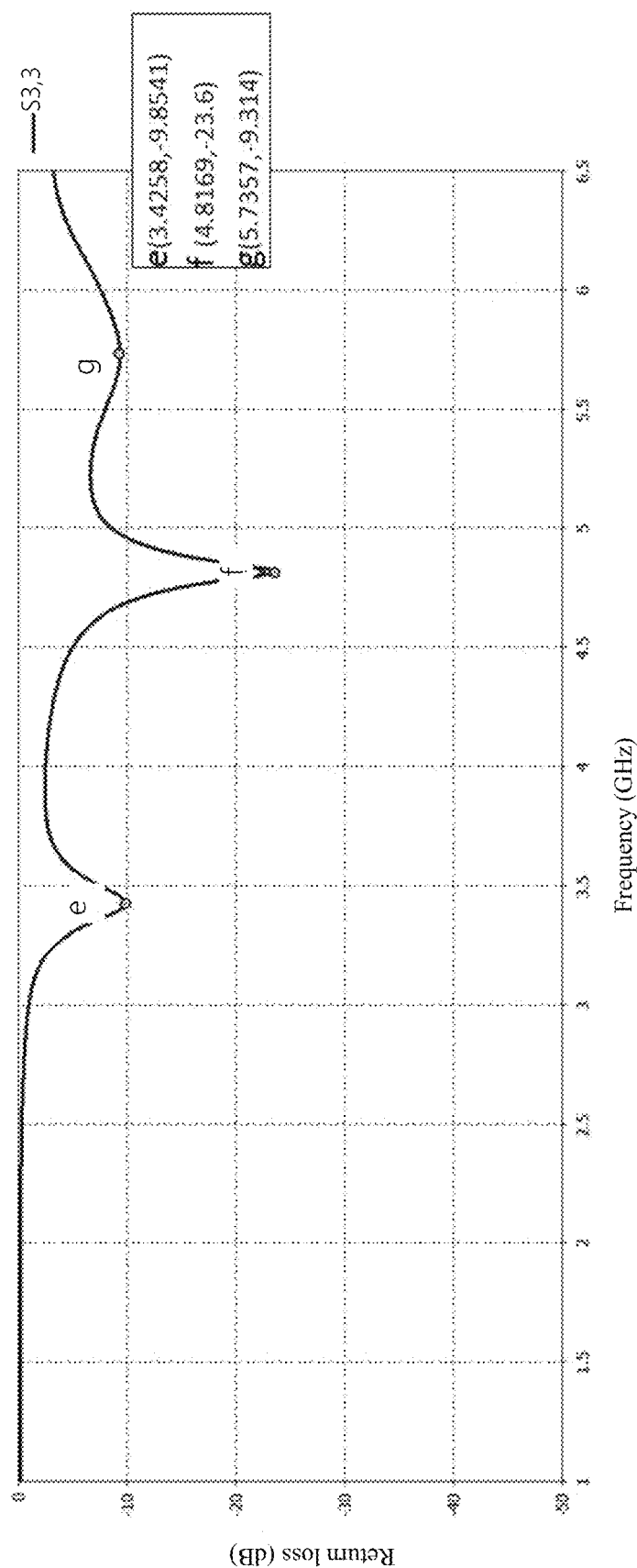
FIG. 27 is a return loss graph illustrating a resonant mode in which a third antenna element provided in FIG. 11 is operable.

Referring to FIG. 26, FIG. 26 is an equivalent circuit diagram of the third antenna element 30. The second antenna element 20 is capacitively coupled with the third antenna element 30. Referring to FIG. 27, FIG. 27 is a return loss graph of the third antenna element 30.

It can be understood that in the present disclosure, an effective electrical length and a structure of the third radiator 31 in the radiator element 30, a position of the third feed point E, an effective electrical length of coupling between the second radiator 21 and the third radiator 31 are designed, such that a resonant mode is formed in a band with relatively high practicability to transmit and receive an electromagnetic wave in the band with the relatively high practicability. Further, the impedance matching of the third radiator 31 is adjusted by FT circuits (including the second FT circuit T2, the second frequency-selective filter circuit M2, and the third frequency-selective filter circuit M3), such that the resonant mode of the third radiator element 30 is shifted towards a HB and a LB. In this way, the third antenna element 30 has a relatively wide bandwidth in the band with the relatively high practicability. The effective electrical length refers to a length at which the third RF signal acts on the third radiator 31. The effective electrical length may be an actual length of the third radiator 31, or may be slightly shorter or longer than the actual length of the third radiator 31.

Referring to FIG. 26 and FIG. 27, for the third radiator 31 of the third antenna element 30, by designing the effective electrical length of the third radiator 31, the third radiator 31 from the second ground end G2 to the fourth coupling end H4 is operable in a fifth resonant mode e and a sixth resonant mode f under excitation of a RF signal transmitted by the third signal source 32. By designing the position of the third feed point E, the second radiator 21 from the first coupling point B to the third coupling end H3 is operable in a seventh resonant mode g under excitation of a RF signal transmitted by the third signal source 32. A band of the fifth resonant mode e, a band of the sixth resonant mode f and a band of the seventh resonant mode g jointly cover 3 GHz-6.5 GHz.

Further, the fifth resonant mode e is a ⅛-wavelength mode in which the third antenna element 30 from the second ground end G2 to the fourth coupling end H4 is operable. In one implementation, the fifth resonant mode e is a ¼-⅛-wavelength mode in which the third antenna element 30 from the second ground end G2 to the fourth coupling end H4 is operable. A band covered by the fifth resonant mode e includes, but is not limited to, N77/78. It can be understood that when the fifth resonant mode e is the ⅛-wavelength mode in which the third antenna element 30 from the second ground end G2 to the fourth coupling end H4 is operable, ⅛ of a wavelength corresponding to an operating frequency of the third antenna element 30 in the fifth resonant mode e may be substantially equal to a length between the second ground end G2 and the fourth coupling end H4.

In an implementation, an effective electrical length of the third radiator 31 from the second ground end G2 to the fourth coupling end H4 is designed, for example, the length from the second ground end G2 to the fourth coupling end H4 is about 1.1 cm-2.2 cm, and a parameter of the second FT circuit T2, a parameter of the second frequency-selective filter circuit M2, and a parameter of the third frequency-selective filter circuit M3 are adjusted, such that the third radiator 31 from the second ground end G2 to the fourth coupling end H4 radiates in the fifth resonant mode e of the ⅛-wavelength fundamental mode. For example, the fifth resonant mode e has a resonant frequency of about 3.4258 GHz.

Further, the third feed point E is close to the fourth coupling end H4. In other words, the third feed point E is close to the second gap 102, such that the third feed point is a capacitive coupled feed point, and the third radiator 31 from the second ground end G2 to the fourth coupling end H4 is more easily excited to generate the ⅛-wavelength fundamental mode, so as to better cover N77/78 and have relatively high operating power in N77/78.

Further, the sixth resonant mode f is a ¼-wavelength fundamental mode in which the third antenna element 30 from the second ground end G2 to the fourth coupling end H4 is operable. When operating in the sixth resonant mode f the third antenna element 30 has relatively high transceiving power. In other words, a band covered by the sixth resonant mode f has the relatively high transceiving power. The band covered by the sixth resonant mode f includes, but is not limited to, the Wi-Fi 5G band. It can be understood that when the sixth resonant mode f is a ¼-wavelength fundamental mode in which the third antenna element 30 from the second ground end G2 to the fourth coupling end H4 is operable, ¼ of a wavelength corresponding to an operating frequency of the third antenna element 30 in the sixth resonant mode f may be substantially equal to a length between the second ground end G2 and the fourth coupling end H4.

In an implementation, an effective electrical length of the second radiator 21 from the second feed point C to the third coupling end H3 is designed, for example, the length from the second feed point C to the third coupling end H3 is about 1.3 cm, and the parameter of the first FT circuit T1, the parameter of the second frequency-selective filter circuit M2, and the parameter of the third frequency-selective filter circuit M3 are adjusted, such that the second radiator 21 from the second feed point C to the third coupling end H3 radiates in the sixth resonant mode f of the ¼-wavelength fundamental mode. For example, the sixth resonant mode f has a resonant frequency of about 5.7357 GHz.

Further, the seventh resonant mode g is a ½ wavelength mode in which the second antenna element 20 from the first coupling point B to the third coupling end H3 is operable. It can be understood that when the seventh resonant mode g is a ½ wavelength mode in which the second antenna element 20 from the first coupling point B to the third coupling end H3 is operable, ½ of a wavelength corresponding to an operating frequency of the second antenna element 20 in the seventh resonant mode g may be substantially equal to a length between the first coupling point B and the third coupling end H3.

It should be noted that the fifth resonant mode e, the sixth resonant mode f and the seventh resonant mode g may be generated simultaneously, or one or more of the fifth resonant mode e, the sixth resonant mode f and the seventh resonant mode g may be generated may be generated.

In the first antenna module 110 provided in implementations of the present disclosure, by designing capacitive coupling between three antenna elements, and designing a radiator, a feed point, and a FT circuit of each antenna element, the first electromagnetic wave sub-signal transmitted and received by the first antenna element 10 at least covers B40/41+N41/78/77. B40 covers 2.3 GHz-2.5 GHz, B41 covers 2.5 GHz-2.69 GHz, N41 covers 2.49 GHz-2.69 GHz, N78 covers 3.3 GHz-3.8 GHz, and N77 covers 3.3 GHz-4.2 GHz. The second electromagnetic wave sub-signal transmitted and received by the second antenna element 20 covers at least (GPS-L1 band)+(Wi-Fi 2.4G band)+(LTE-MHB)+(NR-MHB), the GPS-L1 band covers 1.57542 GHz, the Wi-Fi 2.4G band covers 2.4 GHz-2.5 GHz, and the LTE-MHB includes B1/3/7/40/41. B1 covers 1.92 GHz-1.98 GHz, B3 covers 1.71 GHz-1.785 GHz, B7 covers 2.5 GHz-2.57 GHz, B40 covers 2.3 GHz-2.4 GHz, and B40 covers 2.496 GHz-2.69 GHz. The NR-MHB band includes N1/3/7/40/41. N1 covers 1.920 MHz-1.980 MHz, N3 covers 1.710 GHz-1.785 GHz, N7 covers 2.500 GHz-2.570 GHz, N40 covers 2.300 GHz-2.400 GHz, and N41 covers 2.496 GHz-2.690 GHz. The third electromagnetic wave signal transmitted and received by the third antenna element 30 covers at least N77/78/79+Wi-Fi 5G band. N77 covers 3.300 GHz-4.200 GHz, N78 covers 3.300 GHz-3.800 GHz, N79 covers 4.400 GHz-5 GHz, and Wi-Fi 5G band covers 5.150 GHz-5.85 GHz. Therefore, the first antenna module 110 has a relatively large coverage and relatively high power in a band (1 GHz-6 GHz) with relatively high practicability. By designing the FT circuits, the first antenna module 110 can be adjusted to a desired radiation band.

The first radiator 11 is spaced apart from and coupled with the second radiator 21, that is, the first radiator 11 and the second radiator 21 are shared-aperture. The third radiator 31 is spaced apart from and coupled with the second radiator 21, that is, the third radiator 31 and the second radiator 21 are shared-aperture. When the first antenna module 110 operates, the first excitation signal generated by the first signal source 12 may be coupled with the second radiator 21 through the first radiator 11. In other words, when the first antenna element 10 operates, the electromagnetic wave signal can be transmitted and received not only by the first radiator 11 but also by the second radiator 21 of the second antenna element 20, such that the first antenna element 10 operates in a relatively wide band. Similarly, when the second antenna element 20 operates, the electromagnetic wave signal can be transmitted and received not only by the second radiator 21 of the second antenna element 20 but also by first radiator 11 of the first antenna element 10 and the third radiator 31 of the third antenna element 30, such that the second antenna element 20 operates in a relatively wide band. Similarly, when the third antenna element 30 operates, the electromagnetic wave signal can be transmitted and received not only by the third radiator 31 of the third antenna element 30 but also by the second radiator 21 of the second antenna element 20, such that the third antenna element 30 operates in a relatively wide band. In this way, since the radiator of the first antenna element 10 and the radiator of the second antenna element 20 can be mutually multiplexed with each other to realize an integration of multiple antenna elements, a bandwidth of the first antenna module 110 can be increased and the overall volume of the first antenna module 110 can be reduced, which facilitates the overall miniaturization of the electronic device 1000.

Figure 28:
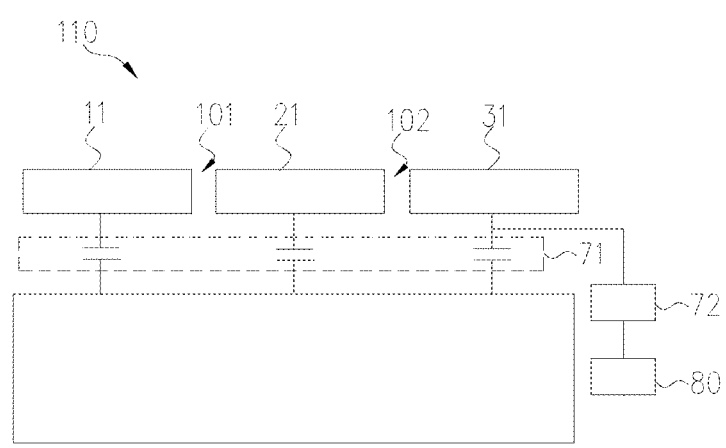
FIG. 28 is a schematic structural diagram of the first antenna module in FIG. 9 provided in other implementations of the present disclosure.

Referring to FIG. 28, the first antenna module 110 further includes a first isolator 71, a second isolator 72, and a proximity sensor 80. The first isolator 71 is electrically connected between the first radiating element 113 and a reference ground, a frequency-selective filter circuit, a FT circuit, etc.

The first isolator 71 is configured to isolate a proximity induction signal generated when the subject to-be-detected is approaching the first radiating element 113 and allow an electromagnetic wave signal transmitted and received by the first radiating element 113 to pass through. In one implementation, the first isolator 71 at least includes a direct current (DC) blocking capacitor, such that the first radiating element 113 is in a "floating" state with respect to a DC signal, thereby detecting a capacitance change caused by approach of the subject to-be-detected. The subject to-be-detected includes, but is not limited to, the human body.

The second isolator 72 has one end electrically connected between the first radiating element 113 and the first isolator 71. The second isolator 72 is configured to isolate the electromagnetic wave signal transmitted and received by the first radiating element 113 and allow the proximity induction signal to pass through. In one implementation, the second isolator 72 at least includes an isolation inductor.

The second isolator 72 has the other end electrically connected with the proximity sensor 80. The proximity sensor 80 is configured to sense the magnitude of the proximity induction signal.

When the subject to-be-detected is approaching the first radiating element 113, the proximity induction signal generated by the first radiating element 113 is a DC signal. The electromagnetic wave signal is an alternating current (AC) signal. The first isolator 71 is disposed between the first radiating element 113 and the reference ground, the frequency-selective filter circuit, the FT circuit, etc., such that the proximity induction signal does not flow to the reference ground, the frequency-selective filter circuit, the FT circuit, etc., through the first radiating element 113, thereby not affecting signal transceiving of the first antenna module 110. The second isolator 72 is disposed between the proximity sensor 80 and the first radiating element 113, such that the electromagnetic wave signal does not flow to the proximity sensor 80 through the first radiating element 113, thereby improving a sensing efficiency of the proximity sensor 80 for the proximity induction signal.

A specific structure of the proximity sensor 80 is not limited in the present disclosure. The proximity sensor 80 includes, but is not limited to, a sensor for sensing a change in capacitance or a change in inductance.

The first antenna module 110 further includes a controller (not illustrated in the accompanying drawings). The controller is electrically connected with one end of the proximity sensor 80 away from the second isolator 72. The controller is configured to determine whether the subject to-be-detected is approaching the first radiating element 113 according to the magnitude of the proximity induction signal, and reduce operating power of the first antenna module 110 when the subject to-be-detected is approaching the first radiating element 113. In one implementation, when the proximity sensor 80 detects that the human body is approaching the first radiating element 113, transmitting power of the first antenna module 110 can be reduced, thereby reducing a specific absorption rate of the human body for the electromagnetic wave signal transmitted by the first antenna module 110. When the proximity sensor 80 detects that the human body is departing from the first radiating element 113, the transmitting power of the first antenna module 110 can be increased, such that an antenna performance of the first antenna module 110 is improved and the specific absorption rate of the human body for the electromagnetic wave signal transmitted by the first antenna module 110 is not increased. In this way, a radiation performance of the electronic device 1000 is intelligently adjustable, and a safety performance of the electronic device 1000 is improved.

Similarly, devices with functions similar to the first isolator 71, the second isolator 72, and the proximity sensor 80 can be disposed in the second antenna module 120, such that the second radiating element 123 can also detect the approach of the subject to-be-detected. Since the first antenna module 110 and the second antenna module 120 are disposed diagonally, a periphery of the electronic device 1000 can be fully detected, and then the electronic device 1000 has an omni-directional approach detection function.

Figure 29:
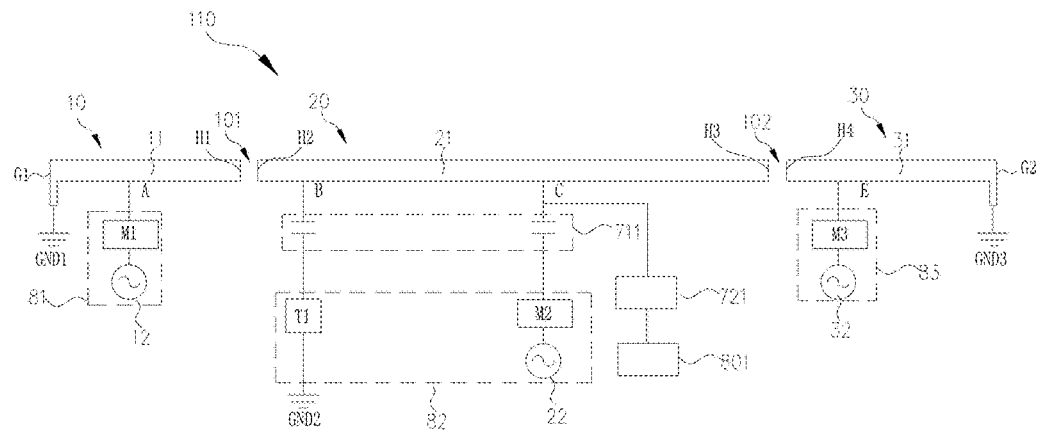
FIG. 29 is a schematic structural diagram of the first antenna module in FIG. 9 provided in other implementations of the present disclosure.

Referring to FIG. 29, the first isolator 71 further includes a first sub-isolator 711. The second isolator 72 includes a second sub-isolator 721. The proximity sensor 80 includes a first proximity sub-sensor 801.

The first sub-isolator 711 is electrically connected between the second radiator 21 and the second frequency-selective filter circuit M2 and between the second radiator 21 and the first FT circuit T1. The first sub-isolator 711 is configured to isolate a first induction sub-signal generated when the subject to-be-detected is approaching the second radiator 21 and allow the electromagnetic wave signal transmitted and received by the second radiator 21 to pass through. In one implementation, the first sub-isolator 711 at least includes a DC blocking capacitor.

The second sub-isolator 721 has one end electrically connected between the second radiator 21 and the first sub-isolator 711 or electrically connected with the second radiator 21. The second sub-isolator 721 is configured to isolate an electromagnetic wave signal received and transmitted by the second radiator 21, and allow the first induction sub-signal to pass through. In one implementation, the second sub-isolator 721 at least includes an isolation inductor.

The second sub-isolator 721 has the other end electrically connected with the first proximity sub-sensor 801. The first proximity sub-sensor 801 is configured to sense the magnitude of the first induction sub-signal.

When the subject to-be-detected is approaching the second radiator 21, the proximity induction signal generated by the second radiator 21 is a DC signal. The electromagnetic wave signal is an AC signal. The first sub-isolator 711 is disposed between the second radiator 21 and the second frequency-selective filter circuit M2 and between the second radiator 21 and the first FT circuit T1, such that the first induction sub-signal does not flow to the second frequency-selective filter circuit M2 and the first FT circuit T1 through the second radiator 21, thereby not affecting signal transceiving of the second antenna element 20. The second sub-isolator 721 is disposed between the first proximity sub-sensor 801 and the second radiator 21, such that an electromagnetic wave signal does not flow to the first proximity sub-sensor 801 through the second radiator 21, thereby improving a sensing efficiency of the first proximity sub-sensor 801 for the proximity induction signal.

A specific structure of the first proximity sub-sensor 801 is not limited in the present disclosure. The first proximity sub-sensor 801 includes, but is not limited to, a sensor for sensing a change in capacitance or a change in inductance.

The controller is electrically connected with one end of the first proximity sub-sensor 801 away from the second sub-isolator 721. The controller is configured to determine whether the subject to-be-detected is approaching the second radiator 21 according to the magnitude of the first induction sub-signal, and reduce operating power of the second antenna element 20 when the subject to-be-detected is approaching the second radiator 21. In one implementation, when the first proximity sub-sensor 801 detects that the human body is approaching the second antenna element 20, transmitting power of the second antenna element 20 can be reduced, thereby reducing a specific absorption rate of the human body for the electromagnetic wave signal transmitted by the second antenna element 20. When the first proximity sub-sensor 801 detects that the human body is departing from the second antenna element 20, the transmitting power of the second antenna element 20 can be increased, such that the antenna performance of the antenna assembly 100 is improved and the specific absorption rate of the human body for the electromagnetic wave signal transmitted by the second antenna element 20 is not increased. In this way, the radiation performance of the electronic device 1000 is intelligently adjustable, and the safety performance of the electronic device 1000 is improved.

Figure 30:
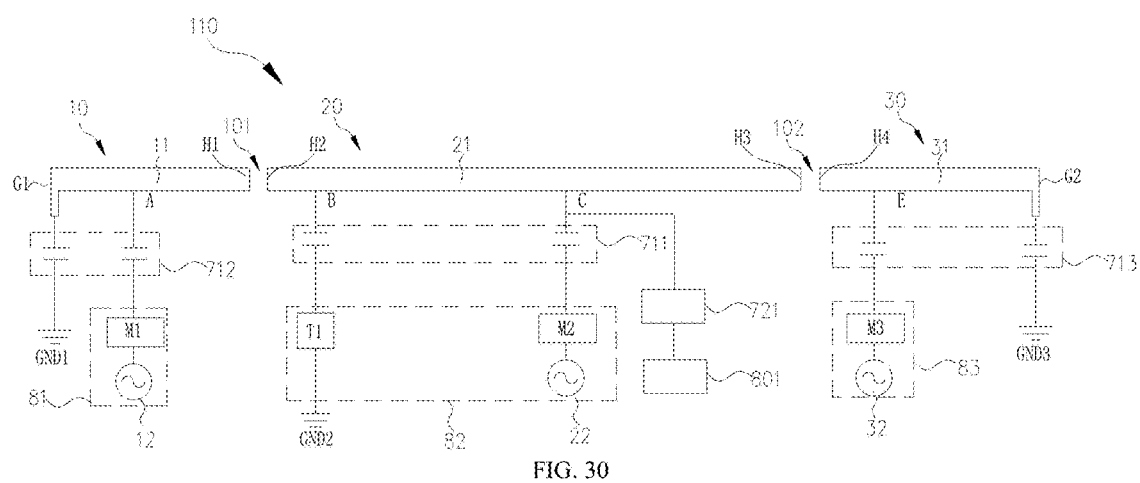
FIG. 30 is a schematic structural diagram of the first antenna module in FIG. 9 provided in other implementations of the present disclosure.

Referring to FIG. 30, the first isolator 71 further includes a third sub-isolator 712. The third sub-isolator 712 is disposed between the first radiator 11 and the first frequency-selected filter circuit M1 and between the first ground end G1 and the first reference ground GND1. The third sub-isolator 712 is configured to isolate a second induction sub-signal generated when the subject to-be-detected is approaching the first radiator 11, and allow the electromagnetic wave signal transmitted and received by the first radiator 11 to pass through. In one implementation, the third sub-isolator 712 includes an isolation capacitor. The third sub-isolator 712 is configured to make the first radiator 11 in a "floating" state with respect to a DC signal.

In a first possible implementation, referring to FIG. 30, the second induction sub-signal is used to make the second radiator 21 generate a third induction sub-signal through a coupling effect between the first radiator 11 and the second radiator 21. The first proximity sub-sensor 801 is further configured to sense the magnitude of the third induction sub-signal.

In this implementation, the first radiator 11 and the second radiator 21 each serve as an inductive electrode for sensing the approach of the subject to-be-detected, and a proximity induction path of the first radiator 11 is from the first radiator 11, the second radiator 21 to the first proximity sub-sensor 801. In other words, when the subject to-be-detected is approaching the first radiator 11, the first radiator 11 generates the second induction sub-signal, the second induction sub-signal makes the second radiator 21 generate the third induction sub-signal through the coupling effect, such that the first proximity sub-sensor 801 can also sense the subject to-be-detected that is approaching the first radiator 11. There is no need to use two sensors, and the first proximity sub-sensor 801 and the coupling effect between the first radiator 11 and the second radiator 21 are also fully utilized, such that the first radiator 11 and the second radiator 21 can be multiplexed during an approach detection, thereby increasing a utilization rate of devices, reducing the number of devices, and further promoting integration and miniaturization of the electronic device 1000.

Figure 31:
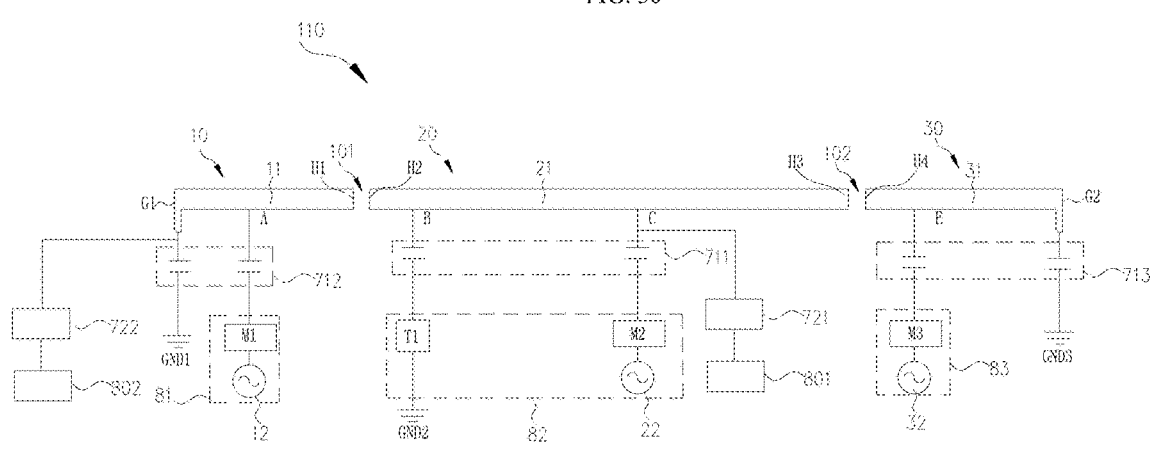
FIG. 31 is a schematic structural diagram of the first antenna module in FIG. 9 provided in other implementations of the present disclosure.

In a second possible implementation, referring to FIG. 31, the second isolator 72 further includes a fourth sub-isolator 722. The fourth sub-isolator 722 is electrically connected between the first radiator 11 and the third sub-isolator 712 or electrically connected with the first radiator 11. The fourth sub-isolator 722 is configured to isolate the electromagnetic wave signal transmitted and received by the first radiator 11, and allow the second induction sub-signal to pass through. In this implementation, the fourth sub-isolator 722 includes an isolation inductor.

Further, referring to FIG. 31, the proximity sensor 80 further includes a second proximity sub-sensor 802 electrically connected with the other end of the fourth sub-isolator 722. The second proximity sub-sensor 802 is configured to sense the magnitude of the second induction sub-signal. In one implementation, the first radiator 11 and the second radiator 21 each are an inductive electrode for sensing the approach of the subject to-be-detected, and the proximity induction path of the first radiator 11 is independent from a proximity induction path of the second radiator 21, such that it can be accurately detected that the subject to-be-detected is approaching the first radiator 11 or the second radiator 21, thereby responding to the above approach behavior in time. In one implementation, when the subject to-be-detected is approaching the first radiator 11, the second induction sub-signal generated by the first radiator 11 is a DC signal. The electromagnetic wave signal is an AC signal. The third sub-isolator 712 is disposed between the first radiator 11 and the first frequency-selective filter circuit M1 and between the first ground end G1 and the first reference ground GND1, such that the second induction sub-signal does not flow to the first frequency-selective filter circuit M1 and the first reference ground GND1 through the first radiator 11, thereby not affecting the signal transceiving of the first antenna element 10. The fourth sub-isolator 722 is disposed between the second proximity sub-sensor 802 and the first radiator 11, such that the electromagnetic wave signal does not flow to the second proximity sub-sensor 802 through the first radiator 11, thereby improving a sensing efficiency of the second proximity sub-sensor 802 for the second induction sub-signal.

In other implementations, an induction signal of the second radiator 21 can be transmitted to the second sub-sensing device 802 through the first radiator 11 by the coupling between the second radiator 21 and the first radiator 11.

Figure 32:
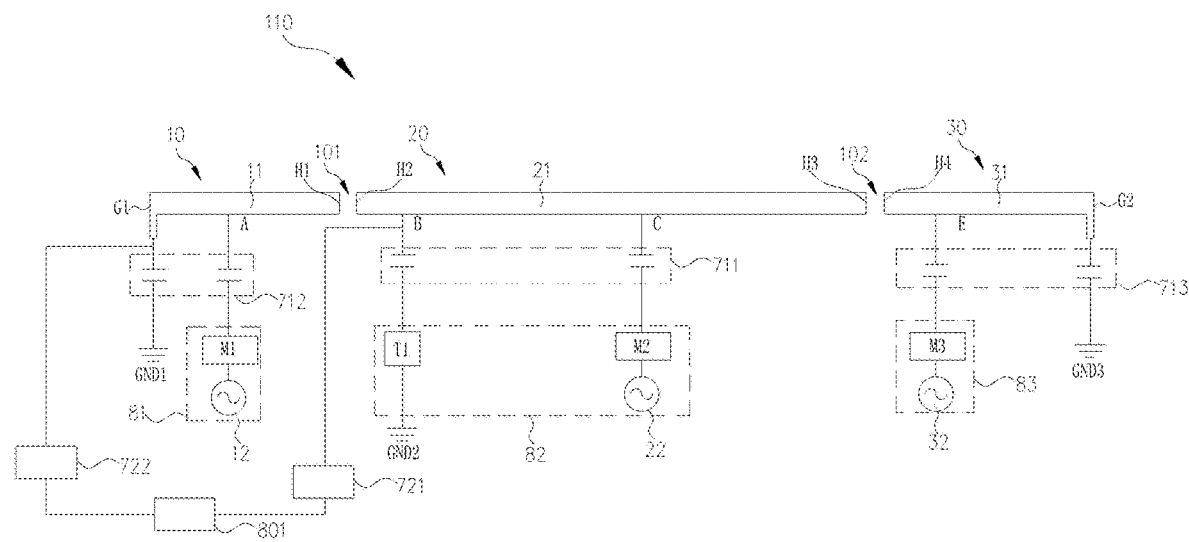
FIG. 32 is a schematic structural diagram of the first antenna module in FIG. 9 provided in other implementations of the present disclosure.

In a third possible implementation, referring to FIG. 32, the other end of the fourth sub-isolator 722 is electrically connected with the first proximity sub-sensor 801. A coupling induction signal is generated when the first radiator 11 is capacitively coupled with the second radiator 21. The first proximity sub-sensor 801 is further configured to sense a variation of the coupling induction signal when the subject to-be-detected is approaching the first radiator 11 and/or the second radiator 21.

In one implementation, a constant electric field is generated when the first radiator 11 is coupled with the second radiator 21, which is manifested as generation of a stable coupling induction signal. When the human body is approaching the constant electric field, the constant electric field will change, which is manifested as a change in the coupling induction signal, such that approach of the human body is detected according to the variation of the coupling induction signal.

In this implementation, the first radiator 11 and the second radiator 21 each serve as an inductive electrode, such that accurate detection can be performed when the human body is approaching a region corresponding to the first radiator 11, a region corresponding to the second radiator 21, and a region corresponding to the first gap 101. There is no need to use two sensing devices, the proximity sensor 81 and the coupling effect between the first radiator 11 and the second radiator 21 are also fully utilized, such that the first radiator 11 and the second radiator 21 can be multiplexed during the approach detection, thereby increasing the utilization rate of devices, reducing the number of devices, and further promoting the integration and miniaturization of the electronic device 1000.

A specific structure of the second proximity sub-sensor 802 is not limited in the present disclosure. The second proximity sub-sensor 802 includes, but is not limited to, a sensor for sensing a change in capacitance or a change in inductance.

Referring to FIG. 32, a fifth sub-isolator 713 is disposed between the third radiator 31 and the third frequency-selective filter circuit M3 and between the third radiator 31 and the third reference ground GND3, such that the third radiator 31 can also detect the approach of the subject to-be-detected. The third radiator 31 serves as an inductive electrode for sensing the approach of human body, a specific inductive path of the third radiator 31 may be independent from an inductive path of the second radiator 21, or an induction signal of the third radiator 31 may be transmitted to the proximity sensor 81 by the coupling between the third radiator 31 and the second radiator 21, or a coupling induction signal is generated by capacitive coupling between the third radiator 31 and the second radiator 21 and is transmitted to the proximity sensor 81. For a specific implementation, reference can be made to implementations in which the first radiator 11 serves as the inductive electrode, which will not be repeated herein.

The first radiator 11, the second radiator 21, and the third radiator 31 each serve as a detection electrode, such that an area of the detection electrodes can be increased, the approach of the subject to-be-detected can be detected in a larger range, and an adjustment accuracy of the radiation performance of the electronic device 1000 can be further improved.

The radiators of the first antenna module 110 can transmit and receive the electromagnetic wave signals, the radiators of the first antenna module 110 can also serve as inductive electrodes and be multiplexed to detect the approach of the human body and other subjects to-be-detected, the induction signal is isolated through the first isolator 71, and the electromagnetic wave signal is isolated through the second isolator 72, such that the communication performance of the first antenna module 110 and a role of sensing the subject to-be-detected are realized, the radiation performance of the electronic device 1000 is intelligently adjustable, and the safety performance of the electronic device 1000 is improved. Further, a device utilization rate of the electronic device 1000 is improved, and the overall volume of the electronic device 1000 is reduced.

A structure of the fourth antenna element 40, a structure of the fifth antenna element 50, and a structure of the sixth antenna element 60 of the second antenna module 120 will be described in detail below with reference to the accompanying drawings.

Figure 33:
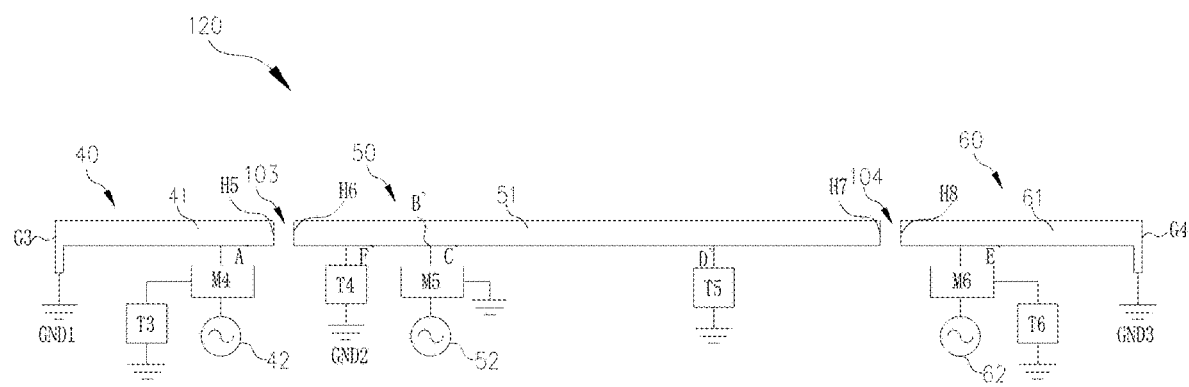
FIG. 33 is a schematic structural diagram of the second antenna module in FIG. 10 provided in implementations of the present disclosure.

Referring to FIG. 33, the fourth antenna element 40 includes a fourth radiator 41, a fourth signal source 42, and a fourth frequency-selective filter circuit M4.

Referring to FIG. 30, the fourth radiator 41 includes a third ground end G3 and a fifth coupling end H5 disposed opposite to the third ground end G3, and a fourth feed point A' disposed between the third ground end G3 and the fifth coupling end H5.

The third ground end G3 is electrically connected with the reference ground 70. The third ground end G3 is electrically connected with the first reference ground GND1.

The fourth frequency-selective filter circuit M4 is disposed between the fourth feed point A' and the fourth signal source 42. In one implementation, the fourth frequency-selective filter circuit M4 has an input end electrically connected with the fourth signal source 42, and the output end electrically connected with the fourth feed point A' of the fourth radiator 41. The fourth signal source 42 is configured to generate an excitation signal (also called a RF signal). The fourth frequency-selective filter circuit M4 is configured to filter out a clutter in the excitation signal transmitted by the fourth signal source 42, so as to obtain an excitation signal of the MHB and the UHB and transmit the excitation signal of the MHB and the UHB to the fourth radiator 41, such that the fourth radiator 41 transmits and receives a fourth electromagnetic wave signal.

Referring to FIG. 33, the fifth antenna element 50 includes a fifth radiator 51, a fifth signal source 52, and a fifth frequency-selective filter circuit M5.

Referring to FIG. 33, the fifth radiator 51 includes a sixth coupling end H6 and a seventh coupling end H7 disposed opposite to the sixth coupling end H6, and a fifth feed point C' disposed between the sixth coupling end H6 and the seventh coupling end H7.

The sixth coupling end H6 is spaced apart from the fifth coupling end H5 to define a third gap 103. In other words, the third gap 103 is defined between the fifth radiator 51 and the fourth radiator 41. The fourth radiator 41 is capacitively coupled with the fifth radiator 51 through the third gap 103.

The size of the third gap 103 is not limited in the present disclosure. In implementations, the size of the third gap 103 is less than or equal to 2 mm, but is not limited to this size, which facilitates capacitive coupling between the fourth radiator 41 and the fifth radiator 51.

The fifth frequency-selective filter circuit M5 is disposed between the fifth feed point C' and the fifth signal source 52. In one implementation, the fifth frequency-selective filter circuit M5 has an input end electrically connected with the fifth signal source 52, and an output end electrically connected with the fifth feed point C of the fifth radiator 51. The fifth signal source 52 is configured to generate an excitation signal. The fifth frequency-selective filter circuit M 5 is configured to filter out a clutter in the excitation signal transmitted by the fifth signal source 52, so as to obtain an excitation signal of the LB and transmit the excitation signal of the LB to the fifth radiator 51, such that the fifth radiator 51 transmits and receives a fifth electromagnetic wave signal.

The sixth antenna element 60 is configured to transmit and receive a sixth electromagnetic wave signal. A minimum value of a third band is greater than a maximum value of a second band.

Referring to FIG. 33, the sixth antenna element 60 includes a sixth signal source 62, a sixth frequency-selective filter circuit M6, and a sixth radiator 61. A fourth gap 104 is defined between the sixth radiator 61 and the fifth radiator 51. The sixth radiator 61 is capacitively coupled with the fifth radiator 51 through the fourth gap 104. In one implementation, the sixth radiator 61 includes an eighth coupling end H8 and a fourth ground end G4 that are disposed at two ends of the sixth radiator 61, and a sixth feed point E' disposed between the eighth coupling end H8 and the fourth ground end G4. The fourth gap 104 is defined between the eighth coupling end H8 and the seventh coupling end H7. The sixth frequency-selective filter circuit M6 has one end electrically connected with the sixth feed point E', and the other end electrically connected with the sixth signal source 62. In one implementation, when the second antenna module 120 is applied to the electronic device 1000, the sixth signal source 62 and the sixth frequency-selective filter circuit M6 each are disposed on the main printed circuit board 200. In one implementation, the fourth signal source 42, the fifth signal source 52, and the sixth signal source 62 are the same signal source, or the fourth signal source 42, the fifth signal source 52, and the sixth signal source 62 are different sources. The sixth frequency-selective filter circuit M 6 is configured to filter out a clutter in a RF signal transmitted by the sixth signal source 62, such that the sixth antenna element 60 transmits and receives the sixth electromagnetic wave signal.

When the second antenna module 120 is applied to the electronic device 1000, the fourth signal source 42, the fifth signal source 52, the fourth frequency-selective filter circuit M4, the fifth frequency-selective filter circuit M5, the sixth signal source 62, and the sixth frequency-selective filter circuit M6 each can be disposed on the main printed circuit board 200 of the electronic device 1000. In implementations, by disposing the fourth frequency-selective filter circuit M4, the fifth frequency-selective filter circuit M5, and the sixth frequency-selective filter circuit M6, a band of an electromagnetic wave signal transmitted and received by the fourth antenna element 40, a band of an electromagnetic wave signal transmitted and received by the fifth antenna element 50, and a band of an electromagnetic wave signal transmitted and received by the sixth antenna element 60 can be different, thereby improving isolation between the fourth antenna element 40, the fifth antenna element 50, and the sixth antenna element 60.

Figure 34:
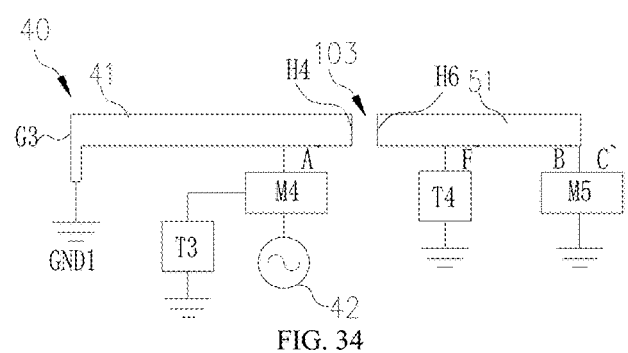
FIG. 34 is an equivalent circuit diagram of a fourth antenna element provided in FIG. 33.
Figure 35:
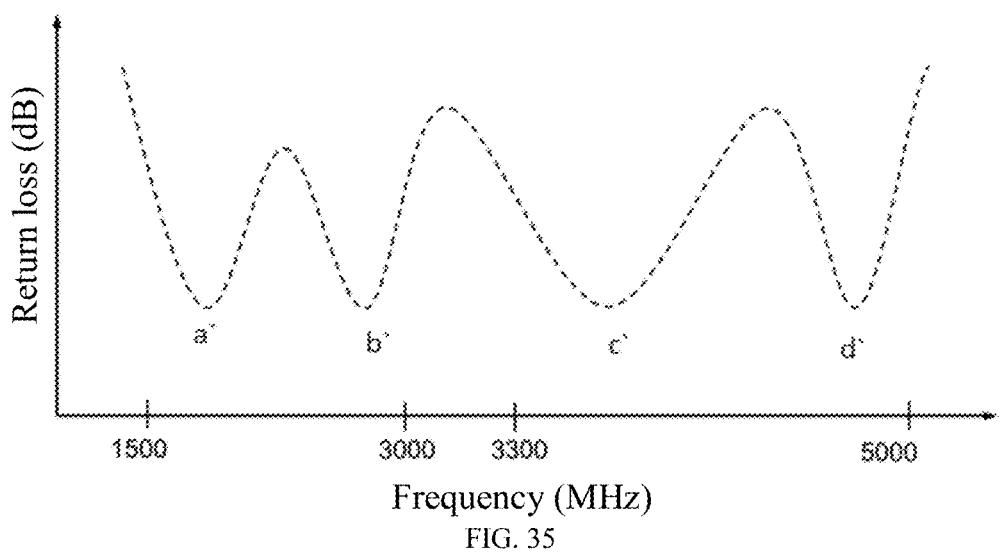
FIG. 35 is a return loss graph illustrating a resonant mode in which a fourth antenna element provided in FIG. 33 is operable.

Referring to FIG. 34 and FIG. 35, FIG. 34 is an equivalent circuit diagram of a fourth antenna element 40, and FIG. 35 is a diagram illustrating a resonant mode generated by a fourth antenna element 40.

Referring to FIG. 34 and FIG. 35, the fourth antenna element 40 is configured to generate multiple resonant modes. In addition, at least one resonant mode is generated by capacitive coupling between the fourth radiator 41 and the fifth radiator 51.

Referring to FIG. 34 and FIG. 35, multiple resonant modes generated by the fourth antenna element 40 at least include a first resonant sub-mode a', a second resonant sub-mode b', a third resonant sub-mode c', and a fourth resonant sub-mode d'. It should be noted that resonant modes generated by the fourth antenna element 40 may include other modes besides the resonant modes listed above, and the above four resonant modes are only relatively efficient modes.

Figure 36:
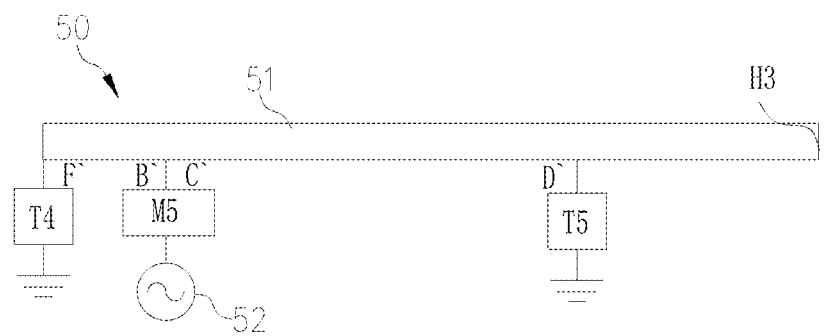
FIG. 36 is an equivalent circuit diagram of a fifth antenna element provided in FIG. 33.

Referring to FIG. 36, an electromagnetic wave of the second resonant sub-mode b' and an electromagnetic wave of the third resonant sub-mode c' each are generated by coupling between the fourth radiator 41 and the fifth radiator 51. A band of the first resonant sub-mode a', a band of the second resonant sub-mode b', a band of the third resonant sub-mode c', and a band of the fourth resonant sub-mode d' correspond to a first sub-band, a second sub-band, a third sub-band, and a fourth sub-band, respectively. In an implementation, the first sub-band ranges from 1900 MHz to 2000 MHz; the second sub-band ranges from 2600 MHz to 2700 MHz; the third sub-band ranges from 3800 MHz to 3900 MHz; and the fourth sub-band ranges from 4700 MHz to 4800 MHz. In other words, multiple first resonant modes are in the MHB (1000 MHz-3000 MHz) and the UHB (3000 MHz-10000 Mhz). By adjusting a resonant frequency-point of the above resonant mode, the fourth antenna element 40 can fully cover the MHB and the UHB, and a relatively high efficiency can be realized in a required band.

It is designed that the third gap 103 is defined between the fourth radiator 41 of the fourth antenna element 40 and the fifth radiator 51 of the fifth antenna element 50, the fourth antenna element 40 is configured to transmit and receive an electromagnetic wave signal of a HB and the fifth antenna element 50 is configured to transmit and receive an electromagnetic wave signal of a LB. On the one hand, when the second antenna module 120 operates, the fourth radiator 41 can be capacitively coupled with the fifth radiator 51 to generate more modes of electromagnetic wave signals and improve a bandwidth of the second antenna module 120. On the other hand, the fourth antenna element 40 has one MHB and the fifth antenna element 50 has one LB, such that isolation between the fourth antenna element 40 and the fifth antenna element 50 is effectively improved, which facilitates the second antenna module 120 to radiate an electromagnetic wave signal of a required band. Since the radiator of the fourth antenna element 40 and the radiator of the fifth antenna element 50 can be mutually multiplexed with each other to realize an integration of multiple antenna elements, the second antenna module 120 can increase a bandwidth while also reducing the overall volume of the second antenna module 120, which facilitates the overall miniaturization of the electronic device 1000.

Implementations where the fourth antenna element 40 and the fifth antenna element 50 transmit and receive electromagnetic wave signals of different bands includes, but are not limited to, the following implementations.

In one implementation, the fourth signal source 42 and the fifth signal source 52 may be the same signal source or may be different signal sources.

It can be understood that the fourth frequency-selective filter circuit M4 includes, but is not limited to, capacitors, inductors, resistors, etc., disposed in series and/or in parallel. The fourth frequency-selective filter circuit M4 may include multiple branches formed by the capacitors, the inductors, the resistors connected in series and/or in parallel, and switches for controlling on/off of the multiple branches. By controlling on/off of different switches, frequency-selective parameters (including a resistance value, an inductance value, and a capacitance value) of the fourth frequency-selective filter circuit M4 can be adjusted, such that a filtering range of the fourth frequency-selective filter circuit M4 can be adjusted, and then the fourth antenna element 40 can transmit and receive the fourth electromagnetic wave signal. The fifth frequency-selective filter circuit M5 can refer to a circuit composition of the fourth frequency-selective filter circuit M4, but the fifth frequency-selective filter circuit M5 has a structure different from the fourth frequency-selective filter circuit M4. The fourth frequency-selective filter circuit M4 and the fifth frequency-selective filter circuit M5 each can also be called a matching circuit. The structure of the fourth frequency-selective filter circuit M4 at least includes one of circuits in FIG. 12 to FIG. 19. The structure of the fifth frequency-selective filter circuit M5 at least includes one of the circuits in FIG. 12 to FIG. 19.

Figure 37:
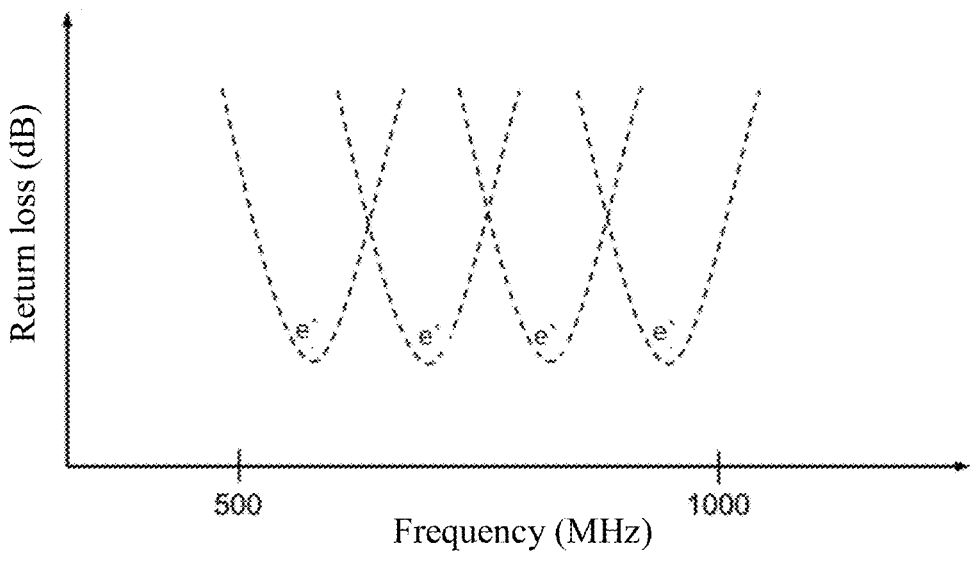
FIG. 37 is a return loss graph illustrating a resonant mode in which a fifth antenna element provided in FIG. 33 is operable.

Referring to FIG. 36 and FIG. 37, FIG. 36 is an equivalent circuit diagram of a fifth antenna element 50, and FIG. 37 is a diagram illustrating a resonant mode generated by a fifth antenna element 50.

Referring to FIG. 37, the fifth antenna element 50 generates a fifth resonant sub-mode e' when the fifth antenna element 50 operates. The band of the fifth resonant sub-mode e' is below 1000 MHz, for example, 500 MHz-1000 MHz. By adjusting the resonant frequency-point of the above resonant mode, the fifth antenna element 50 can fully cover a low frequency, and a relatively high efficiency can be realized in a required band. In this way, the fifth antenna element 50 can transmit and receive an electromagnetic wave signal of the LB, for example, electromagnetic wave signals of all LBs of 4G (also called long term evolution, LTE) and 5G (also called new radio, NR). When the fifth antenna element 50 and the fourth antenna element 40 operate simultaneously, the fifth antenna element 50 and the fourth antenna element 40 can cover electromagnetic wave signals of all LB, MHB, and UHB of 4G and 5G, including LTE-1/2/3/4/7/32/40/41, NR-1/3/7/40/41/77/78/79, Wi-Fi 2.4G band, Wi-Fi 5G band, GPS-L1 band, GPS-L5 band, etc., to realize ultra-wideband carrier aggregation (CA) and a combination of a LTE NR double connect (EN-DC) of 4G wireless access network and 5G-NR.

Figure 38:
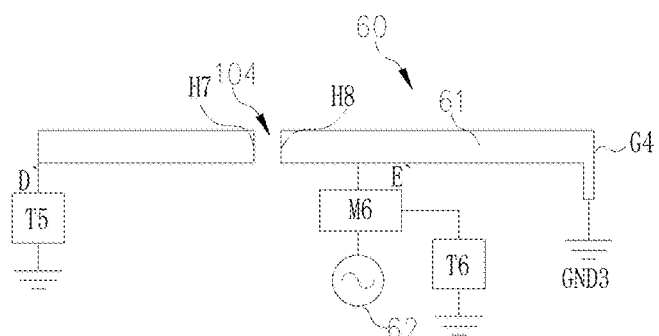
FIG. 38 is an equivalent circuit diagram of a sixth antenna element provided in FIG. 33.
Figure 39:
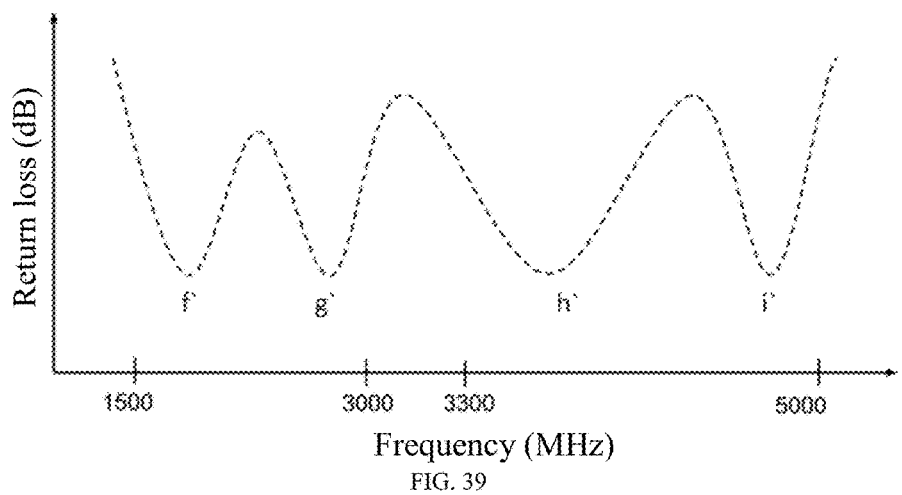
FIG. 39 is a return loss graph illustrating a resonant mode in which a sixth antenna element provided in FIG. 33 is operable.

Referring to FIG. 38 and FIG. 39, FIG. 38 is an equivalent circuit diagram of a sixth antenna element 60, and FIG. 39 is a diagram illustrating a resonant mode generated by the sixth antenna element 60.

The sixth antenna element 60 is configured to generate multiple resonant modes. At least one resonant mode is generated by capacitive coupling between the fifth radiator 51 and the sixth radiator 61.

Referring to FIG. 36, multiple resonant modes generated by the sixth antenna element 60 at least include a sixth resonant sub-mode f', a seventh resonant sub-mode g', an eighth resonant sub-mode h', and a ninth resonant sub-mode i'. It should be noted that the multiple resonant modes generated by the sixth antenna element 60 further include other modes besides the resonant modes listed above, and the above four resonant modes are only relatively efficient modes.

A band of the sixth resonant sub-mode f', a band of the seventh resonant sub-mode g', a band the eighth resonant sub-mode h', and a band of the ninth resonant sub-mode correspond to a fifth sub-band, a sixth sub-band, a seventh sub-band, and an eighth sub-band, respectively. In an implementation, the fifth sub-band ranges from 1900 MHz to 2000 MHz; the sixth sub-band ranges from 2600 MHz to 2700 MHz; the seventh sub-band ranges from 3800 MHz to 3900 MHz; and the eighth sub-band ranges from 4700 MHz to 4800 MHz. In other words, multiple second resonant modes are in the MHB (1000 MHz-3000 MHz) and the UHB (3000 MHz-10000 Mhz). By adjusting the resonant frequency-point of the above resonant mode, the sixth antenna element 60 can fully cover the MHB and the UHB, and a relatively high efficiency can be realized in a required band.

In one implementation, the sixth antenna element 60 has a structure the same as the fourth antenna element 40. Capacitive coupling between the sixth antenna element 60 and the fifth antenna element 50 is the same as capacitive coupling between the fourth antenna element 40 and the fifth antenna element 50. Therefore, it can be known that when the second antenna module 120 operates, a sixth excitation signal generated by the sixth signal source 62 can be coupled with the fifth radiator 51 through the sixth radiator 61. In other words, when the sixth antenna element 60 operates, the electromagnetic wave signal can be transmitted and received not only by the sixth radiator 61 but also the fifth radiator 51 of the fifth antenna element 50, such that an operating bandwidth of the sixth antenna element 60 can be increased without additionally disposed radiators.

The fourth antenna element 40, the fifth antenna element 50, and the sixth antenna element 60 are configured to transmit and receive an electromagnetic wave signal of a MHB, an electromagnetic wave signal of a LB, and an electromagnetic wave signal of a MHB and UHB, respectively, such that the fourth antenna element 40 is isolated from the fifth antenna element 50 by bands to avoid mutual signal interference, the fifth antenna element 50 is isolated from the sixth antenna element 60 by bands to avoid mutual signal interference, and the fourth antenna element 40 is isolated from the sixth antenna element 60 by physical spacing to avoid mutual signal interference, which facilitates control of the second antenna module 120 to transmit and receive the electromagnetic wave signal of a required band.

In addition, the fourth antenna element 40 and the sixth antenna element 60 can be disposed on the electronic device 1000 in different orientations or at different positions to facilitate switching in different scenes. For example, it may be switched between the fourth antenna element 40 and the sixth antenna element 60 when the electronic device 1000 is switched between a landscape screen and a portrait screen, or it is switched from the fourth antenna element 40 to the sixth antenna element 60 when the fourth antenna element 40 is blocked and it is switched from the sixth antenna element 60 to the fourth antenna element 40 when the sixth antenna element 60 is blocked, so as to have better transceiving of electromagnetic wave signals of the MHB and the UHB in different scenes.

In implementations, for example, the second antenna module 120 includes the fourth antenna element 40, the fifth antenna element 50, and the sixth antenna element 60, and a tuning manner of covering electromagnetic wave signals of all the LB, the MHB, and the UHB of 4G and 5G is described by examples.

Figure 40:
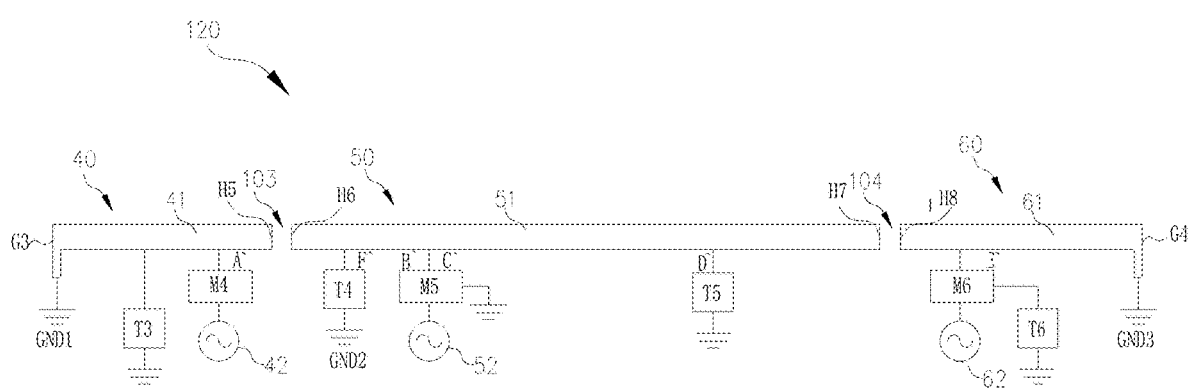
FIG. 40 is a schematic structural diagram of the second antenna module in FIG. 10 provided in other implementations of the present disclosure.

Referring to FIG. 40, the fifth radiator 51 includes a second coupling point B'. The second coupling point B' is disposed between the sixth coupling end H6 and the seventh coupling end H7. Part of the fifth radiator 51 from the second coupling point B' to one end of the fifth radiator 51 is configured to be coupled with other adjacent radiators.

Referring to FIG. 40, when the second coupling point B' is disposed at a position close to the sixth coupling end H6 (e.g., a position C' in FIG. 40), the fifth radiator 51 from the second coupling point B' to the sixth coupling end H6 is coupled with the fourth radiator 41. Further, the fifth radiator 51 from the second coupling point B' to the sixth coupling end H6 is configured to be capacitively coupled with the fourth radiator 41. A length from the second coupling point B' to the sixth coupling end H6 is about ¼ λ1, where λ1 is a wavelength of the fourth electromagnetic wave signal.

When the second coupling point B' is disposed at a position close to the seventh coupling end H7 (e.g., a position D' in FIG. 40), the fifth radiator 51 from the second coupling point B' to the seventh coupling end H7 is coupled with the sixth radiator 61. The fifth radiator 51 from the second coupling point B' to the seventh coupling end H7 is configured to be capacitively coupled with the sixth radiator 61. A length from the second coupling point B' to the seventh coupling end H7 is about ¼ λ2. Where λ2 is a wavelength of the sixth electromagnetic wave signal.

In implementations of the present disclosure, for example, the second coupling point B' is close to the sixth coupling end H6. The following arrangement of the second coupling point B' also applies to a case where the second coupling point B' is close to the seventh coupling end H7.

The second coupling point B' is configured to be grounded, such that a fourth excitation signal transmitted by the fourth signal source 42 is transmitted from the fourth feed point A' to the fourth radiator 41 after being filtered by the fourth frequency-selective filter circuit M4, and the excitation signal acts on the fourth radiator 41 in different manners. For example, the fourth excitation signal acts on the fourth radiator 41 from the fourth feed point A' to the third ground end G3, and enters the reference ground 70 at the third ground end G3, so as to form an antenna loop; and the fourth excitation signal acts on the fourth radiator 41 from the fourth feed point A' to the fifth coupling end H5, is coupled to the sixth coupling end H6 and the second coupling point B' through the third gap 103, and enters the reference ground 70 at the second coupling point B', so as to form another coupled antenna loop.

In one implementation, when the fourth antenna element 40 from the third ground end G3 to the fifth coupling end H5 operates in a fundamental mode, the first resonant sub-mode a' is generated. In this implementation, when the fourth excitation signal generated by the fourth signal source 42 acts between the third ground end G3 and the fifth coupling end H5, the first resonant sub-mode a' is generated, an efficiency at the resonant frequency-point corresponding to the first resonant sub-mode a' is relatively high, thereby improving the communication quality of the electronic device 1000 at the resonant frequency-point corresponding to the first resonant sub-mode a'.

Referring to FIG. 33, the fourth antenna element 40 further includes a third FT circuit T3. In an implementation, the third FT circuit T3 is configured for matching FT. In this implementation, the third FT circuit T3 has one end electrically connected with the fourth frequency-selective filter circuit M4 and the other end grounded.

In another implementation, referring to FIG. 40, the third FT circuit T3 is configured for the aperture FT. In this implementation, the third FT circuit T3 has one end electrically connected between the third ground end G3 and the fourth feed point A', and the other end grounded. In the above two connection manners, the third FT circuit T3 is configured to adjust the resonant frequency-point of the first resonant sub-mode a by adjusting the impedance of the fourth radiator 41.

In an implementation, the third FT circuit T3 includes, but is not limited to, capacitors, inductors, resistors, etc., disposed in series and/or in parallel. The third FT circuit T3 may include multiply branches formed by the capacitors, the inductors, and the resistors connected in series and/or in parallel, and switches for controlling on/off of the multiple branches. By controlling on/off of different switches, frequency-selective parameters (including a resistance value, an inductance value, and a capacitance value) of the third FT circuit T3 can be adjusted, the impedance of the fourth radiator 41 can be adjusted, such that the resonant frequency of the first resonant sub-mode a' can be adjusted, and then the resonant frequency-point of the first resonant sub-mode a is shifted towards a HB or a LB. In this way, by adjusting a FT parameter of the third FT circuit T3, the frequency coverage of the fourth antenna element 40 can be realized in a relatively wide band. A specific structure of the third FT circuit T3 can refer to a specific structure of the fourth frequency-selective filter circuit M4.

In another implementation, the third FT circuit T3 includes, but is not limited to, a variable capacitor. By adjusting a capacitance value of the variable capacitor, the FT parameter of the third FT circuit T3 is adjusted, such that the impedance of the fourth radiator 41 is adjusted to adjust the resonant frequency-point of the first resonant sub-mode a'.

When the fourth antenna element 40 from the sixth coupling end H6 to the second coupling point B' operates in a fundamental mode, the second resonant sub-mode b' is generated. A resonant frequency-point of the second resonant sub-mode b' is greater than the resonant frequency-point of the first resonant sub-mode a'. In one implementation, when the fourth excitation signal generated by the fourth signal source 42 acts on the fifth radiator 51 between the sixth coupling end H6 and the second coupling point B', the second resonant sub-mode b' is generated, an efficiency at the resonant frequency-point corresponding to the second resonant sub-mode b' is relatively high, thereby improving the communication quality of the electronic device 1000 at the resonant frequency-point corresponding to the second resonant sub-mode b'.

Referring to FIG. 4 and FIG. 33, the fifth frequency-selective filter circuit M5 is configured for the aperture FT. In one implementation, an end of the fifth frequency-selective filter circuit M5 is electrically connected with the second coupling point B', and an end of the fifth frequency-selective filter circuit M5 away from the second coupling point B' is grounded. The fifth frequency-selective filter circuit M5 is configured to adjust the resonant frequency-point of the second resonant sub-mode b' by adjusting the impedance of the fifth radiator 51.

When the fourth antenna element 40 from the fourth feed point A' to the fifth coupling end H5 operates in a fundamental mode, the third resonant sub-mode c' is generated. A resonant frequency-point of the third resonant sub-mode c' is greater than the resonant frequency-point of the second resonant sub-mode b'.

In one implementation, when the fourth excitation signal generated by the fourth signal source 42 acts on the fourth radiator 41 between the fourth feed point A' and the fifth coupling end H5, the third resonant sub-mode c' is generated, a transceiving efficiency at the resonant frequency-point corresponding to the third resonant sub-mode c' is relatively high, thereby improving the communication quality of the electronic device 1000 at the resonant frequency corresponding to the third resonant sub-mode c'.

Referring to FIG. 33, the fifth radiator 51 further includes a second FT point F'. The second FT point F' is disposed between the sixth coupling end H6 and the second coupling point B'. The fifth antenna element 50 further includes a fifth FT circuit T4. In an implementation, a fifth FT circuit T4 is configured for the aperture FT. In this implementation, the fifth FT circuit T4 has one end electrically connected with the second FT point F', and the other end grounded. In another implementation, the fifth FT circuit T4 is configured for matching FT. In this implementation, the fifth FT circuit T4 has one end electrically connected with the fifth frequency-selective filter circuit M5, and the other end grounded. The fifth FT circuit T4 is configured to adjust the resonant frequency-point of the second resonant sub-mode b' and the resonant frequency-point of the third resonant sub-mode c'.

The fifth FT circuit T4 is configured to adjust the resonant frequency-point of the third resonant sub-mode c' by adjusting the impedance of part of the fourth radiator 41 from the sixth coupling end H6 to the second coupling point B'.

In an implementation, the fifth FT circuit T4 includes, but is not limited to, capacitors, inductors, resistors, etc., disposed in series and/or in parallel. The fifth FT circuit T4 may include multiple branches formed by the capacitors, the inductors, the resistors connected in series and/or in parallel, and switches for controlling on/off of the multiple branches. By controlling on/off of different switches, frequency-selective parameters (including a resistance value, an inductance value, and a capacitance value) of the fifth FT circuit T4 can be adjusted, such that the impedance of part of the fourth radiator 41 from the sixth coupling end H6 to the second coupling point B' can be adjusted, and then the resonant frequency-point of the fourth antenna element 40 transmitting and receiving the third resonant sub-mode c' or a nearby resonant frequency-point is shifted towards a HB or a LB. In this way, the frequency coverage of the fourth antenna element 40 in a relatively wide band can be achieved by adjusting a FT parameter of the fourth FT circuit T4.

A specific structure of the fourth FT circuit T4 is not limited in the present disclosure, and a specific adjustment manner of the fourth FT circuit T4 is also not limited in the present disclosure.

In another implementation, the fourth FT circuit T4 includes, but is not limited to, a variable capacitor. By adjusting a capacitance value of the variable capacitor, the FT parameter of the fourth FT circuit T4 is adjusted, such that the impedance of part of the fourth radiator 41 from the sixth coupling end H6 to the second coupling point B' is adjusted to adjust the resonant frequency-point of the third resonant sub-mode c'.

When the fourth antenna element 40 from the third ground end G3 to the fifth coupling point H5 operates in a third-order fundamental, a fourth resonant sub-mode d' is generated.

In one implementation, when the fourth excitation signal generated by the fourth signal source 42 acts on the fourth radiator 41 between the fourth feed point A' and the fifth coupling end H5, the fourth resonant sub-mode d' is also generated, a transceiving efficiency at a resonant frequency-point corresponding to the fourth resonant sub-mode d' is relatively high, thereby improving the communication quality of the electronic device 1000 at a resonant frequency-point corresponding to the fourth resonant sub-mode d'. A resonance frequency point of the fourth resonant sub-mode d' is greater than a resonant frequency-point of the third resonant sub-mode c'. Similarly, the fourth FT circuit T4 can adjust the resonant frequency-point corresponding to the fourth resonant sub-mode d'.

In other implementations, the fifth feed point C' may be disposed between the second coupling point B' and the seventh coupling end H7.

A fifth excitation signal generated by the fifth signal source 52 acts on the fifth radiator 51 between the second FT point F' and the seventh coupling end H7 after being filtered and adjusted by the fifth frequency-selective filter circuit M5, thereby generating an electromagnetic wave of the fifth resonant sub-mode e'.

Further, referring to FIG. 33, the fifth radiator 51 further includes a third FT point D'. The third FT point D' is between the fifth feed point C' and the seventh coupling end H7. The fifth antenna element 50 further includes a fifth FT circuit T5. In an implementation, the fifth FT circuit T5 is configured for the aperture FT. In this implementation, the fifth FT circuit T5 has one end electrically connected with the third FT point D', and the other end grounded.

Figure 41:
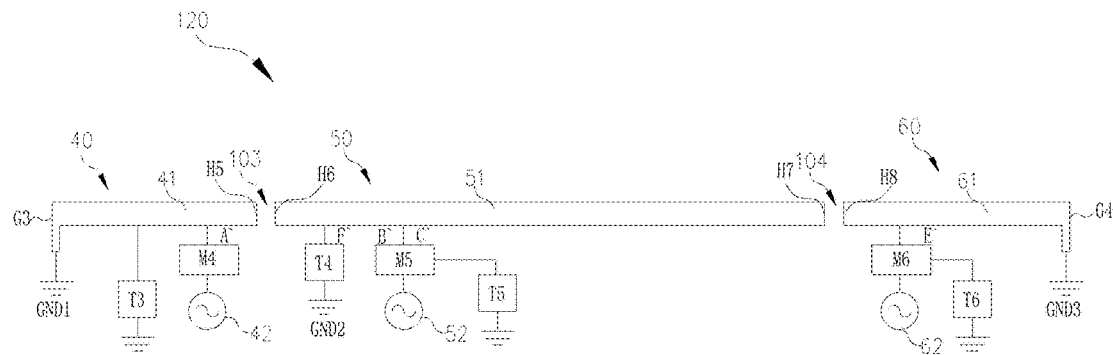
FIG. 41 is a schematic structural diagram of the second antenna module in FIG. 10 provided in other implementations of the present disclosure.

In another implementation, referring to FIG. 41, the fifth frequency-selective filter circuit M5 has one end electrically connected with the fifth frequency-selective filter circuit M5, and the other end grounded. The fifth FT circuit T5 is configured to adjust the resonant frequency of the fifth resonant sub-mode e' by adjusting the impedance between the second FT point F' and the seventh coupling end H7.

A length between the second FT point F' and the seventh coupling end H7 may be about a quarter of the wavelength of the electromagnetic wave of the second band, such that the fifth antenna element 50 has a relatively high radiation efficiency.

In addition, the second FT point F' is grounded, and the second coupling point B' is the fifth feed point C', such that the fifth antenna element 50 is an inverted F antenna. In an antenna form of inverted F, the impedance matching of the fifth antenna element 50 can be conveniently adjusted by adjusting a position of the fifth feed point C'.

In an implementation, the fifth FT circuit T5 includes, but is not limited to, capacitors, inductors, resistors, etc. disposed in series and/or in parallel. The fifth FT circuit T5 may include multiple branches formed by capacitors, inductors, resistors connected in series and/or in parallel, and switches for controlling on/off of the multiple branches. By controlling on/off of different switches, frequency-selective parameters (including a resistance value, an inductance value, and a capacitance value) of the fifth FT circuit T5 can be adjusted, such that the impedance of part of the fifth radiator 51 from the second FT point F' to the seventh coupling end H7 can be adjusted, and then the resonant frequency-point of the fifth antenna element 50 transmitting and receiving the fifth resonant sub-mode e' or a nearby resonant frequency-point is shifted towards a HB or a LB, for example, shifted from a position of mode 1 to a position of mode 2, a position of mode 2, a position of mode 3, and a position of mode 4 in FIG. 14. In this way, the frequency coverage of the fifth antenna element 50 in a relatively wide band can be realized by adjusting a FT parameter of the fifth FT circuit T5.

A specific structure of the fifth FT circuit T5 is not limited in the present disclosure, and a specific adjustment manner of the fifth FT circuit T5 is also not limited in the present disclosure.

In another implementation, the fifth FT circuit T5 includes, but is not limited to, a variable capacitor. By adjusting a capacitance value of the variable capacitor, the FT parameter of the fifth FT circuit T5 is adjusted, such that the impedance of part of the fifth radiator 51 from the second FT point F' to the seventh coupling end H7 is adjusted, thereby adjusting the resonant frequency-point of the fifth resonant sub-mode e'.

A position of the third FT point D' is a position of the second coupling point B' when the second coupling point B' is close to the seventh coupling end H7. Therefore, the fifth signal radiator 51 from the third FT point D' to the seventh coupling end H7 is coupled with the sixth radiator 61 through the fourth gap 104 to generate the ninth resonant sub-mode i'.

It can be seen from the above that by disposing the FT circuit and adjusting the parameter of the FT circuit, the fourth antenna element 40 can fully cover the MHB and the UHB, the fifth antenna element 50 can fully cover the LB, and the sixth antenna element 60 can fully cover the MHB and the UHB, thereby realizing the full coverage of the second antenna module 120 between the LB, the MHB and the UHB and enhancing the communication function. The radiators between the antenna elements are multiplexed, such that the overall size of the second antenna module 120 can be relatively small and the miniaturization of the whole device can be promoted.

It can be seen from the above that the first antenna module 110 and the second antenna module 120 are similar in structure, but different in radiator size and also different in radiation band. If the structure of the first antenna module 110 and the structure of the second antenna module 120 are summarized, the first radiator 11 and the fourth radiator 41 each can be defined as a first edge-radiator, the second radiator 21 and the fifth radiator 51 each can be defined as an intermediate radiator, the third radiator 31 and the sixth radiator 61 each can be defined as a second edge-radiator, the first antenna element 10 and the fourth antenna element 40 each can be defined as a first edge-antenna-element, the second antenna element 20 and the fifth antenna element 50 each can be defined as an intermediate antenna element, and the third antenna element 30 and the sixth antenna element 60 can be defined as a second edge-antenna-element.

Referring to FIG. 11, the first edge-radiator includes the first ground end G1, the first coupling end H1, and the first feed point A disposed from the first ground end G1 to the first coupling end H1. The intermediate radiator further includes the second coupling end H2, the first coupling point B, the second feed point C, and the third coupling end H3 that are arranged in sequence. The second coupling end H2 is capacitively coupled with the first coupling end H1 through the first gap 101. The second edge-radiator further includes the fourth coupling end H4, the third feed point E, and the second ground end G2 that are arranged in sequence. The fourth coupling end H4 is capacitively coupled with the third coupling end H3 through the second gap 102.

The first edge-antenna-element further includes the first frequency-selective filter circuit M1 and the first signal source 12. The first frequency-selective filter circuit M1 has one end electrically connected with the first feed point A and the other end electrically connected with the first signal source 12. The intermediate antenna element further includes the first FT circuit T1, the second frequency-selective filter circuit M2, and the second signal source 22. The first FT circuit T1 has one end electrically connected with the first coupling point B and the other end grounded. The second frequency-selective filter circuit M2 has one end electrically connected with the second feed point C and the other end electrically connected with the second signal source 22 and grounded. The second edge-antenna-element further includes the third frequency-selective filter circuit M3 and the third signal source 32. The third frequency-selective filter circuit M3 has one end electrically connected with the third feed point E and the other end electrically connected with the third signal source 32 and grounded.

Figure 42:
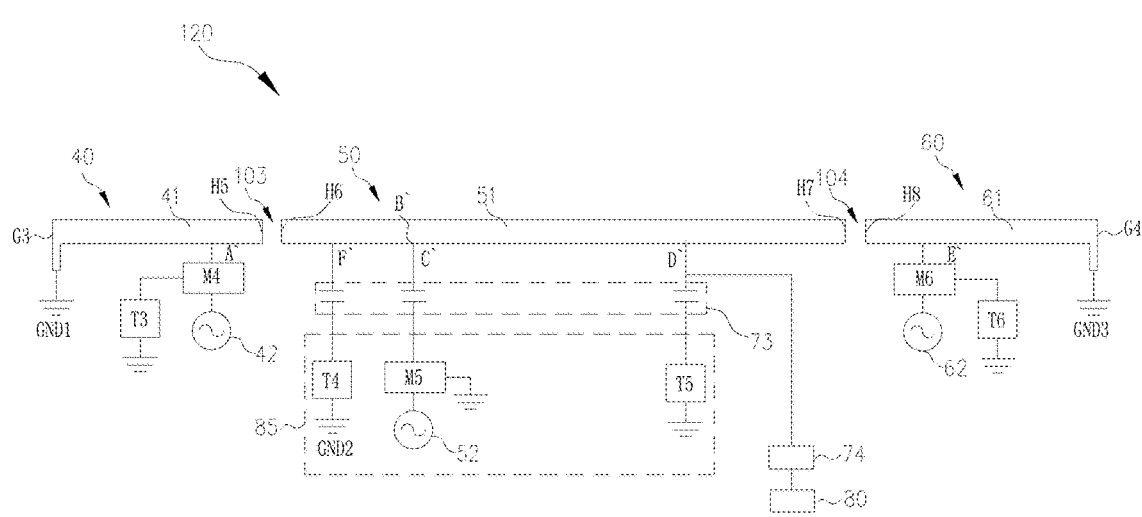
FIG. 42 is a schematic structural diagram of the second antenna module in FIG. 10 provided in other implementations of the present disclosure.

Referring to FIG. 42, the second antenna module 120 further includes a third isolator 73, a fourth isolator 74, and a proximity sensor 80. For example, the third isolator 73 is electrically connected between the fifth radiator 51 and a fifth RF front-end unit 85.

In one implementation, there are multiple third isolators 73. The third isolator 73 is disposed between the fifth radiator 51 and the fifth frequency-selective filter circuit M5, and the third isolator 72 is disposed between the fifth radiator 51 and the third FT circuit T3. The third isolator 73 is configured to isolate the proximity induction signal generated when the subject to-be-detected is approaching the fifth radiator 51 and allow the electromagnetic wave signal transmitted and received by the fifth radiator 51 to pass through. In this implementation, the third isolator 73 at least includes a DC blocking capacitor. The subject to-be-detected includes but is not limited to the human body.

The fourth isolator 74 has one end electrically connected between the fifth radiator 51 and the third isolator 73. The fourth isolator 74 is configured to isolate an electromagnetic wave signal received and transmitted by the fifth radiator 51 and allow the proximity induction signal to pass through. In one implementation, the fourth isolator 74 at least includes an isolation inductor.

The proximity sensor 80 is electrically connected with the other end of the fourth isolator 74 and is configured to sense the magnitude of the proximity induction signal.

When the subject to-be-detected is approaching the fifth radiator 51, the proximity induction signal generated by the fifth radiator 51 is a DC signal. The electromagnetic wave signal is an AC signal. By disposing the third isolator 73 between the fifth radiator 51 and the fifth RF front-end unit 85, the proximity induction signal does not flow to the fifth RF front-end unit 85 through the fifth radiator 51, thereby affecting signal transceiving of the second antenna element 20. By disposing the fourth isolator 74 between the proximity sensor 80 and the fifth radiator 51, the electromagnetic wave signal does not flow to the proximity sensor 80 through the fifth radiator 51, thereby improving a sensing efficiency of the proximity sensor 80 for the proximity induction signal.

A specific structure of the proximity sensor 80 is not limited in the present disclosure. The proximity sensor 80 includes, but is not limited to, a sensor for sensing a change in capacitance or a change in inductance.

The controller is electrically connected with one end of the proximity sensor 80 away from the fourth isolator 74. The controller is configured to determine whether the subject to-be-detected is approaching the fifth radiator 51 according to the magnitude of the proximity induction signal, and reduce operating power of the fifth antenna element 50 when the subject to-be-detected is approaching the fifth radiator 51. In one implementation, when the proximity sensor 80 detects that the human body is approaching the fifth antenna element 50, transmitting power of the fifth antenna element 50 can be reduced, thereby reducing a specific absorption rate of the human body for the electromagnetic wave signal transmitted by the fifth antenna element 50. When the proximity sensor 80 detects that the human body is departing from the fifth antenna element 50, the transmitting power of the fifth antenna element 50 can be increased, such that the antenna performance of the second antenna module 120 is improved, and the specific absorption rate of the human body for the electromagnetic wave signal transmitted by the fifth antenna element 50 is not increased. In this way, the radiation performance of the electronic device 1000 is intelligently adjustable, and the safety performance of the electronic device 1000 is improved.

Figure 43:
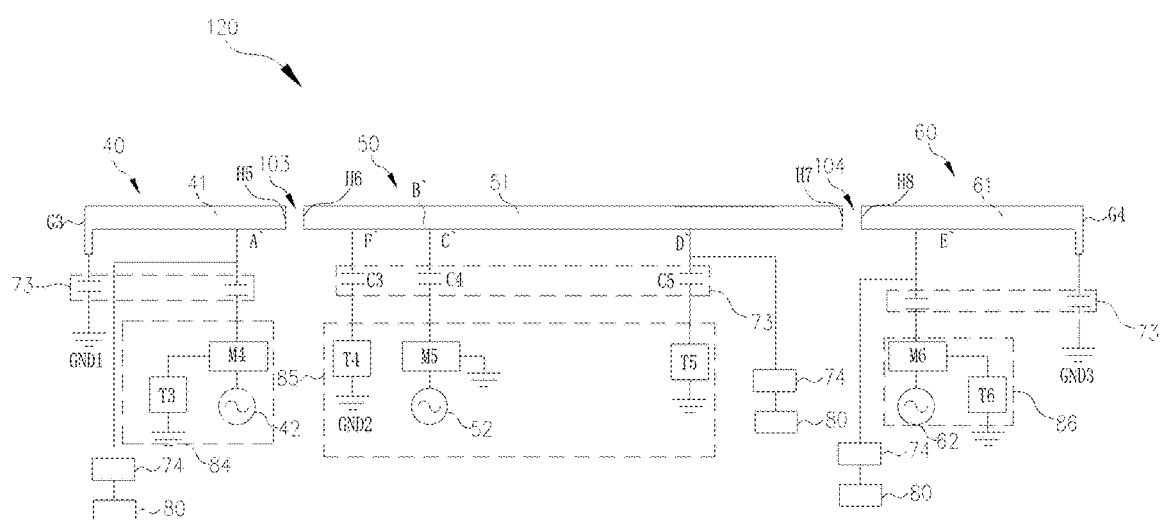
FIG. 43 is a schematic structural diagram of the second antenna module in FIG. 10 provided in other implementations of the present disclosure.

In a further implementation, referring to FIG. 43, the third isolator 73 is disposed between the fourth radiator 41 and a fourth RF front-end unit 84, and the third isolator is disposed between the fourth radiator 41 and the first reference ground GND1, such that the fourth radiator 41 is also able to detect the approach of the subject to-be-detected. Alternatively, the third isolator 73 is disposed between the sixth radiator 61 and a sixth RF front-end unit 86, and the third isolator 73 is disposed between the sixth radiator 61 and the third reference ground GND3, such that the sixth radiator 61 can also detect the approach of the subject to-be-detected. Alternatively, when the fourth radiator 41, the fifth radiator 51, and the sixth radiator 61 each formed a detection electrode, the area of the detection electrodes can be increased, and the approach of the subject to-be-detected can be detected in a larger range, thereby further improving the adjustment accuracy of the radiation performance of the electronic device 1000.

It can be understood that an implementation of the second radiating element 123 of the second antenna module 120 as the inductive electrode can refer to the implementation of the first radiating element 113 of the first antenna module 110 as the inductive electrode, which will not be repeated here. In addition, an implementation of the radiator of the third antenna module 130 and the radiator of the fourth antenna module 140 as inductive electrodes can refer to the implementation of the first radiating element 113 of the first antenna module 110 as the inductive electrode, which will not be repeated here.

The radiators of the second antenna module 120 can transmit and receive the electromagnetic wave signals, the radiators of the second antenna module 120 can also serve as inductive electrodes and be multiplexed to detect the approach of the human body and other subjects to-be-detected, the induction signal is isolated through the third isolator 73, and the electromagnetic wave signal is isolated through the fourth isolator 74, such that the communication performance of the second antenna module 120 and a role of sensing the subject to-be-detected are realized, the radiation performance of the electronic device 1000 is intelligently adjustable, and the safety performance of the electronic device 1000 is improved. Further, a device utilization rate of the electronic device 1000 is improved, and the overall volume of the electronic device 1000 is reduced.

What is claimed is:
1. An electronic device comprising:
a housing comprising a first corner portion and a second corner portion that are disposed diagonally;
a first antenna module, wherein at least part of the first antenna module is disposed at or close to the first corner portion; and the first antenna module comprises a first radiating element, and the first radiating element is configured to transmit and receive a first electromagnetic wave signal, and generate a first induction signal when a subject to-be-detected is approaching; and
a second antenna module, wherein at least part of the second antenna module is disposed at or close to the second corner portion, the second antenna module comprises a second radiating element, and the second radiating element is configured to transmit and receive a second electromagnetic wave signal, and generate a second induction signal when the subject to-be-detected is approaching;

wherein the housing comprises a first edge, a second edge, a third edge, and a fourth edge that are connected in sequence, the first edge is disposed opposite to the third edge, the second edge is disposed opposite to the fourth edge, a joint between the first edge and the second edge is the first corner portion, and a joint between the third edge and the fourth edge is the second corner portion; and wherein the first antenna module comprises a first antenna element, a second antenna element, and a third antenna element that are arranged in sequence, the first antenna element comprises a first radiator, the second antenna element comprises a second radiator, and the third antenna element comprises a third radiator, the first radiator is capacitively coupled with the second radiator, the second radiator is capacitively coupled with the third radiator, part of the second radiator is disposed at or close to the first edge, another part of the second radiator is disposed at or close to the second edge, and at least one of the first radiator, the second radiator, or the third radiator is configured to generate the first induction signal when the subject to-be-detected is approaching.

2. The electronic device of claim 1, wherein the first electromagnetic wave signal has a band at least covering a global positioning system L1 (GPS-L1) band, a wireless fidelity (Wi-Fi) 2.4 GHz (2.4G) band, a long term evolution middle high band (LTE-MHB), a new radio middle high band (NR-MHB), a new radio ultra-high band (NR-UHB), and a Wi-Fi 5 GHz (5G) band; and/or the second electromagnetic wave signal has a band at least covering a long term evolution lower band (LTE-LB), the LTE-MHB, a new radio lower band (NR-LB), the NR-MHB, and the NR-UHB.

3. The electronic device of claim 1, wherein the first antenna element is configured to transmit and receive an electromagnetic wave signal at least covering the LTE-MHB, the NR-MHB, and the NR-UHB; and/or the second antenna element is configured to transmit and receive an electromagnetic wave signal at least covering the GPS-L1 band, the Wi-Fi 2.4G band, the LTE-MHB, and the NR-MHB; and/or the third antenna element is configured to transmit and receive an electromagnetic wave signal at least covering the NR-UHB and the Wi-Fi 5G band.

4. The electronic device of claim 1, wherein the second antenna module comprises a fourth antenna element, a fifth antenna element, and a sixth antenna element that are arranged in sequence, the fourth antenna element comprises a fourth radiator, the fifth antenna element comprises a fifth radiator, the sixth antenna element comprises a sixth radiator, the fourth radiator is capacitively coupled with the fifth radiator, and the fifth radiator is capacitively coupled with the sixth radiator; part of the fifth radiator is disposed at or close to the third edge, and another part of the fifth radiator is disposed at or close to the fourth edge; and at least one of the fourth radiator, the fifth radiator, or the sixth radiator is configured to generate the second induction signal when the subject to-be-detected is approaching.

5. The electronic device of claim 4, wherein the fourth antenna element is configured to transmit and receive an electromagnetic wave signal at least covering the LTE-MHB, a long term evolution ultra-high band (LTE-UHB), the NR-MHB, and the NR-UHB; the fifth antenna element is configured to transmit and receive an electromagnetic wave signal at least covering the LTE-LB; and the sixth antenna element is configured to transmit and receive an electromagnetic wave signal at least covering the LTE-MHB, the LTE-UHB, the NR-MHB, and the NR-UHB.

6. The electronic device of claim 4, wherein the first radiator and the fourth radiator each are a first edge-radiator, and the first antenna element and the fourth antenna element each are a first edge-antenna-element; the first edge-radiator comprises a first ground end, a first coupling end, and a first feed point disposed between the first ground end and the first coupling end; and the first edge-antenna-element comprises a first frequency-selective filter circuit and a first signal source, and the first frequency-selective filter circuit has one end electrically connected with the first feed point, and another end electrically connected with the first signal source.

7. The electronic device of claim 6, wherein the second radiator and the fifth radiator each are an intermediate radiator; the second antenna element and the fifth antenna element each are an intermediate antenna element; the intermediate radiator comprises a second coupling end, a coupling point, a second feed point, and a third coupling end that are arranged in sequence; the second coupling end is capacitively coupled with the first coupling end through a first gap; the intermediate antenna element comprises a first frequency-tuning (FT) circuit, a second frequency-selective filter circuit, and a second signal source, and the first FT circuit has one end electrically connected with the coupling point, and another end grounded; and the second frequency-selective filter circuit has one end electrically connected with the second feed point, and another end electrically connected with the second signal source and grounded.

8. The electronic device of claim 7, wherein the third radiator and the sixth radiator each are a second edge-radiator, and the third antenna element and the sixth antenna element each are a second edge-antenna-element;

wherein the second edge-radiator comprises a fourth coupling end, a third feed point, and a second ground end that are arranged in sequence, and the fourth coupling end is capacitively coupled with the third coupling end through a second gap; and wherein the second edge-antenna-element comprises a third frequency-selective filter circuit and a third signal source, and the third frequency-selective filter circuit has one end electrically connected with the third feed point, and another end electrically connected the third signal source and grounded.

9. The electronic device of claim 8, wherein the first antenna element is operable in a first resonant mode and a second resonant mode, wherein a band of the first resonant mode and a band of the second resonant mode jointly cover 2 GHz~4 GHz, the first resonant mode is a fundamental mode in which the first antenna element from the first ground end to the first coupling end is operable, and the second resonant mode is a ¼-wavelength fundamental mode in which the first antenna element from the first feed point to the first coupling end is operable; and/or wherein the second antenna element is operable in a third resonant mode and a fourth resonant mode; wherein a band of the third resonant mode and a band of the fourth resonant mode jointly cover 1.5 GHz~3 GHZ, and the third resonant mode is a ¼-wavelength fundamental mode in which the second antenna element from the coupling point to the third coupling end is operable; and the fourth resonant mode is a ¼-wavelength fundamental mode in which the second antenna element from the second feed point to the third coupling end is operable; and/or wherein the third antenna element is operable in a fifth resonant mode and a sixth resonant mode; the second radiator from the coupling point to the third coupling end is operable in a seventh resonant mode under excitation of a radio frequency (RF) signal transmitted by the third source; wherein a band of the fifth resonant mode, a band of the sixth resonant mode, and a band of the seventh resonant mode jointly cover 3 GHz~6.5 GHZ, and the fifth resonant mode is a ⅛-wavelength mode in which the third antenna element from the second ground end to the fourth coupling end is operable; the sixth resonant mode is a ¼-wavelength fundamental mode in which the third antenna element from the second ground end to the fourth coupling end is operable; and the seventh resonant mode is a ½-wavelength mode in which the second antenna element from the coupling point to the third coupling end is operable.

10. The electronic device of claim 8, wherein the fourth antenna element is operable in a first resonant sub-mode, a second resonant sub-mode, a third resonant sub-mode, and a fourth resonant sub-mode, wherein the first resonant sub-mode is a fundamental mode in which the fourth antenna element from the first ground point to the first coupling end is operable; the second resonant sub-mode is a fundamental mode in which the fourth antenna element from the coupling point and the second coupling end is operable; the third resonant sub-mode is a fundamental mode in which the fourth antenna element from the first feed point to the first coupling end is operable; and the fourth resonant sub-mode is a third-order mode in which the fourth antenna element from the first ground end to the first coupling end is operable, wherein a resonant frequency of the first resonant sub-mode, a resonant frequency of the second resonant sub-mode, a resonant frequency of the third sub resonant mode, and a resonant frequency of the fourth resonant sub-mode increase in sequence; and/or wherein the fifth antenna element from the coupling point to the third coupling end is operable in a fifth resonant sub-mode when operating in a fundamental mode; and/or the sixth antenna element is operable in a plurality of sixth resonant sub-modes, and at least one of the plurality of sixth resonant sub-modes is generated by capacitive coupling between the fifth radiator and the sixth radiator.

11. The electronic device of claim 1, wherein the first radiating element comprises at least one of the first radiator, the second radiator, or the third radiator; the electronic device further comprises a first isolator, a second isolator, and a proximity sensor, the first isolator is electrically connected with the first radiating element, the first isolator is configured to isolate the first induction signal generated when the subject to-be-detected is approaching the first radiating element and allow the first electromagnetic wave signal transmitted and received by the first radiating element to pass through; the second isolator has one end electrically connected between the first radiating element and the first isolator or electrically connected with the first radiating element, and the second isolator is configured to isolate an electromagnetic wave signal transmitted and received by the first radiating element and allow the first induction signal to pass through; and the proximity sensor is electrically connected with another end of the second isolator, and is configured to sense a magnitude of the first induction signal.

12. The electronic device of claim 11, wherein the first isolator comprises a first sub-isolator, the first sub-isolator is configured to isolate a first induction sub-signal generated when the subject to-be-detected is approaching the second radiator and allow an electromagnetic wave signal transmitted and received by the second radiator to pass through; the second isolator comprises a second sub-isolator, the second sub-isolator has one end electrically connected between the second radiator and the first sub-isolator or electrically connected with the second radiator, and the second sub-isolator is configured to isolate the electromagnetic wave signal transmitted and received by the second radiator and allow the first induction sub-signal to pass through; and the proximity sensor comprises a first proximity sub-sensor, the first proximity sub-sensor is electrically connected with another end of the second sub-isolator, and is configured to sense the magnitude of the first induction sub-signal.

13. The electronic device of claim 12, wherein the first isolator further comprises a third sub-isolator, and the third sub-isolator is electrically connected with the first radiator, and is configured to isolate a second induction sub-signal generated when the subject to-be-detected is approaching the first radiator and allow an electromagnetic wave signal transmitted and received by the first radiator to pass through.

14. The electronic device of claim 13, wherein the second induction sub-signal is used to make the second radiator generate a third induction sub-signal through a coupling effect between the first radiator and the second radiator, and the first proximity sub-sensor is configured to sense a magnitude of the third induction sub-signal.

15. The electronic device of claim 13, wherein the second isolator further comprises a fourth sub-isolator, the fourth sub-isolator has one end electrically connected between the first radiator and the third sub-isolator or electrically connected with the first radiator, and the fourth sub-isolator is configured to isolate the electromagnetic wave signal transmitted and received by the first radiator and allow the second induction sub-signal to pass through, and is configured to output the second induction sub-signal at another end of the fourth sub-isolator;

wherein the proximity sensor further comprises a second proximity sub-sensor, and the second proximity sub-sensor is electrically connected with said another end of the fourth sub-isolator, and the second proximity sub-sensor is configured to sense a magnitude of the second induction sub-signal; or wherein said another end of the fourth sub-isolator is electrically connected with the first proximity sub-sensor, a coupling induction signal is generated when the first radiator is capacitively coupled with the second radiator, and the first proximity sub-sensor is further configured to sense a variation of the coupling induction signal when the subject to-be-detected is approaching the first radiator and/or the second radiator.

16. The electronic device of claim 1, further comprising a controller and a functional device, wherein the controller is electrically connected with the first radiating element, the second radiating element, and the functional device, the controller is configured to determine an operating state of the electronic device according to a magnitude of the first induction signal, a magnitude of the second induction signal, and an operating state of the functional device, and adjust power of the first antenna module and power of the second antenna module or control enabling and disabling of the first antenna module and enabling and disabling of the second antenna module, according to the operating state of the electronic device, wherein the functional device comprises a display screen and a receiver.

17. The electronic device of claim 16, wherein the controller is further configured to determine that the electronic device is in a state of approaching a head of the subject to-be-detected and control each of the power of the first antenna module and the power of the second antenna to be reduced, when each of the first induction signal and the second induction signal is detected to be greater than a preset threshold and the receiver is detected to be in an operating state; and/or
wherein the controller is further configured to determine that the electronic device is in a carry state and control each of the power of the first antenna module and the power of the second antenna module to be reduced, when each of the first induction signal and the second induction signal is detected to be greater than the preset threshold and the display screen is detected to be in a non-display state.

18. The electronic device of claim 1, further comprising at least one third antenna module or a controller, wherein the at least one third antenna module is disposed at or close to a joint between the second edge and the third edge or a joint between the fourth edge and the first edge, or the at least one third antenna module is disposed at at least one of the first edge, the second edge, the third edge, or the fourth edge; and
wherein the controller is further configured to determine that the electronic device is in a holding state at an edge or a corner at which the second antenna is disposed when the second induction signal is detected to be greater than a preset threshold and the first induction signal is detected to be less than the preset threshold, and control an increase in power of the second antenna module by adjusting a FT circuit in the second antenna module, and/or control the at least one third antenna module to start operating or increase power.

19. The electronic device of claim 18, further comprising at least one fourth antenna module, wherein the at least one fourth antenna module is disposed at or close to the joint between the second edge and the third edge or the joint between the fourth edge and the first edge, or the at least one fourth antenna module is disposed at at least one of the first edge, the second edge, the third edge, or the fourth edge; and
wherein the controller is further configured to determine that the electronic device is in the holding state at both an edge or a corner at which the first antenna module is disposed and the edge or the corner at which the second antenna module is disposed when the first induction signal and the second induction signal each are detected to be greater than the preset threshold, and control an increase in power of the first antenna module by adjusting a FT circuit in the first antenna module and the increase in the power of the second antenna module by adjusting the FT circuit in the second antenna module, and/or control the third antenna module to start operating or increase power, and control the fourth antenna module to start operating or increase power.

* * * * *